US009572138B2

(12) United States Patent
Lee et al.

(10) Patent No.: US 9,572,138 B2
(45) Date of Patent: Feb. 14, 2017

(54) METHOD OF TRANSMITTING CONTROL INFORMATION IN A WIRELESS COMMUNICATION SYSTEM AND APPARATUS THEREOF

(75) Inventors: Hyunwoo Lee, Anyang-si (KR); Jinmin Kim, Anyang-si (KR); Seunghee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 14/000,593

(22) PCT Filed: Mar. 16, 2012

(86) PCT No.: PCT/KR2012/001921
§ 371 (c)(1),
(2), (4) Date: Aug. 20, 2013

(87) PCT Pub. No.: WO2012/128513
PCT Pub. Date: Sep. 27, 2012

(65) Prior Publication Data
US 2013/0322397 A1    Dec. 5, 2013

Related U.S. Application Data

(60) Provisional application No. 61/523,837, filed on Aug. 15, 2011, provisional application No. 61/476,768, (Continued)

(51) Int. Cl.
*H04W 72/04* (2009.01)
*H04W 56/00* (2009.01)
*H04L 5/00* (2006.01)

(52) U.S. Cl.
CPC .......... *H04W 72/0413* (2013.01); *H04L 5/001* (2013.01); *H04L 5/0055* (2013.01); *H04W 56/0045* (2013.01)

(58) Field of Classification Search
CPC ............ H04W 56/0045; H04W 72/0413; H04L 5/001; H04L 5/0055
See application file for complete search history.

(56) References Cited

U.S. PATENT DOCUMENTS 8,305,986 B2 * 11/2012 Zhang et al. ............... 370/329
8,437,705 B2 *  5/2013 Khoshnevis et al. ......... 455/69
(Continued)

FOREIGN PATENT DOCUMENTS

EP          2688239       1/2014
WO       2010/069422      6/2010
(Continued)

OTHER PUBLICATIONS

PCT International Application No. PCT/KR2012/001921, Notification of Transmittal of the International Search Report and the Written Opinion of the International Searching Authority, or Declaration dated Nov. 28, 2012, 8 pages.
(Continued)

*Primary Examiner* — Parth Patel
*Assistant Examiner* — Kai Chang
(74) *Attorney, Agent, or Firm* — Lee Hong Degerman Kang Waimey

(57) ABSTRACT

A method and apparatus for transmitting control information in a wireless communication system supporting carrier aggregation (CA) is disclosed. A method for transmitting control information to a base station (BS) by a user equipment (UE) in a wireless communication system includes receiving at least one of a physical downlink control channel (PDCCH) and a physical downlink shared channel (PDSCH) from the base station through at least one serving cell configured in the user equipment, and transmitting control information regarding PDCCH reception or PDSCH reception indicated by the PDCCH to the base station. The control
(Continued)

information is transmitted through a physical uplink control channel (PUCCH) of a primary cell, using control information feedback timing of at least one of the primary cell and a first cell of the at least one serving cell, and the at least one serving cell uses different uplink and downlink (UL-DL) configurations.

18 Claims, 33 Drawing Sheets

Related U.S. Application Data filed on Apr. 19, 2011, provisional application No. 61/454,585, filed on Mar. 21, 2011, provisional application No. 61/545,204, filed on Oct. 10, 2011, provisional application No. 61/522,699, filed on Aug. 12, 2011, provisional application No. 61/453,968, filed on Mar. 18, 2011, provisional application No. 61/473,166, filed on Apr. 8, 2011.

(56) References Cited

U.S. PATENT DOCUMENTS

| | | | | |
|---|---|---|---|---|
| 8,588,252 | B2* | 11/2013 | Montojo et al. | 370/471 |
| 8,670,379 | B2* | 3/2014 | Yamada et al. | 370/328 |
| 8,767,647 | B2* | 7/2014 | Heo et al. | 370/329 |
| 8,774,123 | B1* | 7/2014 | Baldemair | H03M 13/136 |
| | | | | 370/328 |
| 8,780,847 | B2* | 7/2014 | Berggren et al. | 370/329 |
| 8,842,610 | B2* | 9/2014 | Lee et al. | 370/328 |
| 8,848,601 | B2* | 9/2014 | Cai et al. | 370/328 |
| 8,885,496 | B2* | 11/2014 | Yin et al. | 370/252 |
| 2004/0142695 | A1* | 7/2004 | O'Neill | H04B 7/2656 |
| | | | | 455/450 |
| 2008/0137562 | A1* | 6/2008 | Li | H04B 7/2656 |
| | | | | 370/280 |
| 2010/0098012 | A1 | 4/2010 | Bala et al. | |
| 2010/0111024 | A1* | 5/2010 | Fan et al. | 370/329 |
| 2010/0210256 | A1* | 8/2010 | Shen et al. | 455/422.1 |
| 2010/0220617 | A1* | 9/2010 | Choi et al. | 370/252 |
| 2010/0239034 | A1 | 9/2010 | Lee et al. | |
| 2010/0260136 | A1 | 10/2010 | Fan et al. | |
| 2010/0273514 | A1* | 10/2010 | Koo et al. | 455/501 |
| 2010/0322173 | A1 | 12/2010 | Marinier et al. | |
| 2011/0007674 | A1* | 1/2011 | Dai et al. | 370/282 |
| 2011/0026478 | A1 | 2/2011 | Lee et al. | |
| 2011/0085491 | A1* | 4/2011 | Tynderfeldt | H04W 56/0005 |
| | | | | 370/315 |
| 2011/0134813 | A1* | 6/2011 | Park et al. | 370/280 |
| 2011/0164585 | A1* | 7/2011 | Yu et al. | 370/329 |
| 2011/0170508 | A1* | 7/2011 | Xue | H04L 5/0055 |
| | | | | 370/329 |
| 2011/0211503 | A1* | 9/2011 | Che et al. | 370/280 |
| 2011/0228731 | A1* | 9/2011 | Luo | H01Q 3/2605 |
| | | | | 370/329 |
| 2011/0267992 | A1* | 11/2011 | Seo | H04B 7/2606 |
| | | | | 370/279 |
| 2011/0268028 | A1* | 11/2011 | Stern-Berkowitz | H04L 27/2613 |
| | | | | 370/328 |
| 2011/0281586 | A1* | 11/2011 | Yu | H04W 36/165 |
| | | | | 455/436 |
| 2012/0063302 | A1* | 3/2012 | Damnjanovic | H04W 56/0045 |
| | | | | 370/228 |
| 2012/0069815 | A1* | 3/2012 | Aiba et al. | 370/329 |
| 2012/0093073 | A1* | 4/2012 | Lunttila et al. | 370/328 |
| 2012/0099419 | A1* | 4/2012 | Kim | H04L 1/1854 |
| | | | | 370/216 |
| 2012/0120821 | A1* | 5/2012 | Kazmi | H04W 56/0005 |
| | | | | 370/252 |
| 2012/0120854 | A1* | 5/2012 | Zhang | H04B 7/2656 |
| | | | | 370/280 |
| 2012/0176947 | A1* | 7/2012 | Xi et al. | 370/311 |
| 2012/0188877 | A1* | 7/2012 | Chin et al. | 370/241 |
| 2012/0195292 | A1* | 8/2012 | Ko et al. | 370/336 |
| 2012/0201229 | A1* | 8/2012 | Feng | H04L 5/0053 |
| | | | | 370/336 |
| 2013/0250822 | A1 | 9/2013 | Yang et al. | |
| 2013/0265914 | A1* | 10/2013 | Ahn | H04B 7/2656 |
| | | | | 370/280 |

FOREIGN PATENT DOCUMENTS

| | | |
|---|---|---|
| WO | 2010088950 | 8/2010 |
| WO | 2010129295 | 11/2010 |
| WO | 2012/087006 | 6/2012 |
| WO | 2012/091443 | 7/2012 |

OTHER PUBLICATIONS

European Patent Office Application Serial No. 12760471.8, Search Report dated Aug. 13, 2014, 8 pages.

Samsung, "Cell specific TDD configuration Inter-band Carrier Aggregation", R2-120292, 3GPP TSG-RAN WG2 #77, Feb. 2011, 3 pages.

Samsung, "Periodic CQI/PMI/RI reporting priority for identical reporting modes/types from multiple serving cells" R2-110879, 3GPP TSG-RAN2#73 meeting, Feb. 2011, 2 pages.

* cited by examiner

FIG. 5
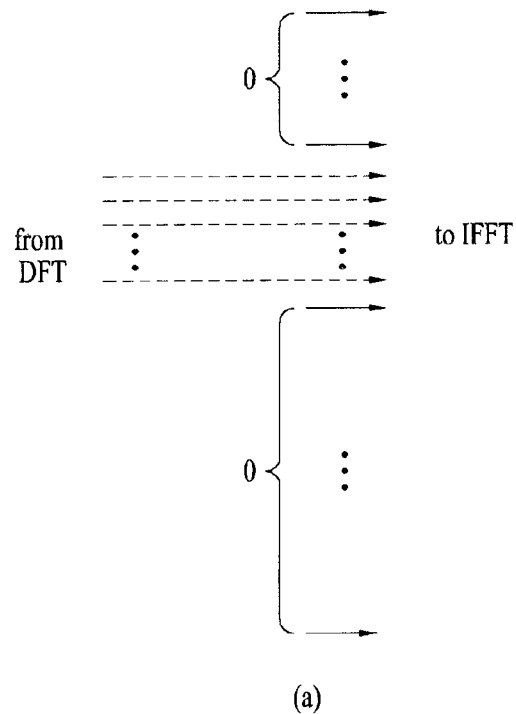
(a)
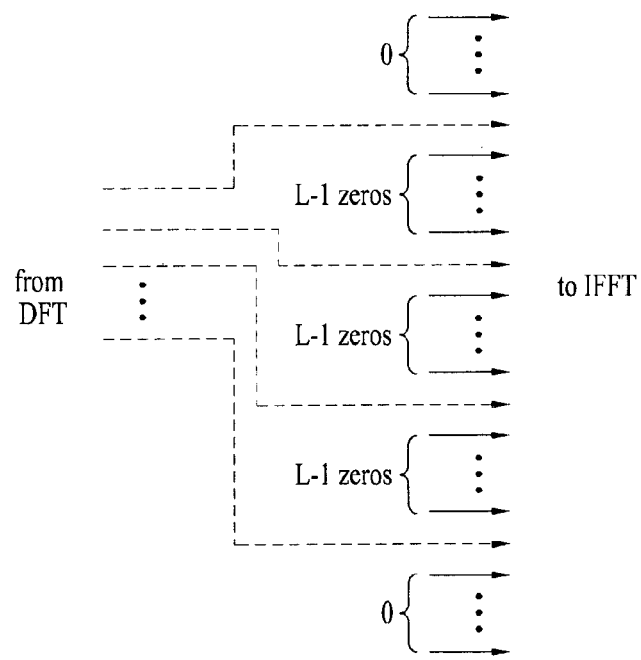
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | | n' = 0 | | |
| 2 | 1 | | 6 | | | 6 | |
| 3 | 2 | 1 | | | 1 | | |
| 4 | 3 | | 7 | | | 7 | |
| 5 | 4 | 2 | | | 2 | | |
| 6 | 5 | | 8 | | | 8 | |
| 7 | 6 | 3 | | | 3 | | |
| 8 | 7 | | 9 | | | 9 | |
| 9 | 8 | 4 | | | 4 | | |
| 10 | 9 | | 10 | | | 10 | |
| 11 | 10 | 5 | | | 5 | | |
| 0 | 11 | | 11 | | | 11 | |
| | | | | 12 | | | 12 |
| | | | | 13 | | | 13 |
| | | | | 14 | | | 14 |
| | | | | 15 | | | 15 |
| | | | | 16 | | | 16 |
| | | | | 17 | | | 17 |

$\Delta_{shift}^{PUCCH} \in \{1,2,3\}$ for normal cyclic prefix
$\Delta_{shift}^{PUCCH} \in \{1,2,3\}$ for extended cyclic prefix $\delta_{offset}^{PUCCH} \in \{0,1,...,\Delta_{shift}^{PUCCH} - 1\}$ Cell specific cyclic shift offset $n_{OC}$ : Orthogonal sequence index for ACK/NACK
$\bar{n}_{OC}$ : Orthogonal sequence index for RS
$n_{CS}$ : Cyclic shift value of a CAZAC sequence
n' : ACK/NACK resource index used for the channelization in a RB Cell-specific Cyclic shift value of CAZAC sequence

FIG. 33
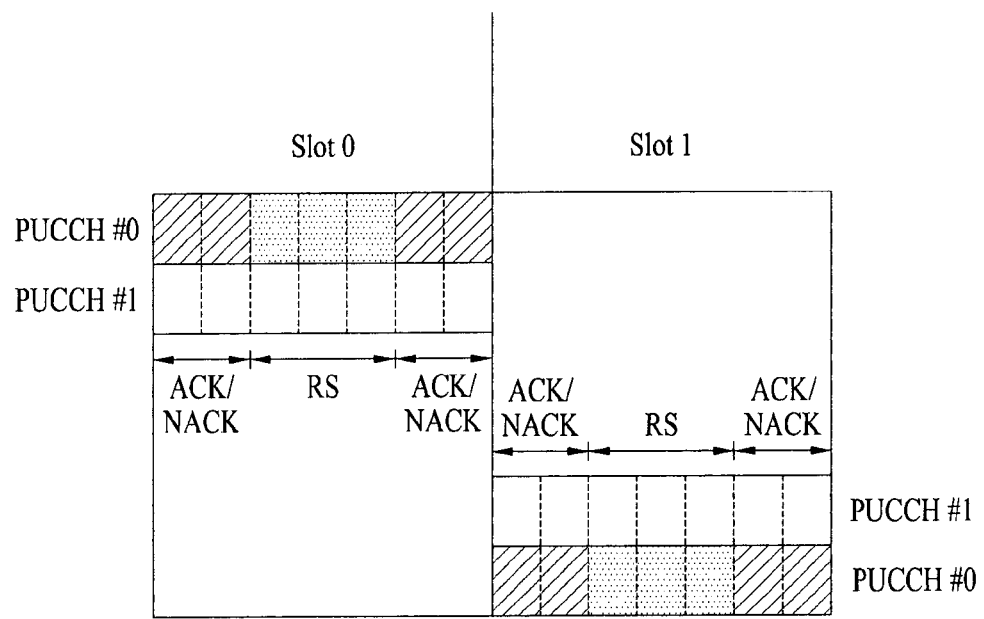
(a)
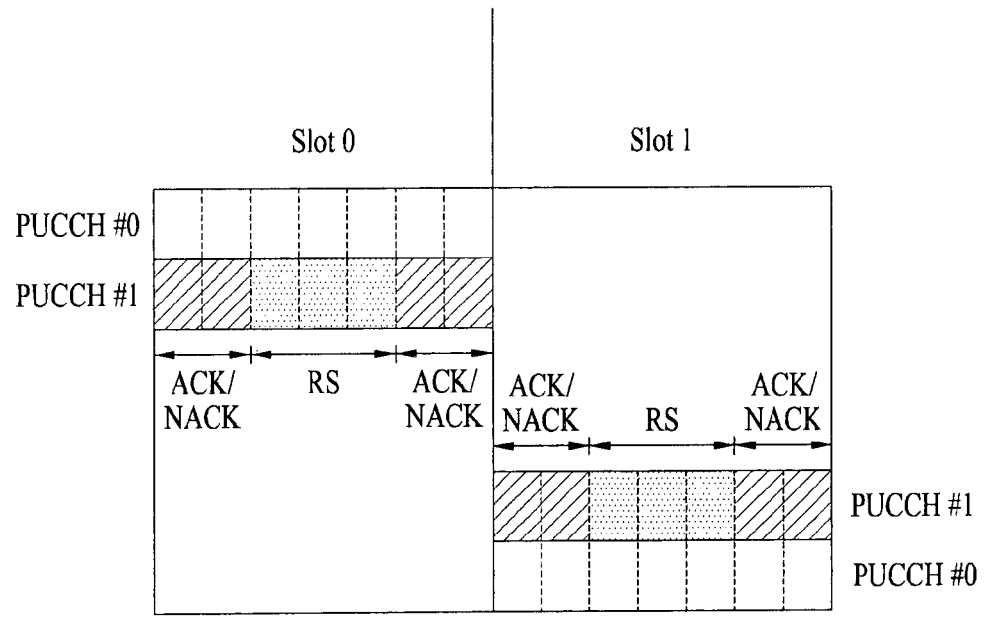
(b)

FIG. 34
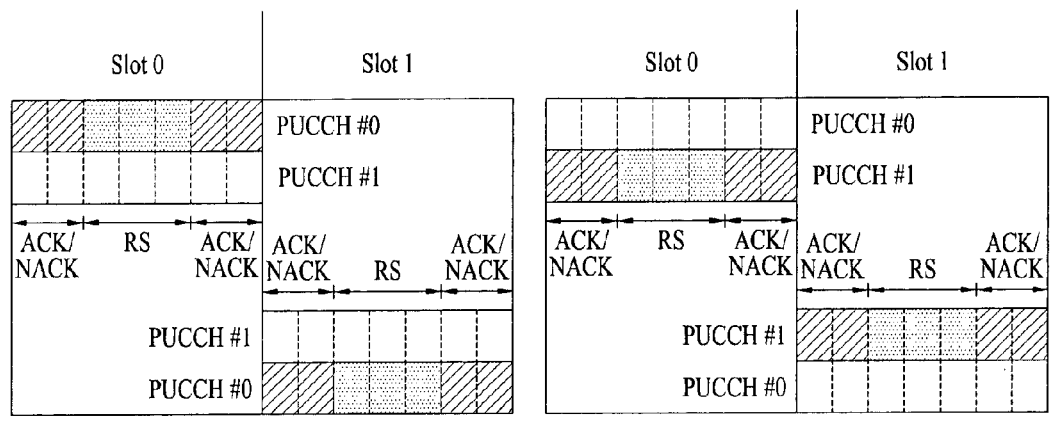
(a)                    (a)
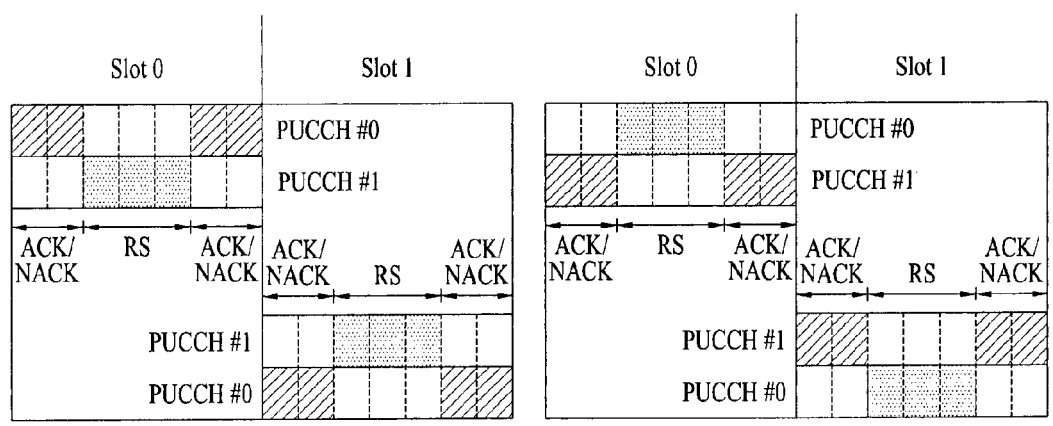
(c)                    (d)

K according to the UL-DL configuration of Cell
(e.g., cell #2) which has the minimum number of
UL subframe among configured serving cells K according to the UL-DL configuration of Cell
(e.g., cell #2) which has the minimum number of
UL subframe among configured serving cells

METHOD OF TRANSMITTING CONTROL INFORMATION IN A WIRELESS COMMUNICATION SYSTEM AND APPARATUS THEREOF

CROSS-REFERENCE TO RELATED APPLICATIONS

This application is the National Stage filing under 35 U.S.C. 371 of International Application No. PCT/KR2012/001921, filed on Mar. 16, 2012, which claims the benefit of U.S. Provisional Application Ser. Nos. 61/453,968, filed on Mar. 18, 2011, 61/454,585, filed on Mar. 21, 2011, 61/473,166, filed on Apr. 8, 2011, 61/476,768, filed on Apr. 19, 2011, 61/522,699, filed on Aug. 12, 2011, 61/523,837, filed Aug. 15, 2011, and 61/545,204, filed on Oct. 10, 2011, the contents of which are all hereby incorporated by reference herein in their entirety.

TECHNICAL FIELD

The present invention relates to a wireless communication system, and more particularly to a method and apparatus for transmitting control information in a wireless communication system supporting carrier aggregation (CA).

BACKGROUND ART

Wireless communication systems are widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE

Technical Problem

Accordingly, the present invention is directed to a method and apparatus for transmitting control information in a wireless communication system, that substantially obviate one or more problems due to limitations and disadvantages of the related art. An object of the present invention is to provide a method and apparatus for effectively transmitting control information in a wireless communication system. Another object of the present invention is to provide a channel format and signal processing for effectively transmitting control information, and an apparatus for the channel format and the signal processing. A further object of the present invention is to provide a method and apparatus for effectively allocating resources for transmitting control information.

It is to be understood that objects to be achieved by the present invention are not limited to the aforementioned objects and other objects which are not mentioned will be apparent to those of ordinary skill in the art to which the present invention pertains from the following description.

Technical Solution

The object of the present invention can be achieved by providing a method for transmitting control information to a base station (BS) by a user equipment (UE) in a wireless communication system, the method including receiving at least one of a physical downlink control channel (PDCCH) and a physical downlink shared channel (PDSCH) from the base station through at least one serving cell configured in the user equipment; and transmitting control information regarding either PDCCH reception or PDSCH reception indicated by the PDCCH to the base station, wherein the control information is transmitted through a physical uplink control channel of a primary cell, using control information feedback timing of at least one of the primary cell and a first cell of the at least one serving cell, and the at least one serving cell uses different uplink and downlink (UL-DL) configurations.

In another aspect of the present invention, provided herein is a user equipment (UE) for transmitting control information to a base station (BS) in a wireless communication system, the user equipment (UE) including a reception module for receiving at least one of a physical downlink control channel (PDCCH) and a physical downlink shared channel (PDSCH) from the base station through at least one serving cell configured in the user equipment; a transmission module for transmitting control information regarding PDCCH reception or PDSCH reception indicated by the PDCCH to the base station; and a processor for transmitting the control information through a physical uplink control channel (PUCCH) of a primary cell, using control information feedback timing of at least one of the primary cell and a first cell of the at least one serving cell, wherein the at least one serving cell uses different uplink and downlink (UL-DL) configurations.

Advantageous Effects

Exemplary embodiments of the present invention have the following effects. Control information can be effectively transmitted in a wireless system. In addition, the embodiments of the present invention can provide a channel format and a signal processing method to effectively transmit control information. In addition, resources for transmitting control information can be effectively assigned.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 is a conceptual diagram illustrating various examples for satisfying single carrier characteristics and mapping an input symbol to a subcarrier in a frequency domain;

FIG. 17 is a diagram showing ACK/NACK channelization of PUCCH formats 1a and 1b.

FIG. 33 is a diagram showing a transmission structure of ACK/NACK information using channel selection;

FIG. 34 is a diagram showing a transmission structure of ACK/NACK information using enhanced channel selection;

BEST MODE

Figure 1:
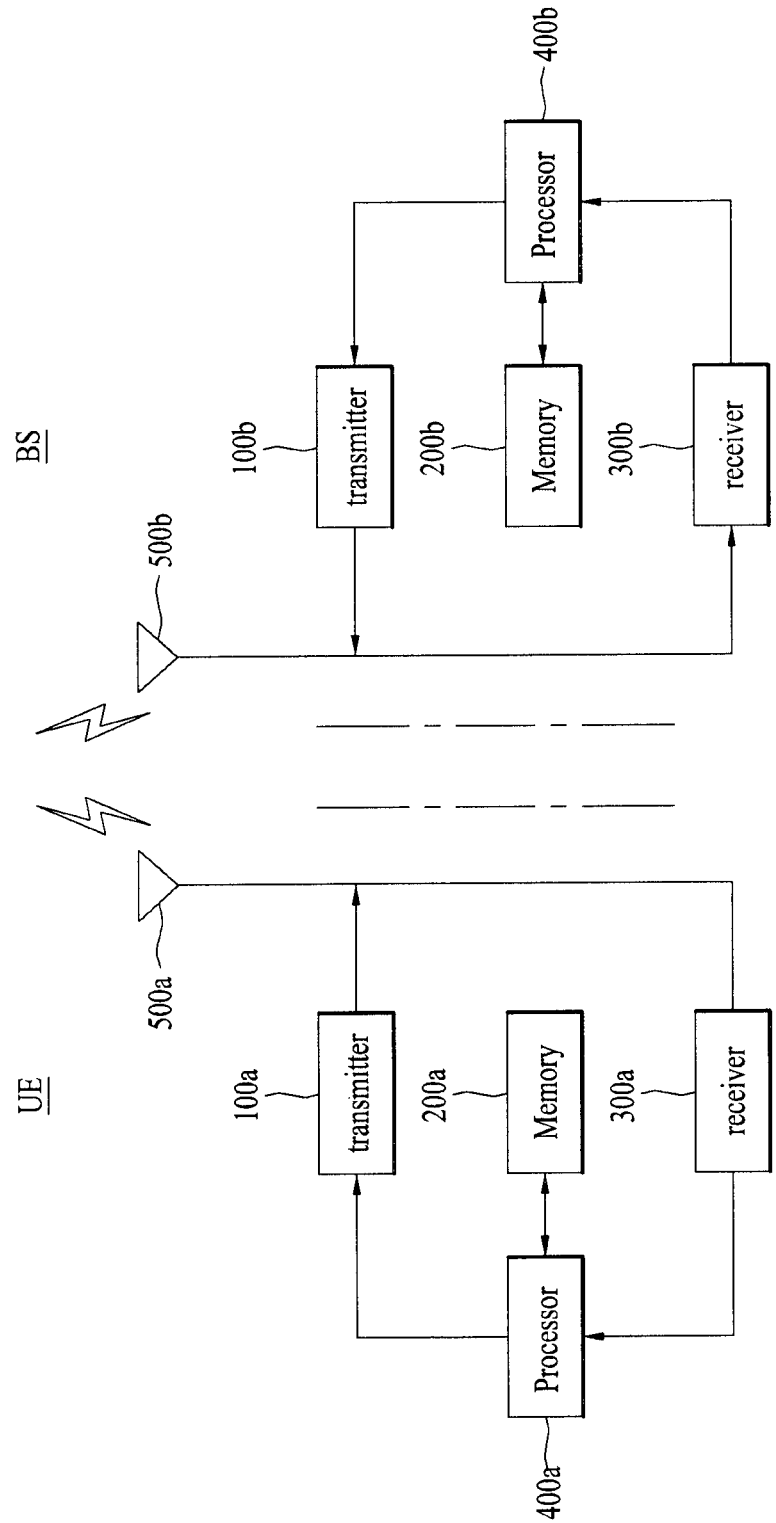
FIG. 1 is a block diagram illustrating a Base Station (BS) and a user equipment (UE) applicable to embodiments of the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), a Multi-Carrier frequency Division Multiple Access (MC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a base station (BS). The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device.

Also, in the present invention, a Base Station (BS) means a fixed station that performs communication with a user equipment and/or another base station, and exchanges various kinds of data and control information with the user equipment and another base station. The base station may be referred to another terminology such as an evolved-NodeB (eNB), a Base Transceiver System (BTS), and an Access Point (AP).

In the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

In the present invention, a rank or a transmission rank may indicate the number of layers multiplexed/allocated to one OFDM symbol or one data resource element (RE).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of REs carrying Downlink Control Information (DCI), a set of REs carrying Control Format Indicator (CFI), a set of REs carrying downlink ACK/NACK (ACKnowlegement/Negative ACK), and a set of REs carrying DL data, respectively. In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal, respectively.

In the present invention, RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource.

Therefore, in the present invention, PUCCH/PUSCH/PRACH transmission of a UE may be conceptuallay identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

On the other hand, in the present invention, ACK/NACK information mapping to a specific constellation point may be conceptually identical to ACK/NACK information mapping to a specific complex modulation symbol. In addition, ACK/NACK information mapped to the specific complex modulation symbol may be conceptually identical to ACK/NACK information modulated by a specific complex modulation symbol.

FIG. 1 is a block diagram of a UE and a BS for implementing the present invention. The UE serves as a transmitter on the uplink and as a receiver on the downlink. In contrast, the BS may serve as a receiver on the uplink and as a transmitter on the downlink.

Referring to FIG. 1, the UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b.

The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination.

In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention.

In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. Each of the memories 200a and 200b may be used as a buffer. Each of the memories 200a and 200b may be implemented into a flash memory-type storage medium, a hard disc-type storage medium, a multimedia card micro-type storage medium, a card-type memory (e.g. a Secure Digital (SD) or extreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
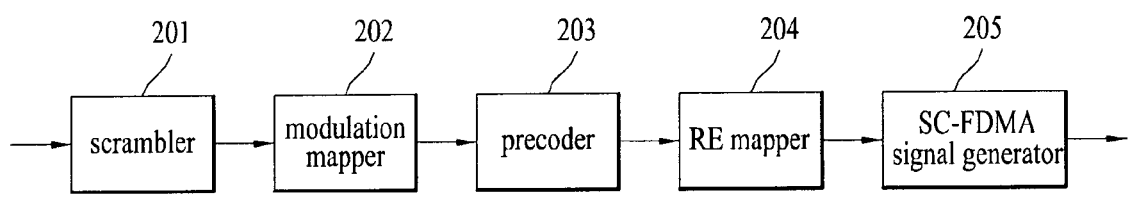
FIG. 2 is a conceptual diagram illustrating the signal processing for enabling a user equipment (UE) to transmit an uplink (UL) signal.

FIG. 2 is a block diagram of an exemplary transmitter in each of the UE and the BS. Operations of the transmitters 100a and 100b will be described below in more detail with reference to FIG. 2. Referring to FIG. 2, each of the transmitters 100a and 100b of the UE include a scrambler 201, a modulation mapper 202, a precoder 203, a resource element (RE) mapper 204, and an SC-FDMA signal generator 205.

Referring to FIG. 2, the scrambler 201 may scramble a transmission signal in order to transmit the uplink signal. The scrambled signal is input to the modulation mapper 202, such that the modulation mapper 202 modulates the scrambled signal to complex symbols in Binary Phase Shift Keying (BPSK), Quadrature Phase Shift Keying (QPSK), or 16-ary Quadrature Amplitude Modulation (16 QAM) according to the type of the transmission signal and/or a channel status. A transform precoder 203 processes the complex symbols and a resource element mapper 204 may map the processed complex symbols to time-frequency resource elements, for actual transmission. The mapped signal may be transmitted to the BS through an antenna after being processed in a Single Carrier-Frequency Division Multiple Access (SC-FDMA) signal generator 205.

Figure 3:
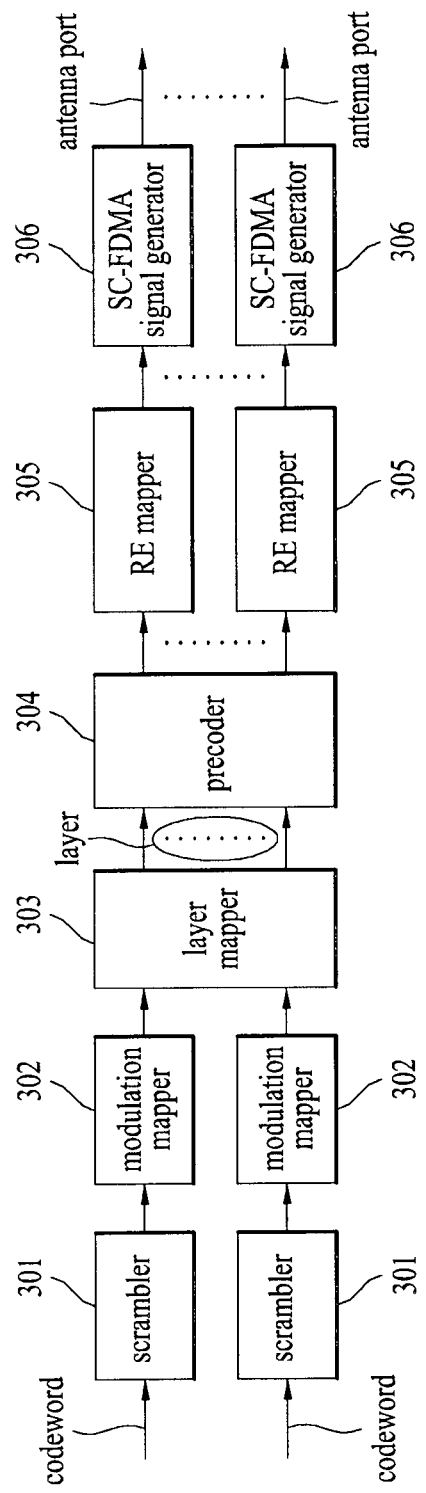
FIG. 3 is a conceptual diagram illustrating the signal processing for enabling a base station (BS) to transmit a downlink (DL) signal.

FIG. 3 is a conceptual diagram illustrating the signal processing for enabling a BS to transmit a downlink (DL) signal. Referring to FIG. 3, the transmitter 100b of the BS may include a scrambler 301, a modulation mapper 302, a layer mapper 303, a precoder 304, a resource element (RE) mapper 305, and an OFDMA signal generator.

The BS can transmit a signal or at least one codeword via a downlink. Therefore, the signal or codewords may be processed as complex symbols by the scrambler 301 and the modulation mapper 302 in the same manner as in the uplink operation shown in FIG. 2. Thereafter, the complex symbols are mapped to a plurality of layers by the layer mapper 303, and each layer is multiplied by a predetermined precoding matrix and is then allocated to each transmission antenna by the precoder 304. The processed transmission signals of individual antennas are mapped to time-frequency resource elements (REs) to be used for data transmission by the RE mapper 305. Thereafter, the mapped result may be transmitted via each antenna after passing through the OFDMA signal generator 306.

In the case where a UE for use in a mobile communication system transmits an uplink signal, a Peak to Average Power Ratio (PAPR) may become more serious than in the case where the BS transmits a downlink signal. Thus, as described in FIGS. 2 and 3, the SC-FDMA scheme is used for uplink signal transmission in a different way from the OFDMA scheme used for downlink signal transmission.

Figure 4:
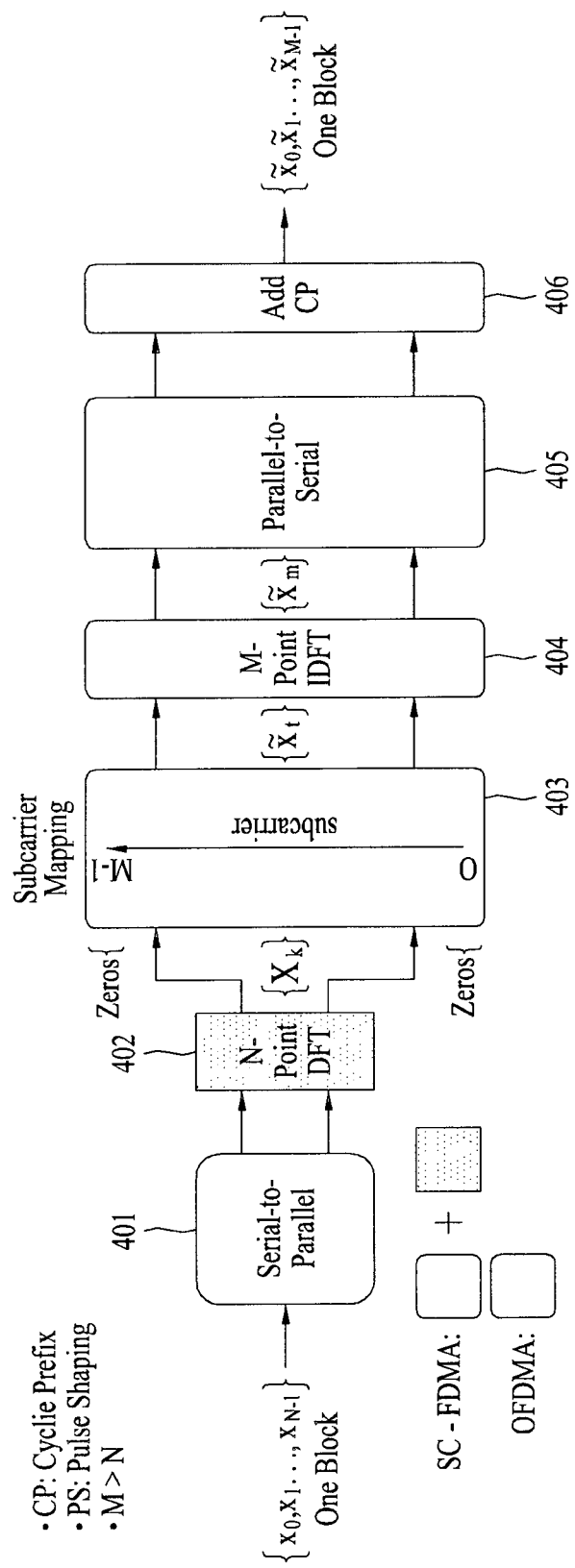
FIG. 4 is a conceptual diagram illustrating an SC-FDMA scheme and an OFDMA scheme applicable to embodiments of the present invention.

FIG. 4 is a conceptual diagram illustrating an SC-FDMA scheme and an OFDMA scheme applicable to embodiments of the present invention. In the 3GPP system, the OFDMA scheme is used in downlink and the SC-FDMA scheme is used in uplink.

Referring to FIG. 4, not only a UE for uplink signal transmission but also a BS for downlink signal transmission includes a Serial-to-Parallel converter 401, a subcarrier mapper 403, an M-point IDFT module 404 and a Cyclic Prefix (CP) addition module 406. However, a UE for transmitting a signal using the SC-FDMA scheme further includes an N-point DFT module 402, and compensates for a predetermined part of the IDFT processing influence of the M-point IDFT module 1504 so that a transmission signal can have single carrier characteristics (i.e., single-carrier properties).

The SC-FDMA must satisfy single carrier characteristics. FIG. 5 shows examples for satisfying single carrier characteristics and mapping an input symbol to a subcarrier in a frequency domain. In FIG. 5(a) or 5(b), if a DFT-processed symbol is assigned to a subcarrier, a transmission signal satisfying single carrier characteristics can be obtained. FIG. 5(a) shows a localized mapping method, and FIG. 5(b) shows a distributed mapping method.

Figure 6:
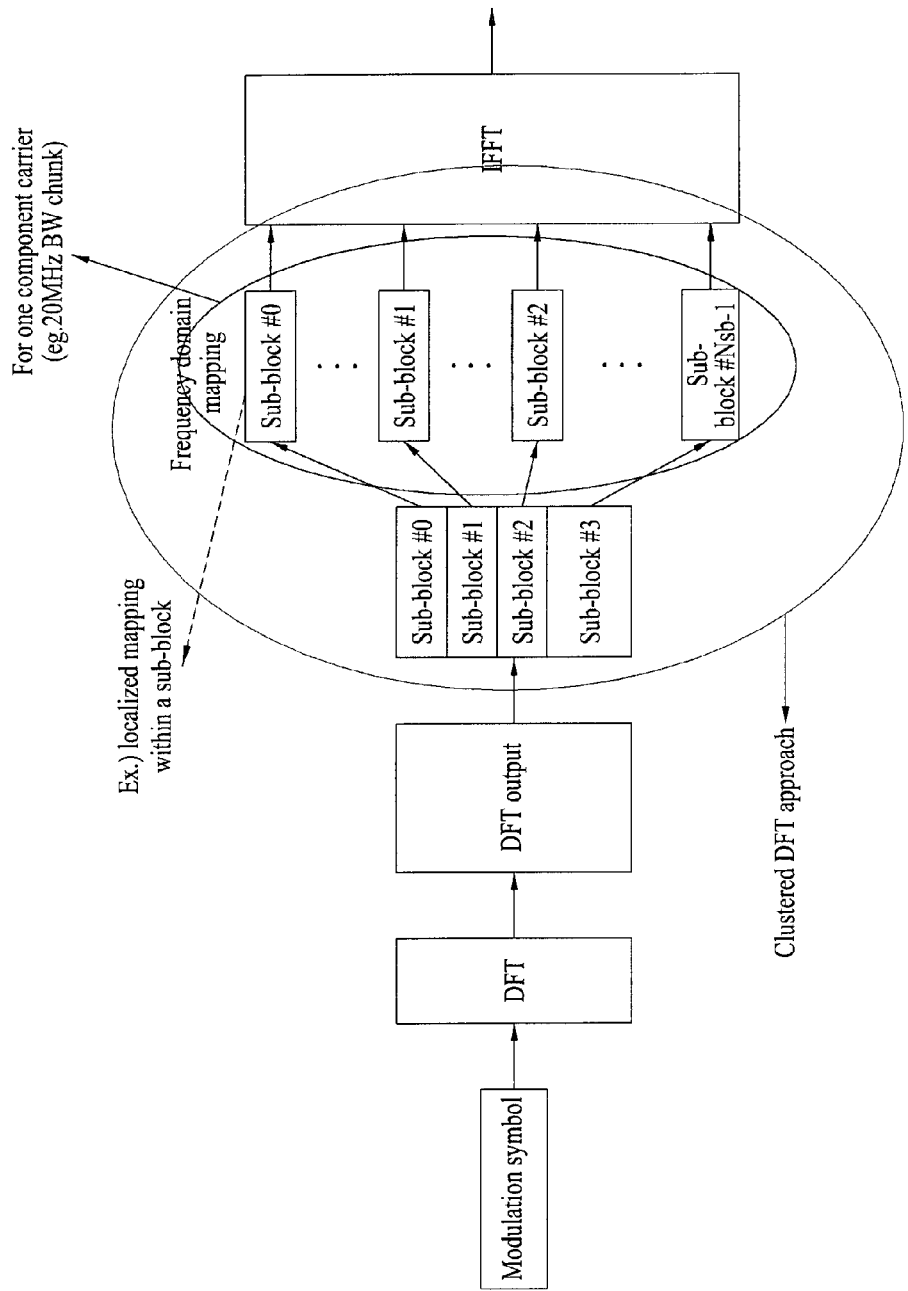
FIG. 6 is a conceptual diagram illustrating the signal processing for mapping DFT process output samples to a single carrier in a clustered SC-FDMA.
Figure 7:
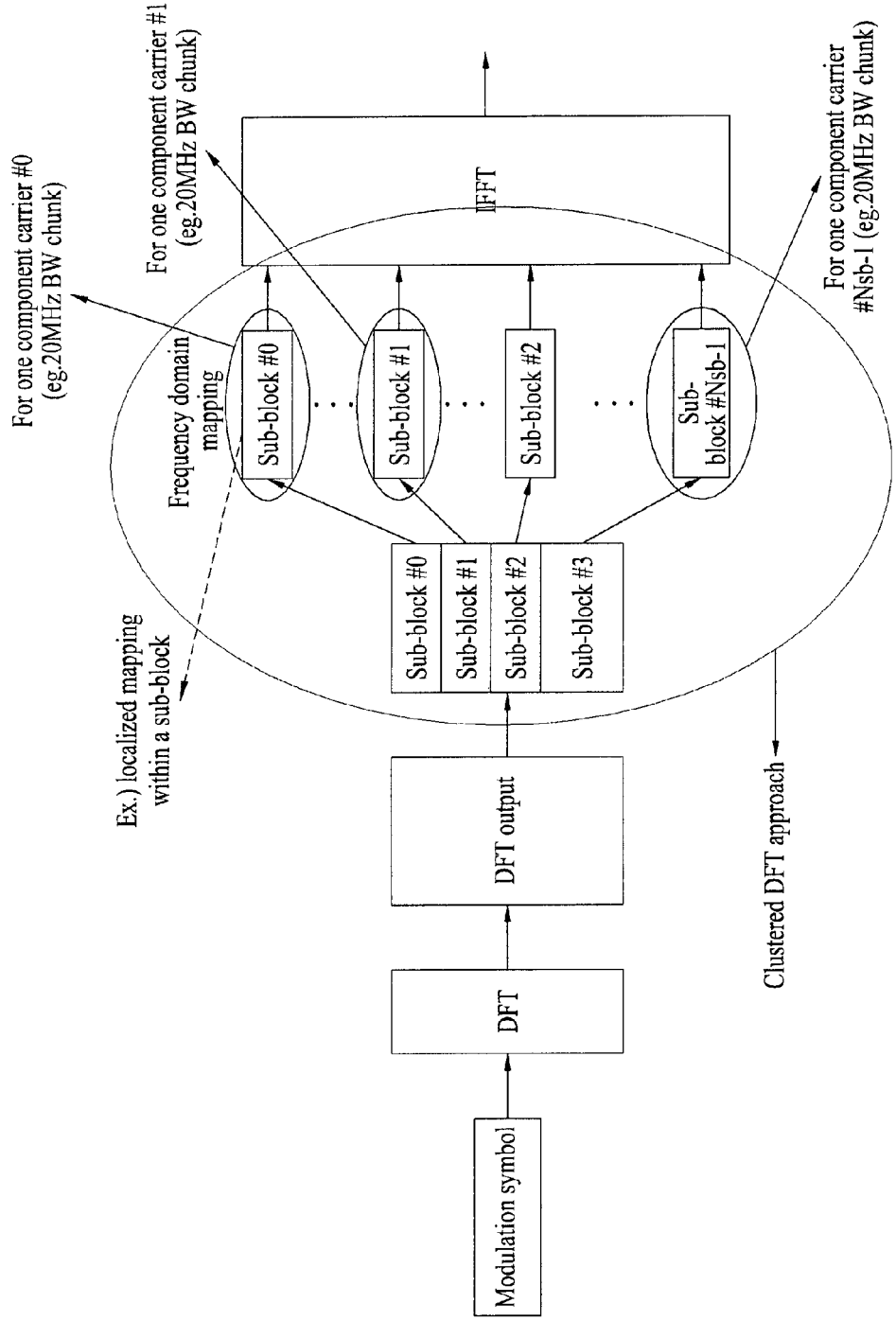
FIGS. 7 and 8 show the signal processing in which DFT process output samples are mapped to multiple carriers in a clustered SC-FDMA.
Figure 8:
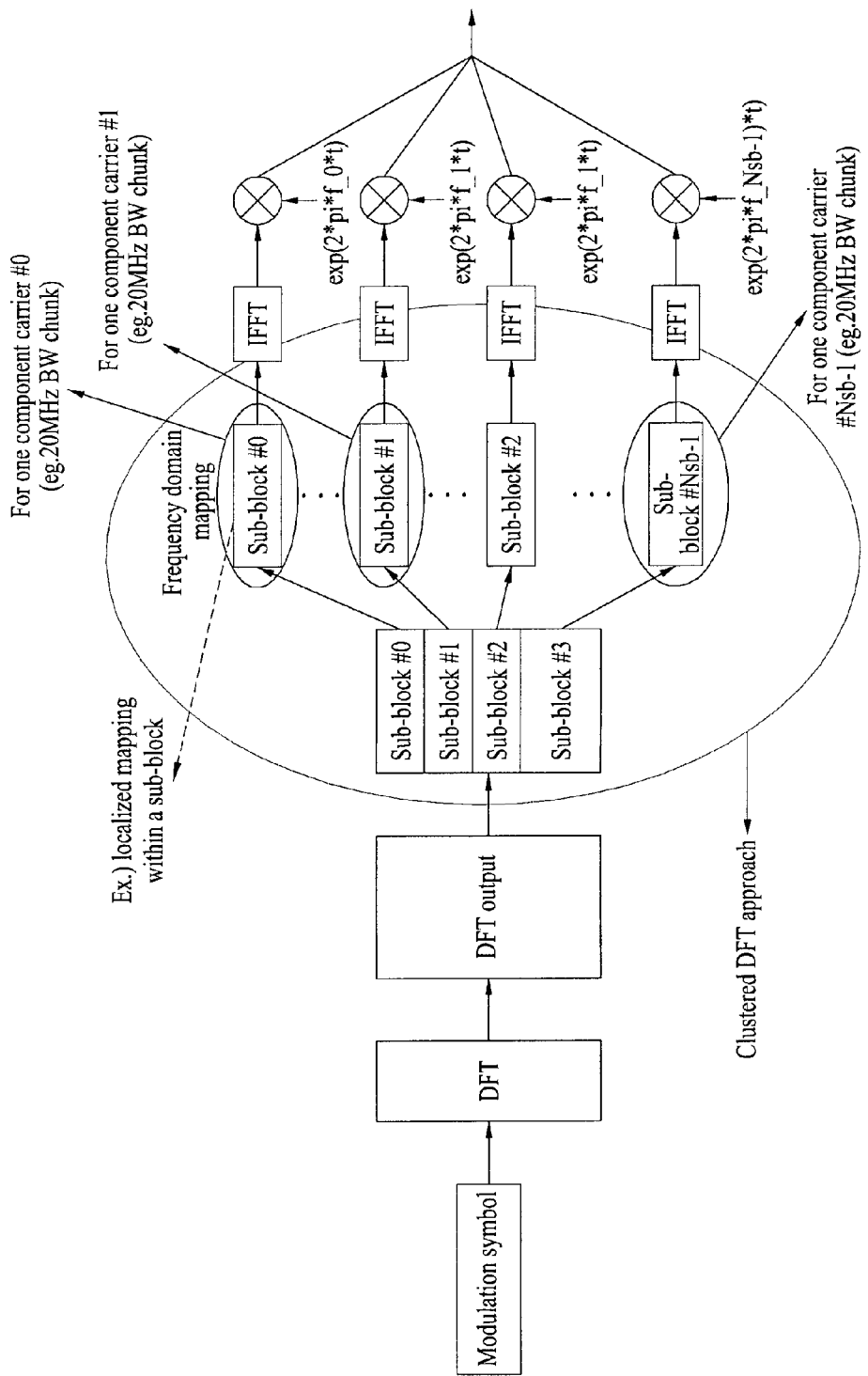

On the other hand, the clustered DFT-s-OFDM scheme may be adapted to the transmitter 100a or 100b. The clustered DFT-s-OFDM is considered to be a modification of the conventional SC-FDMA scheme. In more detail, a signal output from the precoder is divided into some sub-blocks, and the divided sub-blocks are discontinuously mapped to subcarriers. FIGS. 6 to 8 show examples for mapping an input symbol to a single carrier by a clustered DFT-s-OFDM.

FIG. 6 shows signal processing in which DFT-process output samples are mapped to one carrier in the clustered SC-FDMA. FIGS. 7 and 8 show signal processing in which DFT process output samples are mapped to multicarriers in a clustered SC-FDMA. FIG. 6 shows the example of intra-carrier cluster SC-FDMA application. FIGS. 7 and 8 show examples of the inter-carrier clustered SC-FDMA application. FIG. 7 shows the example in which a signal is generated through a single IFFT block under the condition that component carriers are contiguously allocated to a frequency domain and the subcarrier spacing between contiguous component carriers is arranged. FIG. 8 shows another example in which a signal is generated through several IFFT blocks under the condition that component carriers are non-contiguously allocated to a frequency domain.

Figure 9:
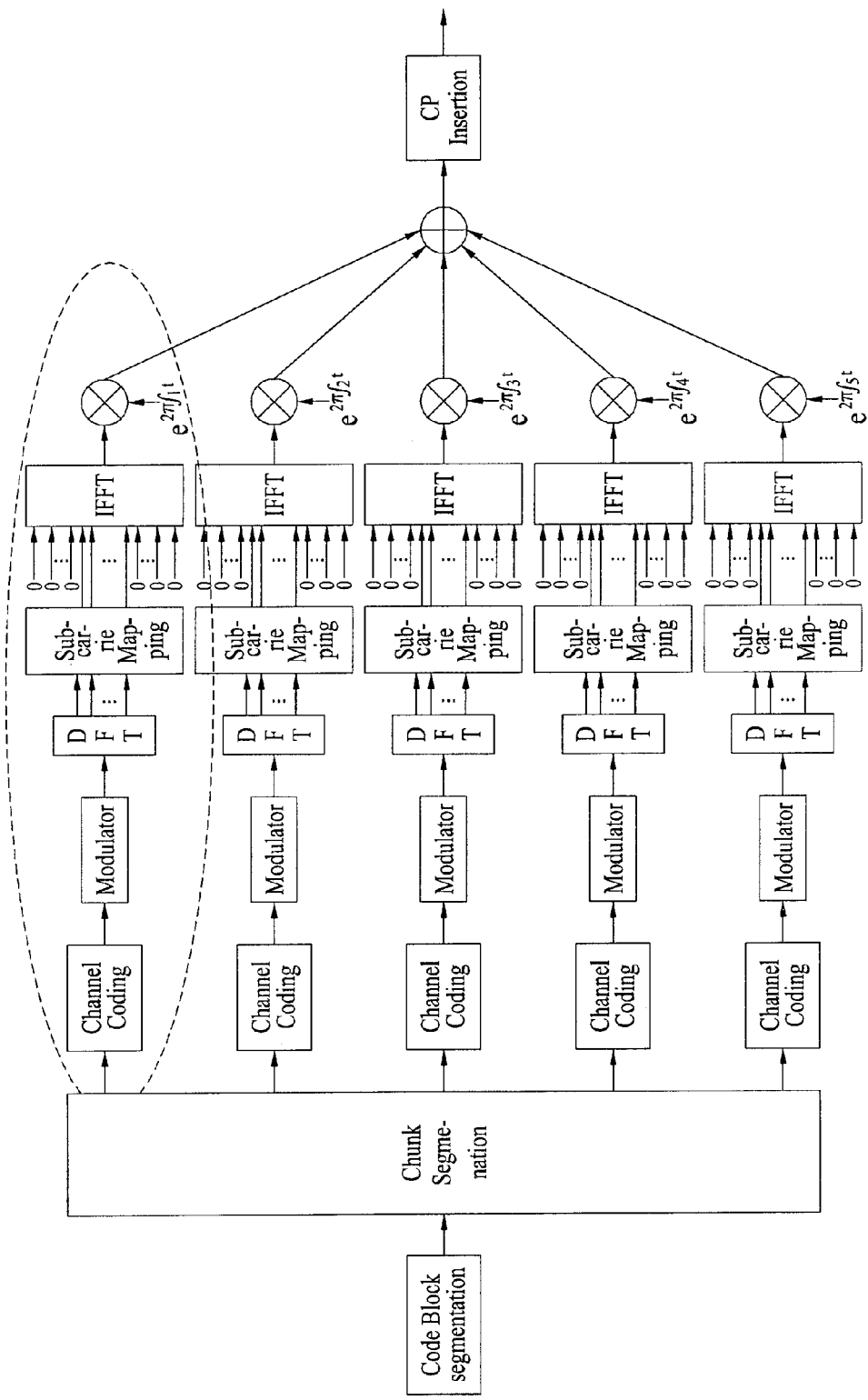
FIG. 9 shows exemplary segmented SC-FDMA signal processing.

FIG. 9 shows exemplary segmented SC-FDMA signal processing.

The segmented SC-FDMA to which the same number of IFFTs as an arbitrary number of DFTs is applied may be considered to be an extended version of the conventional SC-FDMA DFT spread and the IFFT frequency subcarrier mapping structure because the relationship between DFT and IFFT is one-to-one basis. If necessary, the segmented SC-FDMA may also be represented by NxSC-FDMA or NxDFT-s-OFDMA. For convenience of description and better understanding of the present invention, the segmented SC-FDMA, NxSC-FDMA and NxDFT-s-OFDMA may be generically referred to as 'segment SC-FDMA'. Referring to FIG. 9, in order to reduce single carrier characteristics, the segment SC-FDMA groups all the time domain modulation symbols into N groups, such that a DFT process is performed in units of a group.

Figure 10:
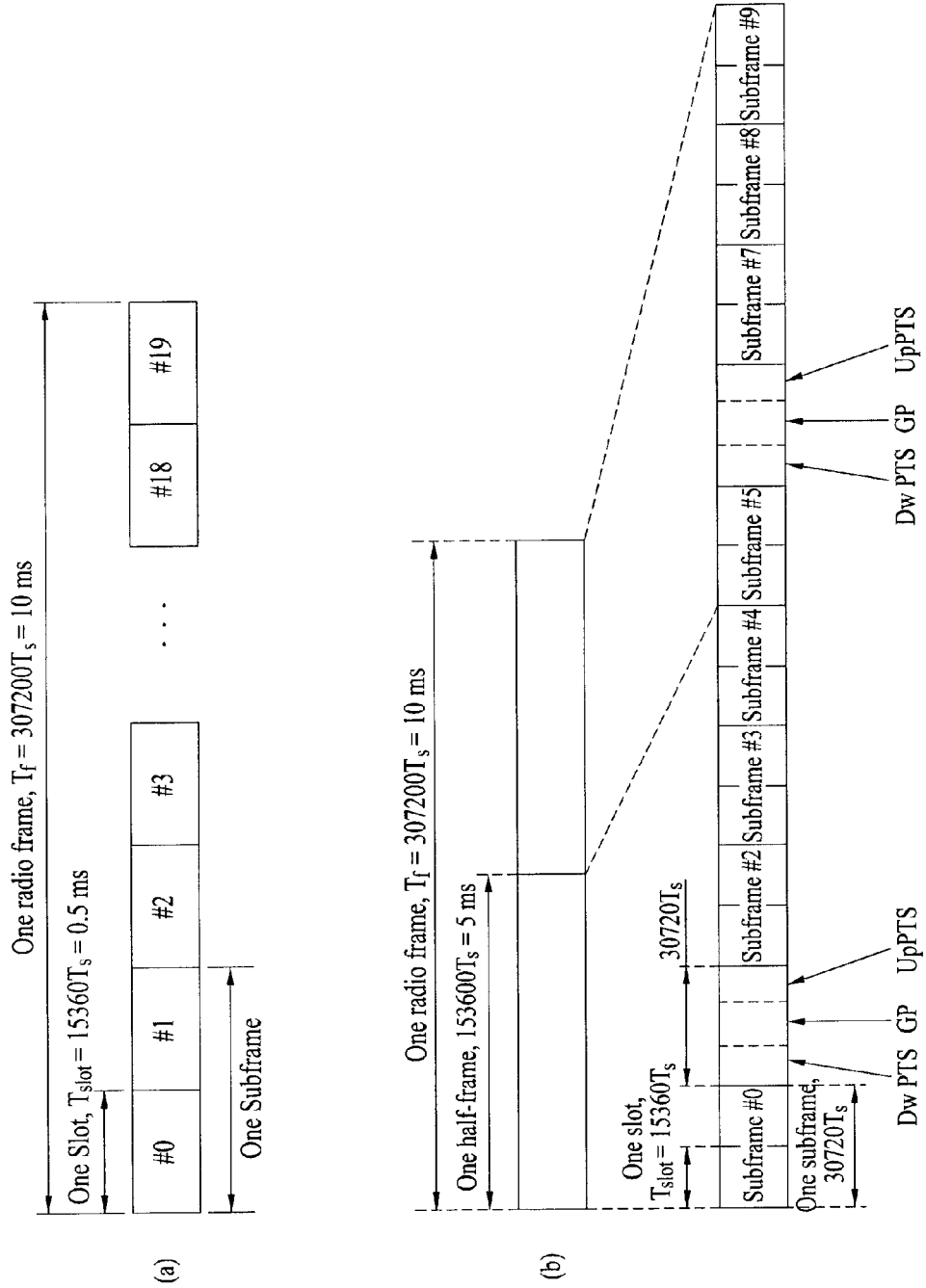
FIG. 10 shows exemplary radio frames for use in a wireless communication system.

FIG. 10 illustrates an exemplary structure of a radio frame in a wireless communication system. Particularly, FIG. 10(a) illustrates a radio frame according to a Frame Structure type 1 (FS-1) of a 3GPP LTE/LTE-A system, and FIG. 10(b) illustrates a radio frame according to a Frame Structure type 2 (FS-2) of the 3GPP LTE/LTE-A system. The frame structure of FIG. 10(a) may be applied to a Frequency Division Duplexing (FDD) mode and a half-FDD (H-FDD) mode. The frame structure of FIG. 10(b) may be applied to a Time Division Duplexing (TDD) mode.

Referring to FIG. 10, a 3GPP LTE/LTE-A radio frame is 10 ms (307,200$T_s$) in duration. The radio frame is divided into 10 equally-sized subframes, each subframe being 1 ms long. Subframe numbers may be assigned to the 10 subframes within the radio frame, respectively. For example, the 10 subframes may be sequentially numbered from 0 to 9. $T_s$ represents a sampling time and is given as $T_s=1/(2048\times15$ kHz). Each subframe is further divided into two slots, each 0.5 ms in duration. 20 slots are sequentially numbered from 0 to 19. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may be differently constructed according to a duplex mode. For example, in the FDD mode, DL transmission and UL transmission are discriminated according to a frequency, such that the radio frame includes only one of a DL subframe and a UL subframe in a time domain.

On the other hand, in the TDD mode, DL transmission and UL transmission are discriminated according to time, such that subframes contained in a frame may be classified into DL subframes and UL subframes. Table 1 shows an exemplary UL-DL construction in a TDD mode.

Figure 11:
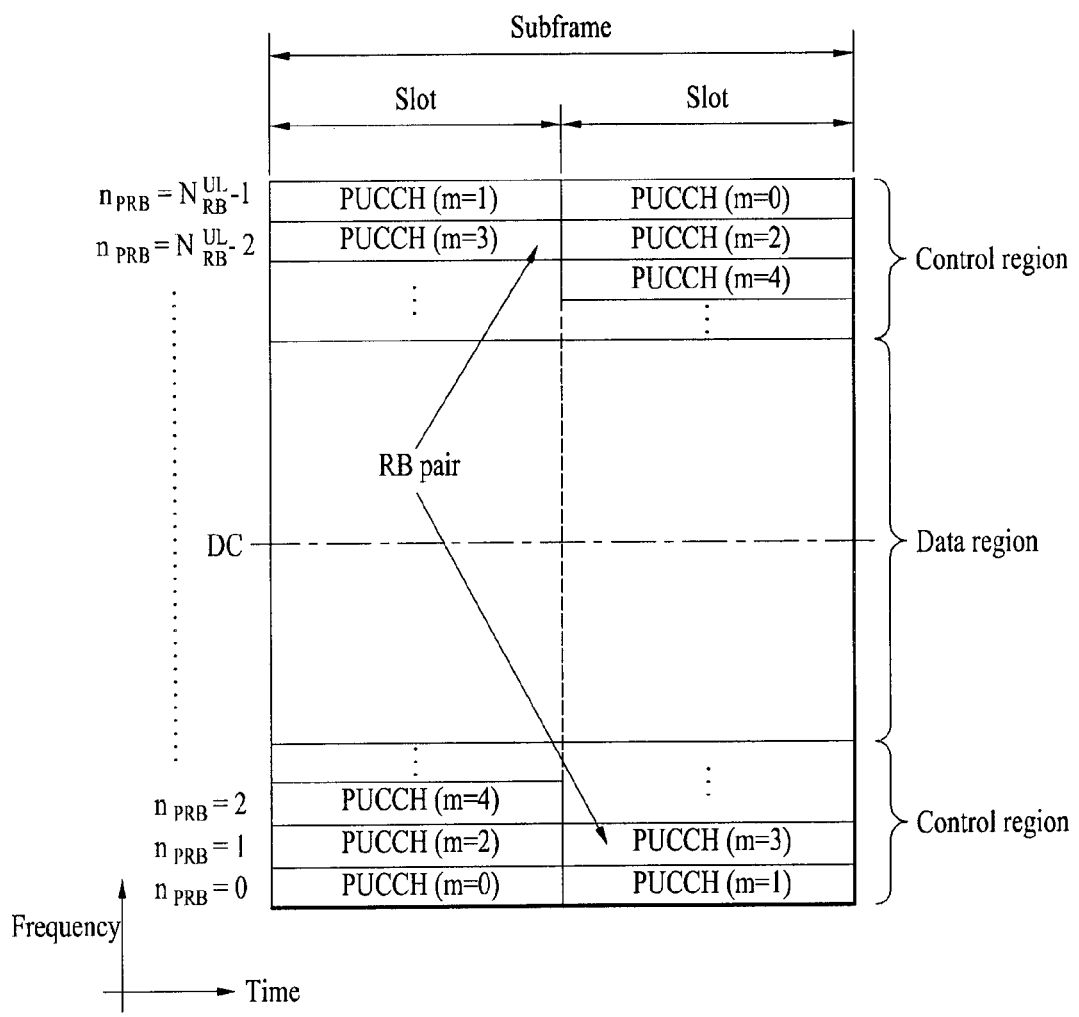
FIG. 11 shows an uplink subframe structure.

FIG. 11 shows an uplink subframe structure according to the present invention. Referring to FIG. 11, the uplink subframe may be divided into a control region and a data region in a frequency domain. At least one Physical Uplink Control Channel (PUCCH) carrying uplink control information (UCI) may be assigned to the control region. A Physical Uplink Shared Channel (PUSCH) carrying user data may be assigned to the data region. However, in the case where the UE selects the SC-FDMA scheme in LTE Release 8 or 9, one UE does not simultaneously transmit PUCCH and PUSCH so as to maintain single carrier characteristics.

Uplink control information (UCI) transmitted over PUCCH has different sizes and usages according to a PUCCH format. In addition, UCI may have different sizes according to a code rate. For example, the following PUCCH format may be defined.

(1) PUCCH Format 1: Used for On-Off keying (OOK) modulation and Scheduling Request (SR)

(2) PUCCH Formats 1a and 1b: Used for transmission of Acknowledgment/Negative Acknowledgment (ACK/NACK) information 1) PUCCH Format 1a: BPSK-modulated ACK/NACK information of 1 bit
2) PUCCH Format 1b: QPSK-modulated ACK/NACK information of 2 bits
3) PUCCH Format 2: Used for QPSK modulation and CQI transmission
4) PUCCH Formats 2a and 2b: Used for simultaneous transmission of CQI and ACK/NACK information Table 1 shows modulation schemes and the numbers of bits per subframe according to different PUCCH formats, Table 2 shows the numbers of reference symbols (RSs) per slot for the PUCCH formats, and Table 3 shows the locations of SC-FDMA symbols of RSs according to the PUCCH formats. In Table 1, PUCCH Formats 2a and 2b may correspond to a normal CP.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 2

| PUCCH format | Normal CP | Extended CP |
|---|---|---|
| 1, 1a, 1b | 3 | 2 |
| 2 | 2 | 1 |
| 2a, 2b | 2 | N/A |

TABLE 3

| PUCCH format | SC-FDMA symbol locations of RS | |
|---|---|---|
|  | Normal CP | Extended CP |
| 1, 1a, 1b | 2, 3, 4 | 2, 3 |
| 2, 2a, 2b | 1, 5 | 3 |

In a UL subframe, subcarriers distant from a DC (Direct Current) subcarrier may be used as a control region. In other words, subcarriers located at both ends of a UL transmission bandwidth are assigned to UL control information transmission. DC subcarriers are reserved without being used in signal transmission, and are mapped to a carrier frequency ($f_0$) in a frequency upconversion process caused by the OFDM/SC-FDMA signal generator.

A PUCCH for a UE is allocated to an RB pair in a subframe. The RBs of the RB pair occupy different subcarriers in two slots. This is called frequency hopping of an RB pair allocated to a PUCCH over a slot boundary. However, if the frequency hopping is not used, an RB pair occupies the same subcarriers. Irrespective of the frequency hopping, a PUCCH for one UE is assigned to an RB pair contained in one subframe, such that the same PUCCH is transmitted once through one RB in each slot contained in one UL subframe in such a manner that the same PUCCH is transmitted two times in each slot of one UL subframe.

Hereinafter, an RB pair used for PUCCH transmission of one subframe is called a PUCCH region. In addition, the PUCCH region and codes used in the PUCCH region are called a PUCCH resource. In other words, different PUCCH resources may have different PUCCH regions or may have different codes within the same PUCCH region. For convenience of description, a PUCCH carrying ACK/NACK information is called 'ACK/NACK PUCCH', a PUCCH carrying CQI/PMI/RI information is called a Channel State Information (CSI) PUCCH, and a PUCCH carrying the SR is called an SR PUCCH.

The UE receives PUCCH resources for UCI transmission from the BS according to the explicit or implicit scheme.

Uplink Control Information (UCI) such as ACK/NACK (acknowledgement/negative acknowledgement), Channel Quality Indicator (CQI), Precoding Matrix Indicator (PMI), Rank Information (RI), Scheduling Request (SR), etc. may be transmitted over a control region of the UL subframe.

In a wireless communication system, the BS and the UE mutually transmit/receive signals or data. If the BS transmits data to the UE, the UE decodes the received data. If the data is successfully decoded, ACK is transmitted to the BS. If data decoding fails, NACK is transmitted to the BS. The above-mentioned concept is also applied to the other case for data transmission from the UE to the BS without any change. In the 3GPP LTE system, the UE receives data (e.g., PDSCH) from the BS, and transmits PDSCH ACK/NACK to the BS through implicit PUCCH resources decided by PDCCH resources carrying PDSCH scheduling information. If the UE does not receive data, this may be considered to be a discontinuous transmission (DTX) state, may indicate the absence of data received by a predetermined rule, or may also be carried out in the same manner as in NACK (indicating unsuccessful decoding of reception data).

Figure 12:
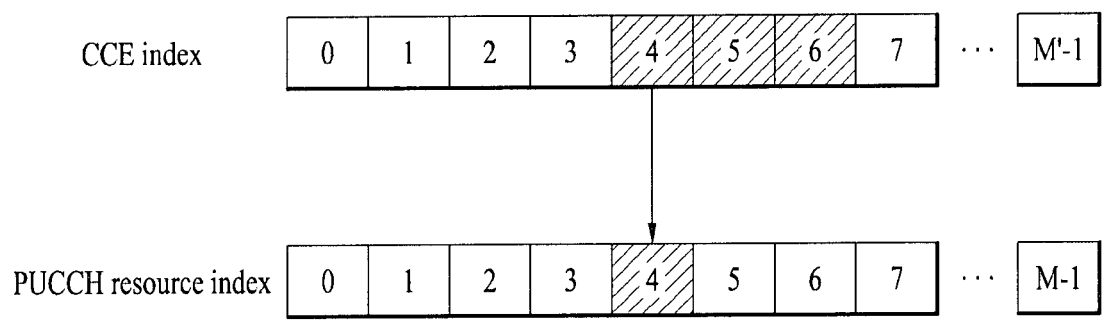
FIG. 12 shows an example for deciding PUCCH resources for ACK/NACK.

FIG. 12 shows an example for deciding PUCCH resources for ACK/NACK.

In the LTE system, PUCCH resources for the ACK/NACK are not pre-allocated to each UE, and several UEs located in the cell are configured to divisionally use several PUCCH resources at every time point. In more detail, PUCCH resources used for ACK/NACK transmission of a UE are implicitly determined on the basis of a PDCCH that carries scheduling information of a PDSCH carrying the corresponding DL data. The entire region to which a PDCCH is transmitted in each DL subframe is comprised of a plurality of Control Channel Elements (CCEs), and a PDCCH transmitted to the UE is comprised of one or more CCEs. Each CCE includes a plurality of Resource Element Groups (REGs) (e.g., 9 REGs). One REQ may includes neighbor or contiguous REs under the condition that a reference signal (RS) is excluded. The UE may transmit ACK/NACK through implicit PUCCH resources that are derived or calculated by a function of a specific CCE index (e.g., first or lowest CCE index) from among CCEs constructing a PDCCH received by the UE.

Referring to FIG. 12, each PUCCH resource index may correspond to PUCCH resources for ACK/NACK. As can be seen from FIG. 12, if it is assumed that PDSCH scheduling information is transmitted to the UE through a PDCCH composed of 4~6-indexed CCEs (i.e., NOs. 4, 5, 6 CCEs), the UE transmits ACK/NACK to the BS through the 4-indexed PUCCH corresponding to a CCE having the lowest index (i.e., No. 4 CCE) constructing the PDCCH.

FIG. 12 shows the example in which a maximum of M' CCEs is present in a DL and a maximum of M PUCCHs is present in a UL. Although M' may be identical to M (M'=M), M' may be different from M as necessary, and CCE resource mapping may overlap with PUCCH resource mapping as necessary. For example, PUCCH resource index may be determined as shown in the following Equation 1.

$$n_{PUCCH}^{(1)} = n_{CCE} + N_{PUCCH}^{(1)}$$ [Equation 1]

In Equation 1, $n^{(1)}_{PUCCH}$ is a PUCCH resource index for PUCCH formats 1/1a/1b, $N^{(1)}_{PUCCH}$ is a signaling value received from a higher layer, and $n_{CCE}$ may be the smallest value from among CCE indexes used for PDCCH transmission.

Figure 13:
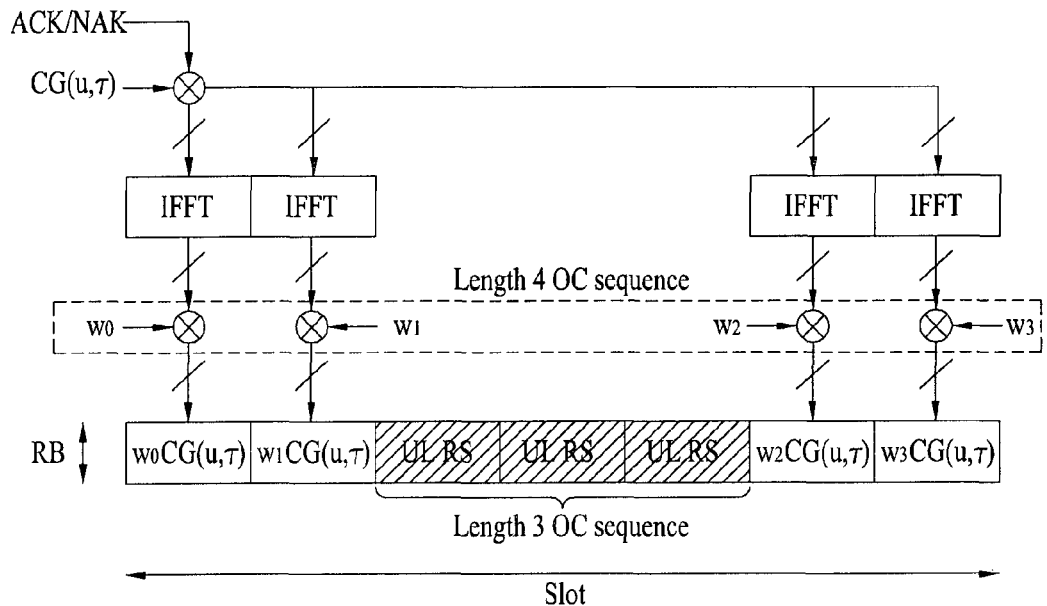
FIGS. 13 and 14 exemplarily show slot level structures of a PUCCH format 1a and 1b structure for ACK/NACK transmission.
Figure 14:
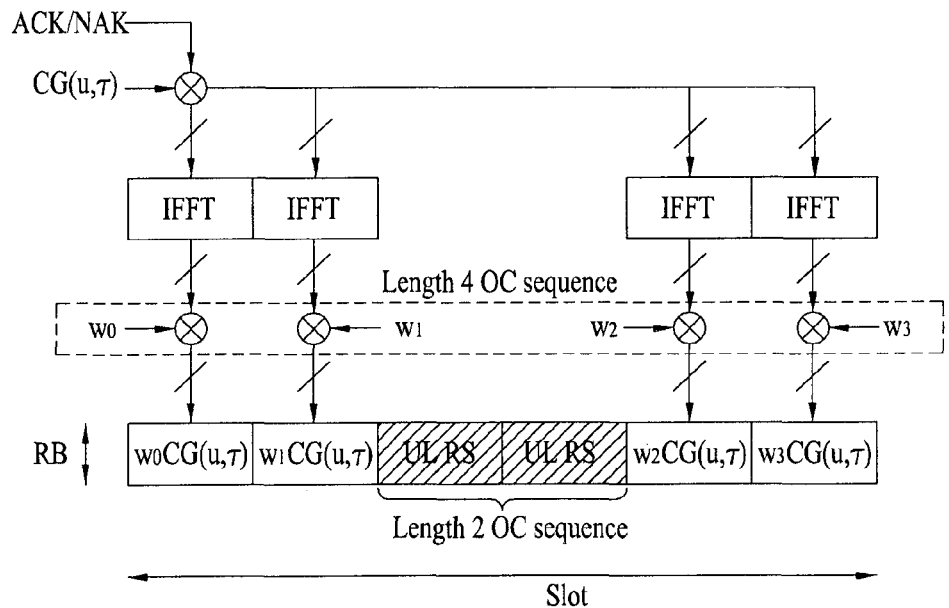

FIGS. 13 and 14 exemplarily show slot level structures of PUCCH formats 1a and 1b.

FIG. 13 shows the PUCCH formats 1a and 1b structure in case of a normal CP. FIG. 13 shows the PUCCH formats 1a and 1b structure in case of the extended CP. In the PUCCH formats 1a and 1b structure, the same control information may be repeated in slot units within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of CSs is 6 and the number of OCs is 3, a total of 18 UEs may be multiplexed in the same PRB on the basis of one antenna. Orthogonal sequences (w0, w1, w2, w3) may be applied to either an arbitrary time domain (after FFT modulation) or an arbitrary frequency domain (before FFT modulation). The PUCCH format 1 slot level structure for Scheduling Request (SR) transmission may be identical to the PUCCH formats 1a and 1b, but the PUCCH format 1 slot level structure and the PUCCH format 1a and 1b structure have different modulation methods.

For ACK/NACK feedback for SR transmission and semi-persistent scheduling (SPS), PUCCH resources composed of CS, CC and PRB may be assigned to the UE through RRC signaling. As previously illustrated in FIG. 12, not only for dynamic ACK/NACK (or ACK/NACK for non-persistent scheduling) feedback but also for ACK/NACK feedback for a PDCCH indicating SPS release, PUCCH resources may be implicitly assigned to the UE using either a PDCCH corresponding to the PDSCH or the lowest or smallest CCE index of a PDCCH indicating the SPS release.

Figure 15:
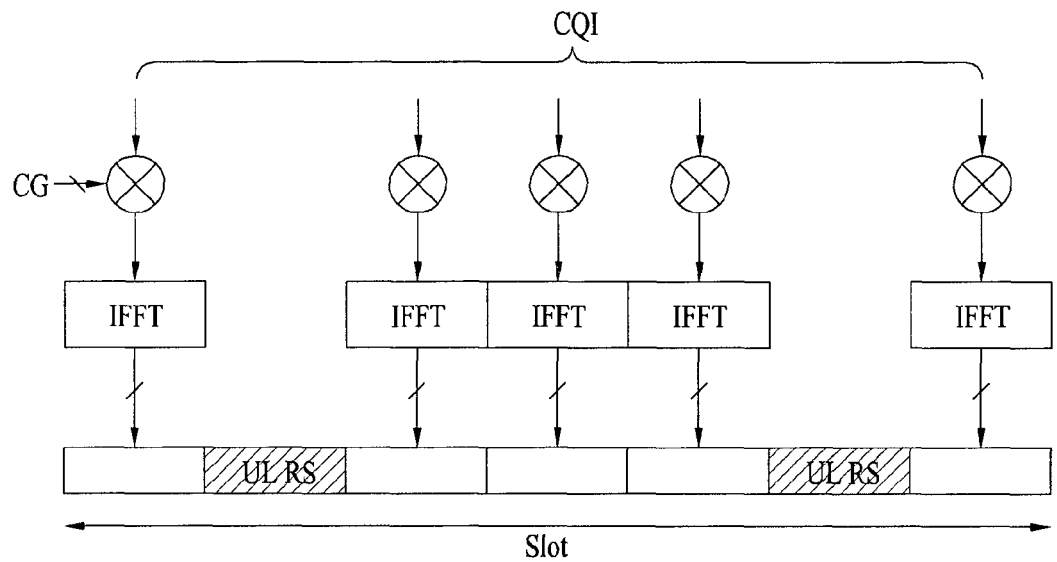
FIG. 15 shows a PUCCH format 2/2a/2b structure for a normal cyclic prefix.
Figure 16:
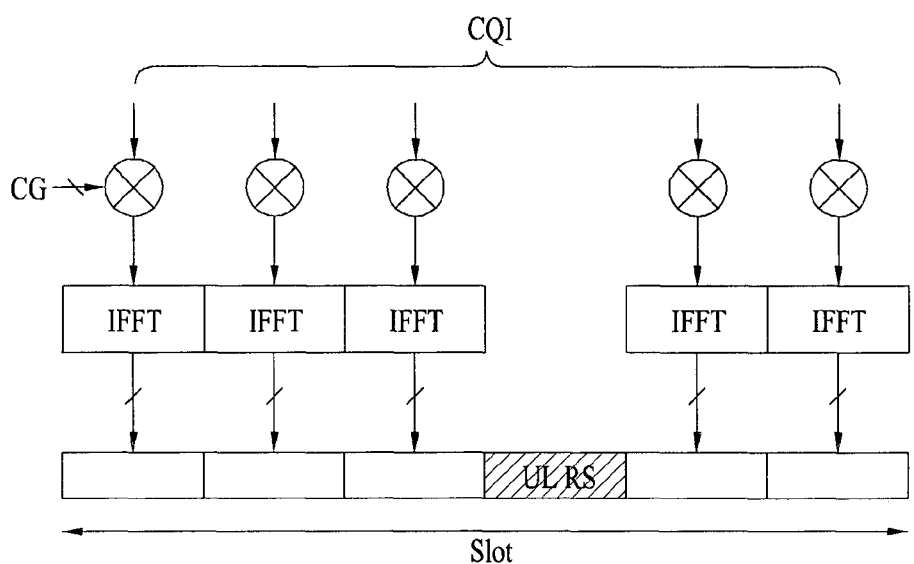
FIG. 16 shows a PUCCH format 2/2a/2b structure for an extended cyclic prefix.

FIG. 15 shows PUCCH formats 2/2a/2b in the normal CP case. FIG. 16 shows PUCCH formats 2/2a/2b in the extended CP case. Referring to FIGS. 15 and 16, one subframe includes 10 QPSK data symbols in addition to an RS symbol in the normal CP case. Each QPSK symbol is spread in a frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in the PUCCH formats 1/1a/1b and 2/2a/2b, a plurality of UEs may be multiplexed by CS+OC+PRB and CS+PRB.

Length-4 and length-3 OCs for PUCCH formats 1/1a/1b are shown in the following Tables 4 and 5.

TABLE 4

| Sequence index | Orthogonal sequences |
|---|---|
| 0 | [+1 +1 +1 +1] |
| 1 | [+1 −1 +1 −1] |
| 2 | [+1 −1 −1 +1] |

TABLE 5

| Sequence index | Orthogonal sequences |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The OCs for the RS in the PUCCH formats 1/1a/1b is shown in Table 6.

TABLE 6

| Sequence index | Orthogonal sequences | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Resource $n_r$ for the PUCCH formats 1/1a/1b includes the following combination.

(1) CS (=DFT OC in a symbol level) ($n_{cs}$)
(2) OC (OC in a slot level) ($n_{oc}$)
(3) frequency RB ($n_{rb}$)

When indexes representing the CS, the OC and the RB are respectively $n_{cs}$, $n_{oc}$ and $n_{rb}$, a representative index $n_r$ includes $n_{cs}$, $n_{oc}$ and $n_{rb}$. $n_r$ satisfies $n_r = (n_{cs}, n_{oc}, n_{rb})$.

A CQI, a PMI, a RI, and a combination of a CQI and ACK/NACK may be transmitted through the PUCCH formats 2/2a/2b. Reed Muller (RM) channel coding may be applied.

For example, in an LTE system, channel coding for a UL CQI is described as follows. A bit stream $a_0$, $a_1$, $a_2$, $a_3$, ..., $a_{A-1}$ is channel-coded using a (20, A) RM code. Table 7 shows a base sequence for the (20, A) code. $a_0$ and $a_{A-1}$ represent a Most Significant Bit (MSB) and a Least Significant Bit (LSB), respectively. In the extended CP case, a maximum information bit number is 11 except for the case where the CQI and the ACK/NACK are simultaneously transmitted. After the bit stream is coded to 20 bits using the RM code, QPSK modulation may be applied. Before QPSK modulation, coded bits may be scrambled.

TABLE 7

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 1 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

FIG. 17 is a diagram explaining ACK/NACK channelization for the PUCCH formats 1a and 1b. FIG. 17 shows the case of $\Delta_{shift}^{PUCCH}=2$.

Figure 18:
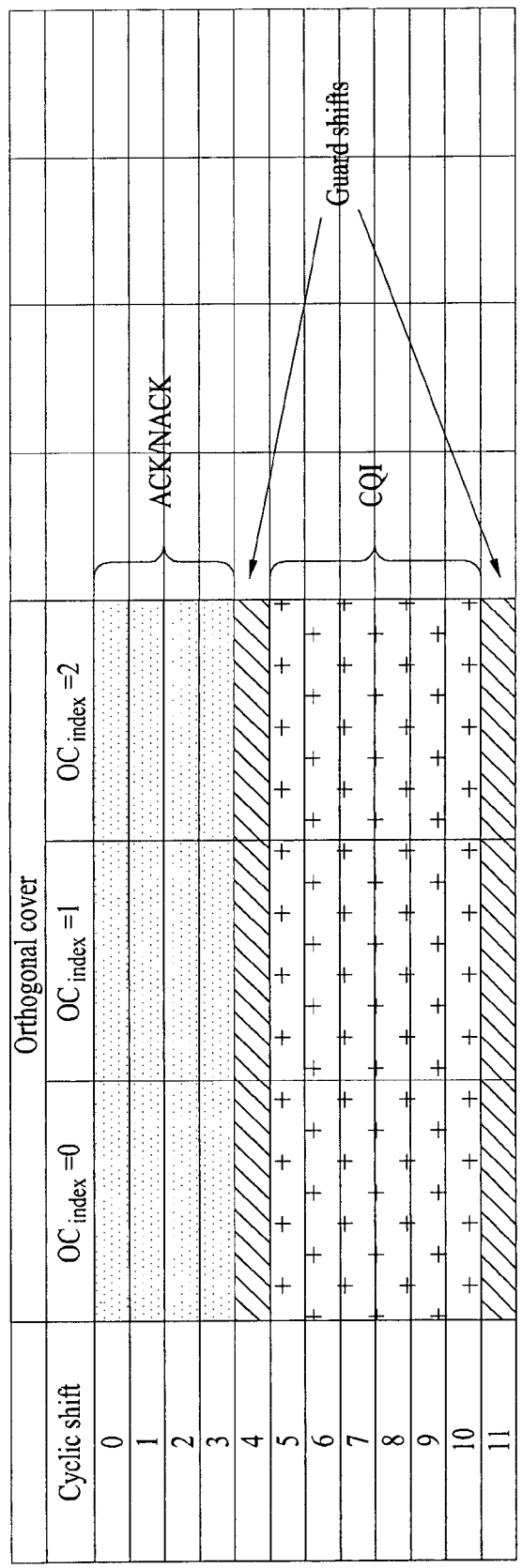
FIG. 18 is a diagram showing channelization of a structure in which PUCCH formats 1/1a/1b and PUCCH formats 2/2a/2b are mixed within the same PRB.

FIG. 18 is a diagram showing channelization of a structure in which PUCCH formats 1/1a/1b and PUCCH formats 2/2a/2b are mixed within the same PRB.

CS (Cyclic Shift) hopping and OC (Orthogonal Cover) remapping may be applied as follows.

(1) Symbol-based cell-specific CS hopping for inter-cell interference randomization (2) Slot level CS/OC remapping 1) For inter-cell interference randomization 2) Slot-based access for mapping between ACK/NACK channels and resources (k)

QPSK modulation, coded bits may be scrambled.

Channel coding bits $b_0, b_1, b_2, b_3, \ldots, b_{B-1}$ may be generated by Equation 9.

$$b_i = \sum_{n=0}^{A-1} (a_n \cdot M_{i,n}) \bmod 2 \qquad \text{[Equation 2]}$$

where, i=0, 1, 2, ..., B-1 is satisfied.

Table 8 shows an uplink control information (UCI) field for wideband report (single antenna port, transmit diversity or open loop spatial multiplexing PDSCH) CQI feedback.

TABLE 8

| Field | bandwidth |
|---|---|
| Wideband CQI | 4 |

Table 9 shows a UCI field for wideband CQI and PMI feedback. The field reports closed loop spatial multiplexing PDSCH transmission.

TABLE 9

| | Bandwidth | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 10 shows a UCI field for RI feedback for wideband report.

TABLE 10

| | Bit widths | | |
|---|---|---|---|
| | | 4 antenna ports | |
| Field | 2 antenna ports | Maximum of two layers | Maximum of four layers |
| RI (Rank Indication) | 1 | 1 | 2 |

Figure 19:
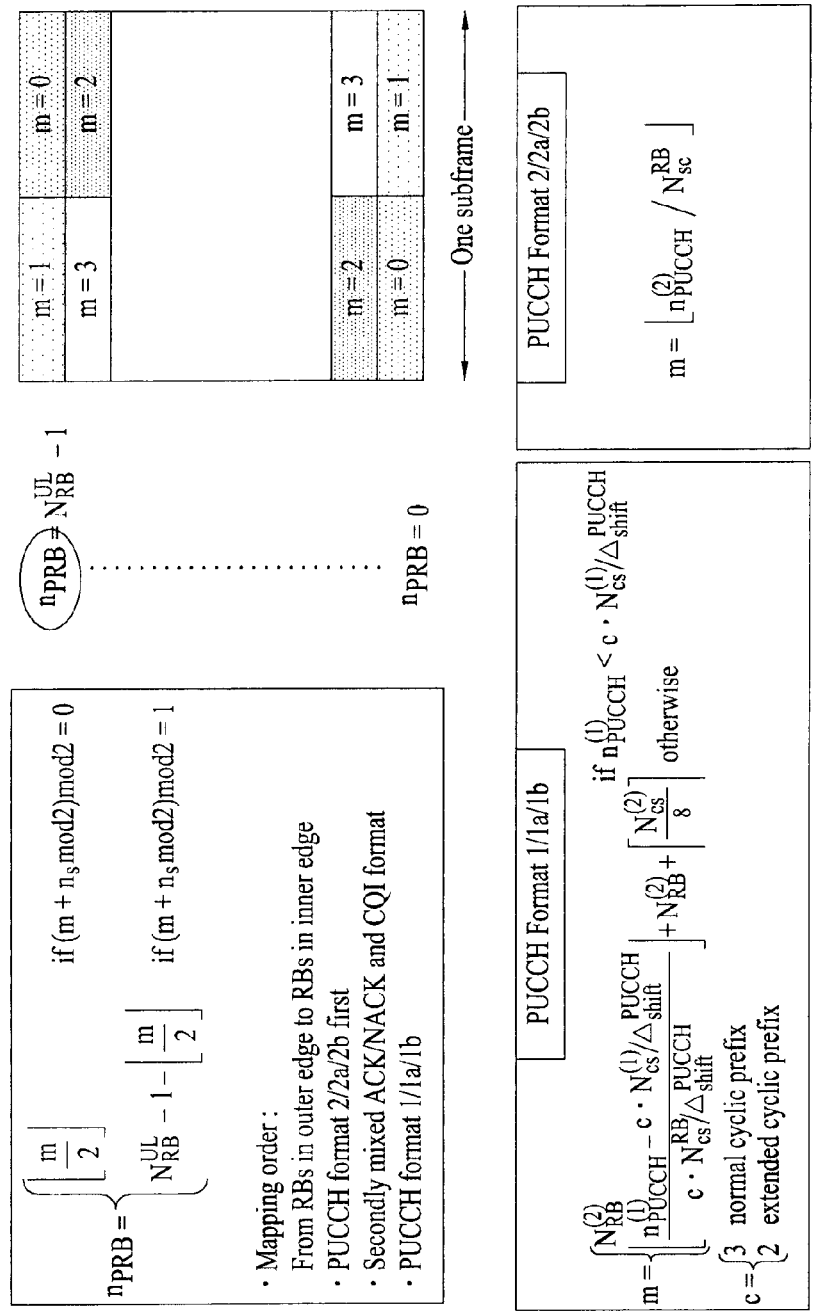
FIG. 19 is a diagram showing allocation of a physical resource allocation (PRB) used to transmit a PUCCH.

FIG. 19 shows PRB allocation: As shown in FIG. 19, the PRB may be used for PUCCH transmission in a slot $n_s$.

A multi-carrier system or a carrier aggregation system refers to a system for aggregating and utilizing a plurality of carriers having a bandwidth smaller than a target bandwidth, for wideband support. When a plurality of carriers having a bandwidth smaller than a target bandwidth is aggregated, the bandwidth of the aggregated carriers may be limited to a bandwidth used in the existing system, for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support CA. Multi-carrier may be used interchangeable with CA and bandwidth aggregation. CA may include contiguous CA and non-contiguous CA. In addition, CA may further include intra-band CA and inter-band CA.

Figure 20:
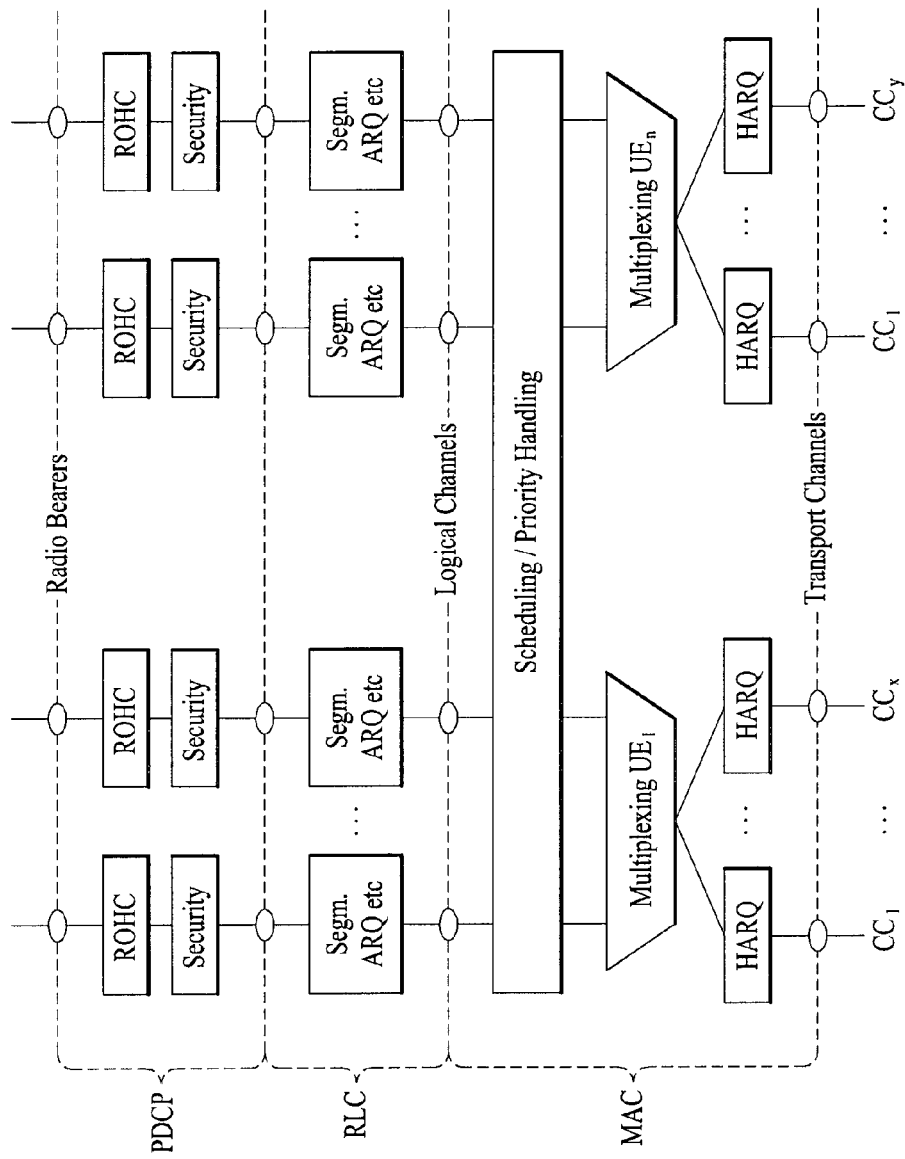
FIG. 20 is a conceptual diagram of management of a downlink component carrier (DL CC) in a base station (BS)
Figure 21:
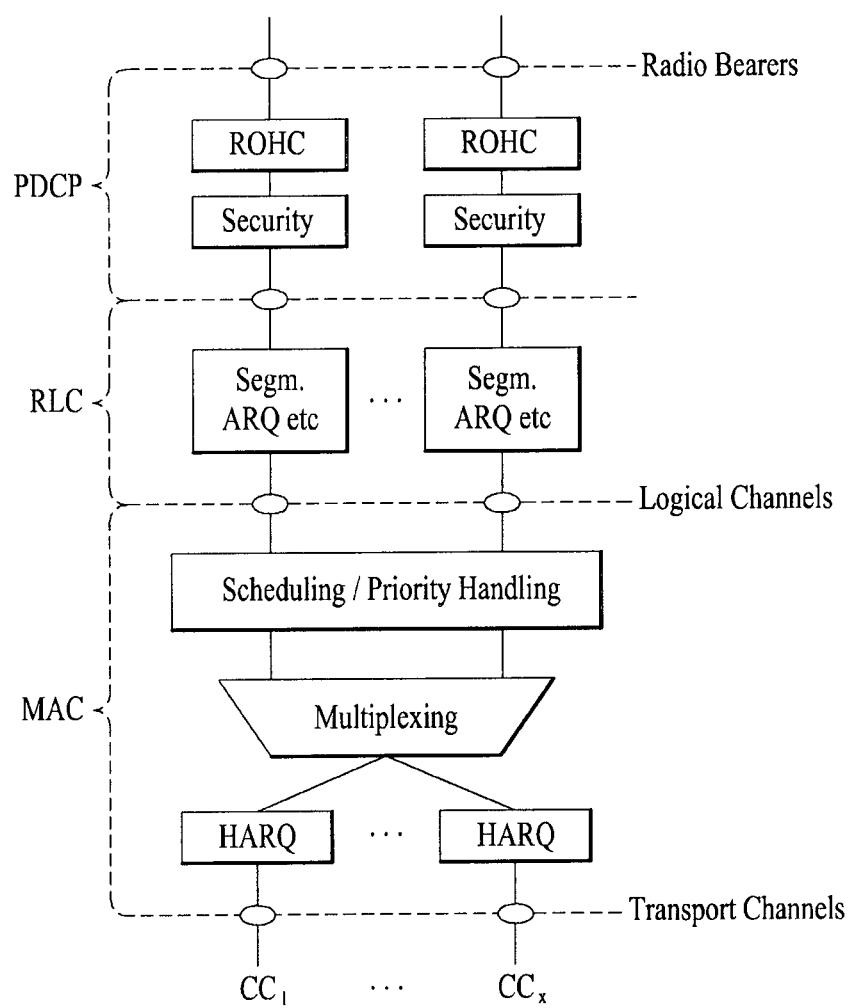
FIG. 21 is a conceptual diagram of management of an uplink component carrier (UL CC) in a user equipment (UE)

FIG. 20 is a conceptual diagram of management of a downlink component carrier (DL CC) in a base station (BS). FIG. 21 is a conceptual diagram of management of an uplink component carrier (UL CC) in a user equipment (UE). For convenience of description, the higher layer will be simplified as MAC.

Figure 22:
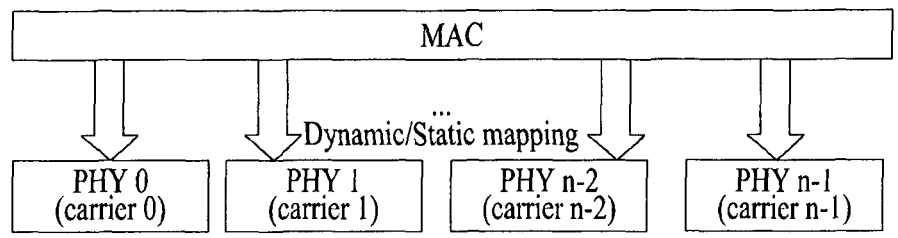
FIG. 22 is a conceptual diagram of the case where one MAC layer manages multiple carriers in a BS.
Figure 23:
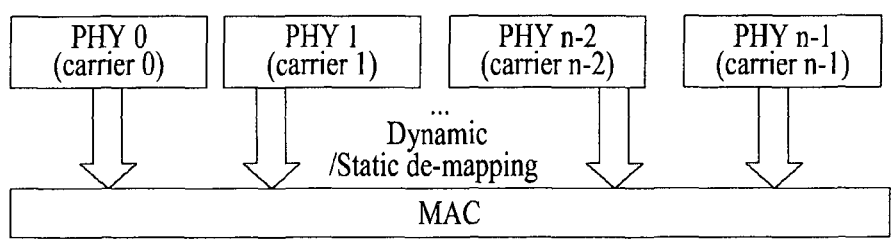
FIG. 23 is a conceptual diagram of the case where one MAC layer manages multiple carriers in a UE.

FIG. 22 is a conceptual diagram of the case where one MAC layer manages multiple carriers in a BS. FIG. 23 is a conceptual diagram of the case where one MAC layer manages multiple carriers in a UE.

Referring to FIGS. 22 and 23, one MAC manages and operates one or more frequency carriers, such that it performs transmission and reception of data. Frequency carriers managed by one MAC need not be contiguous to each other, such that they are more flexible in terms of resource management. In FIGS. 22 and 23, one PHY means one component carrier (CC) for convenience of description. One PHY may not always indicate an independent radio frequency (RF) device. Generally, although one independent RF device may indicate one PHY, the scope or spirit of the present invention is not limited thereto, and one RF device may include a plurality of PHYs.

Figure 24:
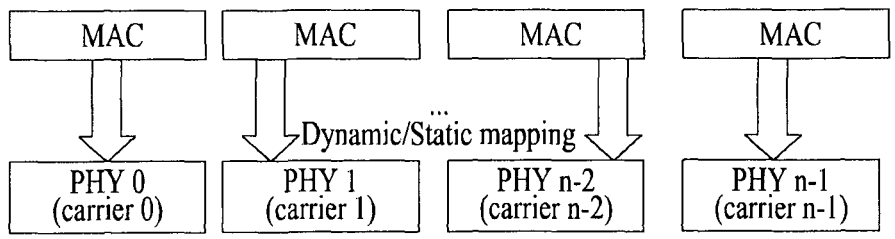
FIG. 24 is a conceptual diagram of the case where one MAC layer manages multiple carriers in a BS.
Figure 25:
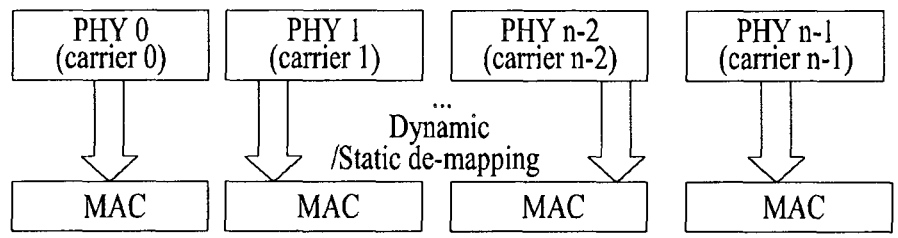
FIG. 25 is a conceptual diagram of the case where a plurality of MAC layers manages multiple carriers in a UE.
Figure 26:
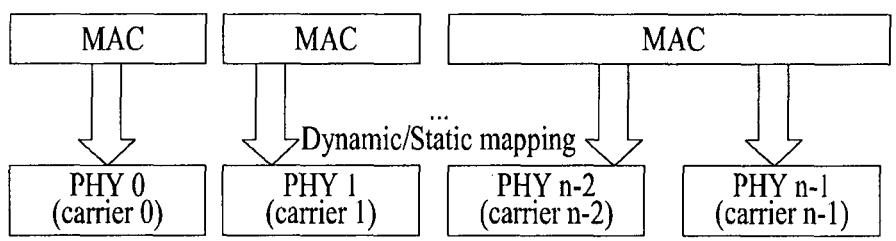
FIG. 26 is a conceptual diagram of the case where a plurality of MAC layers manages multiple carriers in a BS according to one embodiment of the present invention.
Figure 27:
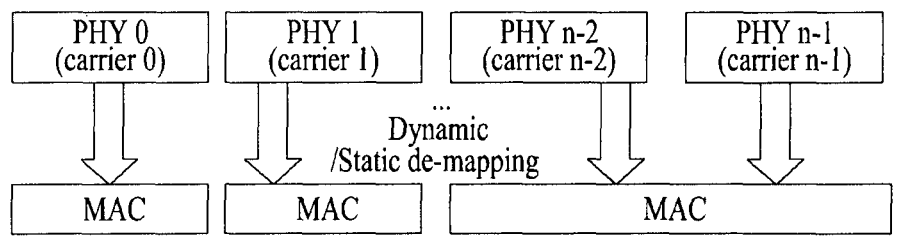
FIG. 27 is a conceptual diagram of the case where a plurality of MAC layers manages multiple carriers in a BS according to another embodiment of the present invention.

FIG. 24 is a conceptual diagram illustrating a method for enabling several MACs of a BS to manage multicarriers. FIG. 25 is a conceptual diagram illustrating a method for enabling several MACs of a UE to manage multicarriers. FIG. 26 is a conceptual diagram illustrating another method for enabling several MACS of a BS to manage multicarriers. FIG. 27 is a conceptual diagram illustrating another method for enabling several MACS of a UE to manage multicarriers.

Referring to not only the structures shown in FIGS. 22 and 23, but also the structures shown in FIGS. 24 to 27, several MACs but not one MAC may control several carriers.

As can be seen from FIGS. 24 and 25, each carrier may be controlled by each MAC on a one to one basis. As can be seen from FIGS. 26 and 27, each of some carriers may be controlled by each MAC on a one to one basis, and the remaining one or more carriers may be controlled by one MAC.

The above-mentioned system includes a plurality of carriers (i.e., 1 to N carriers), and individual carriers may be contiguous or non-contiguous to each other. The above-mentioned system may be applied to UL and DL without distinction. The TDD system is constructed to manage N carriers including DL and UL transmission in each carrier, and the FDD system is constructed to apply several carriers to each of UL and DL. The FDD system may also support asymmetrical carrier aggregation (CA) in which the number of carriers aggregated in UL and DL and/or the carrier bandwidth are/is different.

In the case where the number of component carriers (CCs) aggregated in UL is identical to the number of CCs aggregated in DL, all CCs may be compatible with those of the conventional system. However, it should be noted that CCs that do not consider the compatibility are not always excluded.

FIG. 24 shows an exemplary scenario for transmitting uplink control information (UCI) in a wireless communication system supporting carrier aggregation. For convenience of description, the example of FIG. 24 assumes that the UCI is ACK/NACK (A/N). However, the above-mentioned description is disclosed only for illustrative purposes, and the UCI may include channel state information (e.g., CQI, PMI, RI) and control information such as scheduling request (SR) information without any limitation.

Figure 28:
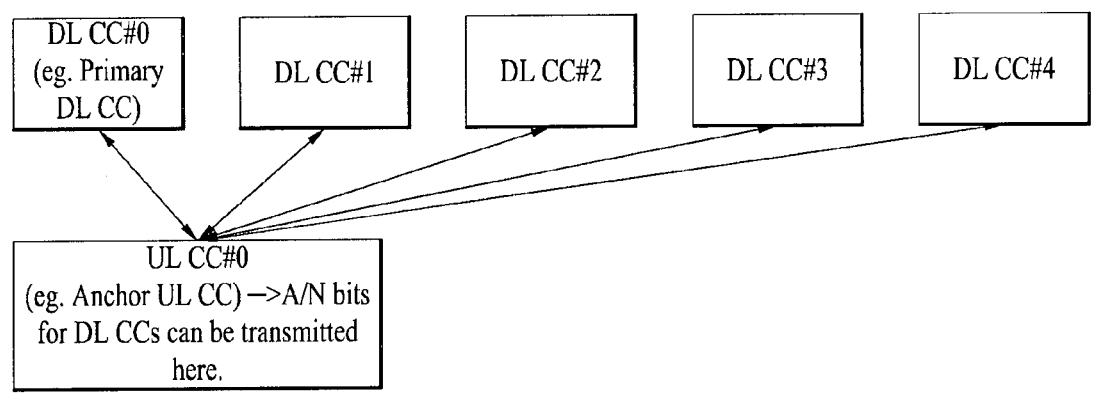
FIG. 28 is a diagram showing asymmetric carrier aggregation (CA) in which 5 downlink component carriers (DL CCs) and one uplink CC are linked.

FIG. 28 shows an asymmetric carrier aggregation in which 5 DL CCs are linked to one UL CC. The illustrated asymmetric carrier aggregation may be established at UCI transmission viewpoint. Specific UCIs (e.g., ACK/NACK response) of several DL CCs are collected in one UL CC and transmitted through the one UL CC. In addition, even in the case of constructing multiple UL CCs, a specific UCI (e.g., ACK/NACK response to DL CC) is transmitted through a predetermined one UL CC (e.g., a primary CC, a primary cell, or Pcell). For convenience of description, assuming that each DL CC may carry a maximum of two codeword blocks (or two transport blocks) and the number of ACK/NACK responses for each CC is dependent upon a maximum number of established codewords per CC (for example, if a maximum number of codewords established by the BS at a specific CC is set to 2, although a specific PDCCH uses only one codeword in the above-mentioned CC, the number of associated ACK/NACK responses is set to a maximum number (i.e., 2) of codewords per CC), at least two UL ACK/NACK bits are needed for each DL CC. In this case, in order to transmit ACK/NACK for data received through 5 DL CCs through one UL CC, ACK/NACK comprised of at least 10 bits is needed. In order to separately discriminate a DTX (discontinuous transmission) state for each DL CC, at least 12 bits ($=5^5=3125=11.61$ bits) for ACK/NACK transmission are needed. The conventional PUCCH format 1a/1b can transmit ACK/NACK to the range of a maximum of 2 bits, such that the above-mentioned structure cannot transmit the extended ACK/NACK information. For convenience of description, although the amount of UCI information is increased due to the carrier aggregation, this situation may be generated due to the increased number of antennas and the presence in a backhaul subframe in the TDD or relay system. Similar to ACK/NACK, even when control information associated with several DL CCs is transmitted through one UL CC, the amount of control information to be transmitted is increased. For example, in case of transmitting CQI/PMI/RI for several DL CCs, UCI payload may be increased.

In FIG. 28, a UL anchor CC (UL PCC (primary CC), also called a UL primary CC) is a CC for transmitting PUCCH resources or UCI, and may be cell-specifically or UE-specifically determined. For example, the UE may determine a CC for attempting to perform an initial random access to be a primary CC. In this case, the DTX status may be explicitly fed back, and may be fed back to share the same state as that of a NACK.

The LTE-A conceptually uses the cell to manage radio resources. The cell is defined as a combination of DL resources and UL resources. That is, the cell is defined as a combination of DL CC and UL CC, and UL resources are not mandatory. Therefore, the cell may be comprised of only DL resources or may be comprised of DL resources and UL resources. If carrier aggregation is supported, a linkage between DL resource (or DL CC) carrier frequency and UL resource (or UL CC) carrier frequency may be designated by system information. The cell operated on the primary frequency (or PCC) may be referred to as a primary cell (PCell), and the cell(s) operated at a secondary frequency (or SCC) may be referred to as a secondary cell(s) (SCells). The primary frequency (or PCC) may indicate a frequency (or CC) used when the initial connection establishment process is performed or when a connection re-establishment process is started. PCell may also indicate the cell indicated in a handover process. In this case, the secondary frequency (or SCC) may indicate a frequency (or CC) that may be configured after RRC connection establishment and may also be used to provide additional radio resources. PCell and SCell may be generically named as a serving cell. Therefore, in the case of the UE that is in an RRC_CONNECTED state, does not establish or support carrier aggregation, there is only one serving cell composed of only PCell. In contrast, in the case of another UE that is in the RRC_CONNECTED state and establishes carrier aggregation, one or more serving cells may be present, one PCell and at least one SCell may be contained in the entire serving cell. For carrier aggregation, after the initial security activation process is started, the network may be added to the initially configured PCell in a connection establishment process, and may be configured for the UE that supports carrier aggregation using one or more SCells. Therefore, PCC may be used interchangeable with a PCell, a primary (radio) resource, and a primary frequency resource. Similarly, CSS may be used interchangeable with a SCell, a secondary (radio) resource, and a secondary frequency resource, The method for effectively transmitting the increased UL control information (UCI) will hereinafter be described with reference to the accompanying drawings. In more detail, the following description proposes the new PUCCH format/signal processing/resource allocation method capable of transmitting the increased UL control information (UCI). For convenience of description, the new PUCCH format proposed by the present invention is referred to as CA (Carrier Aggregation) PUCCH format or as a PUCCH format 3 because PUCCH formats upto the PUCCH format 2 is defined in the conventional LTE Release 8/9. The technical idea of the PUCCH format proposed in the present invention can be easily applied to an arbitrary physical channel (e.g., PUSCH) capable of transmitting UL control information (UCI) using the same or similar scheme. For example, the embodiment of the present invention can be applied to a periodical PUSCH structure for periodically transmitting control information or to an aperiodic PUSCH structure for aperiodically transmitting control information.

The following drawings and embodiments basically show an exemplary case in which the UCI/RS symbol structure of the PUCCH format 1/1a/1b (normal CP) of the conventional LTE is used as a UCI/RS symbol structure of the subframe/slot level applied to the PUCCH format 3. However, the subframe/slot level UCI/RS symbol structure prescribed in the PUCCH format 3 is disclosed only for illustrative purposes for convenience of description, and the scope or spirit of the present invention is not limited only to a specific structure. In the PUCCH format 3, the number of UCI/RS symbols, the positions of the UCI/RS symbols, etc. may be freely modified according to the system design. For example, the PUCCH format 3 according to the embodiment of the present invention may be defined using RS symbol structures of the PUCCH format 2/2a/2b of the conventional LTE.

The PUCCH format 3 according to the embodiment of the present invention may be used to transmit arbitrary categorized/sized uplink control information (UCI). For example, the PUCCH format 3 according to the embodiment of the present invention may transmit a variety of information, for example, HARQ ACK/NACK, CQI, PMI, RI, SR, etc., and these information may have arbitrary-sized payload. For convenience of description, the present embodiment is focused upon the exemplary case in which the PUCCH format 3 transmits the ACK/NACK information, and a detailed description thereof will be described later.

FIGS. 29 to 32 exemplarily show a PUCCH format 3 and associated signal processing according to the embodiments of the present invention. Particularly, FIGS. 29 to 32 exemplarily show the DFT-based PUCCH format structure. According to the DFT-based PUCCH structure, DFT precoding is performed in PUCCH, and a time domain orthogonal cover (OC) is applied to each SC-FDMA level and then transmitted. The DFT-based PUCCH format is generically named as a PUCCH format 3.

FIG. 25 exemplarily shows the PUCCH format 3 structure using the orthogonal code (OC) of SF=4. Referring to FIG. 25, the channel coding block performs channel coding of the information bits ($a\_0, a\_1, \ldots, a\_M-1$) (e.g., multiple ACK/NACK bits), thereby generating the encoded bits (coded bit or coding bit)(or codeword) ($b\_0, b\_1, \ldots, b\_N-1$). M is the size of information bit, and N is the size of coding bit. The transmission bit may include UCI, for example, multiple ACK/NACK data for multiple data (or PDSCH) received through multiple DL CCs. In this case, the information bit (a_0, a_1, . . . , a_M−1) is joint-coded irrespective of categories/numbers/sizes of UCIs constructing the information bit. For example, if the information bit includes multiple ACK/NACK data of several DL CCs, the channel coding is not performed per DL CC or per ACK/NACK bit, but performed for the entire bit information, such that a single codeword is generated. The channel coding is not limited thereto, and includes simple repetition, simplex coding, Reed Muller (RM) coding, punctured RM coding, Tail-biting convolutional coding (TBCC), low-density parity-check (LDPC) or turbo-coding. Although not shown in the drawings, the coding bit may be rate-matched in consideration of a modulation order and the amount of resources. The rate matching function may be contained in some parts of the channel coding block or may be performed through a separate functional block. For example, the channel coding block may perform the (32,0) RM coding for several control information to obtain a single codeword, and cyclic buffer rate-matching for the obtained codeword may be performed.

The modulator modulates the coding bit (b_0, b_1, . . . , b_N−1) so as to generate the modulation symbol (c_0, c_1, . . . , c_L−1). L is the size of a modulation symbol. The modulation method may be performed by modifying the size and phase of a transmission (Tx) signal. For example, the modulation method may include n-PSK (Phase Shift Keying), n-QAM (Quadrature Amplitude Modulation) (where n is an integer of 2 or higher). In more detail, the modulation method may include BPSK (Binary PSK), QPSK (Quadrature PSK), 8-PSK, QAM, 16-QAM, 64-QAM, etc.

The divider distributes the modulation symbols (c_0, c_1, . . . , c_L−1) to individual slots. The order/pattern/scheme for distributing the modulation symbols to individual slots may not be specially limited. For example, the divider may sequentially distribute the modulation symbols to individual slots (i.e., localized scheme). In this case, as shown in the drawings, the modulation symbols (c_0, c_1, . . . , c_L/2−1) are distributed to Slot 0, the modulation symbols (c_ L/2, c_ L/2+1, . . . , c_L−1) may be distributed to Slot 1. In addition, the modulation symbols may be interleaved (or permuted) while being distributed to individual slots. For example, the even-th modulation symbols may be distributed to Slot 0, and the odd-th modulation symbols may be distributed to Slot 1. If necessary, the modulation process and the division process may be replaced with each other in order.

The DFT precoder performs DFT precoding (e.g., 12-point DFT) for the modulation symbols distributed to individual slots so as to generate a single carrier waveform. Referring to the drawings, the modulation symbols (c_0, c_1, . . . , c_L/2−1) distributed to Slot 0 may be DFT-precoded to DFT symbols (d_0, d_1, . . . , d_L/2−1), ad the modulation symbols (c_ L/2, c_ L/2+1, . . . , c_L−1) distributed to Slot 1 may be DFT-precoded to DFT symbols (d_ L/2, d_ L/2+1, . . . , d_L−1). The DFT precoding may be replaced with another linear operation (e.g., Walsh precoding).

The spreading block performs spreading of the DFT-processed signal at the SC-FDMA symbol level. The time domain spreading at the SC-FDMA symbol level may be performed using the spreading code (sequence). The spreading code may include a Quasi-orthogonal code and an orthogonal code. The Quasi-orthogonal code is not limited thereto, and may include a PN (Pseudo Noise) code as necessary. The orthogonal code is not limited thereto, and may include a Walsh code, a DFT code, etc. as necessary. Although the present embodiment is focused only upon the orthogonal code as a representative spreading code for convenience of description, the orthogonal code may be replaced with a Quasi-orthogonal code. A maximum value of the spreading code size (or the spreading factor (SF)) is limited by the number of SC-FDMA symbols used for control information transmission. For example, if four SC-FDMA symbols are used to transmit control information in one slot, orthogonal codes (w0, w1, w2, w3) each having the length of 4 may be used in each slot. SF means the spreading degree of control information, and may be relevant to the UE multiplexing order or antenna multiplexing order. SF may be changed according to system requirements, for example, in the order of 1→2→3→4, . . . . The SF may be pre-defined between the BS and the UE, or may be transferred to the UE through DCI or RRC signaling. For example, if one of SC-FDMA symbols for control information is punctured to achieve SRS transmission, the SF-reduced spreading code (e.g., SF=3 spreading code instead of SF=4 spreading code) may be applied to control information of the corresponding slot.

The signal generated through the above-mentioned process may be mapped to subcarriers contained in the PRB, IFFT-processed, and then converted into a time domain signal. The CP may be added to the time domain signal, and the generated SC-FDMA symbol may be transmitted through the RF unit.

Detailed description of individual process on the assumption that ACK/NACK for 5 DL CCs is transmitted will hereinafter be described. If each DL CC transmits two PDSCHs, associated ACK/NACK data includes a DTX state, and the ACK/NACK data may be composed of 12 bits. Assuming that QPSK modulation and "SF=4" time spreading are used, the coding block size (after the rate matching) may be composed of 48 bits. The coding bit may be modulated into 24 QPSK symbols, and 12 QPSK symbols are distributed to each slot. In each slot, 12 QPSK symbol may be converted into 12 DFT symbols through the 12-point DFT operation. 12 DFT symbols in each slot may be spread and mapped to four SC-FDMA symbols using the SF=4 spreading code in a time domain. Since 12 bits are transmitted through [2 bits*12 subcarriers*8 SC-FDMA symbols], the coding rate is set to 0.0625(=12/192). In case of SF=4, a maximum of four UEs may be multiplexed to one PRB.

Figure 30:
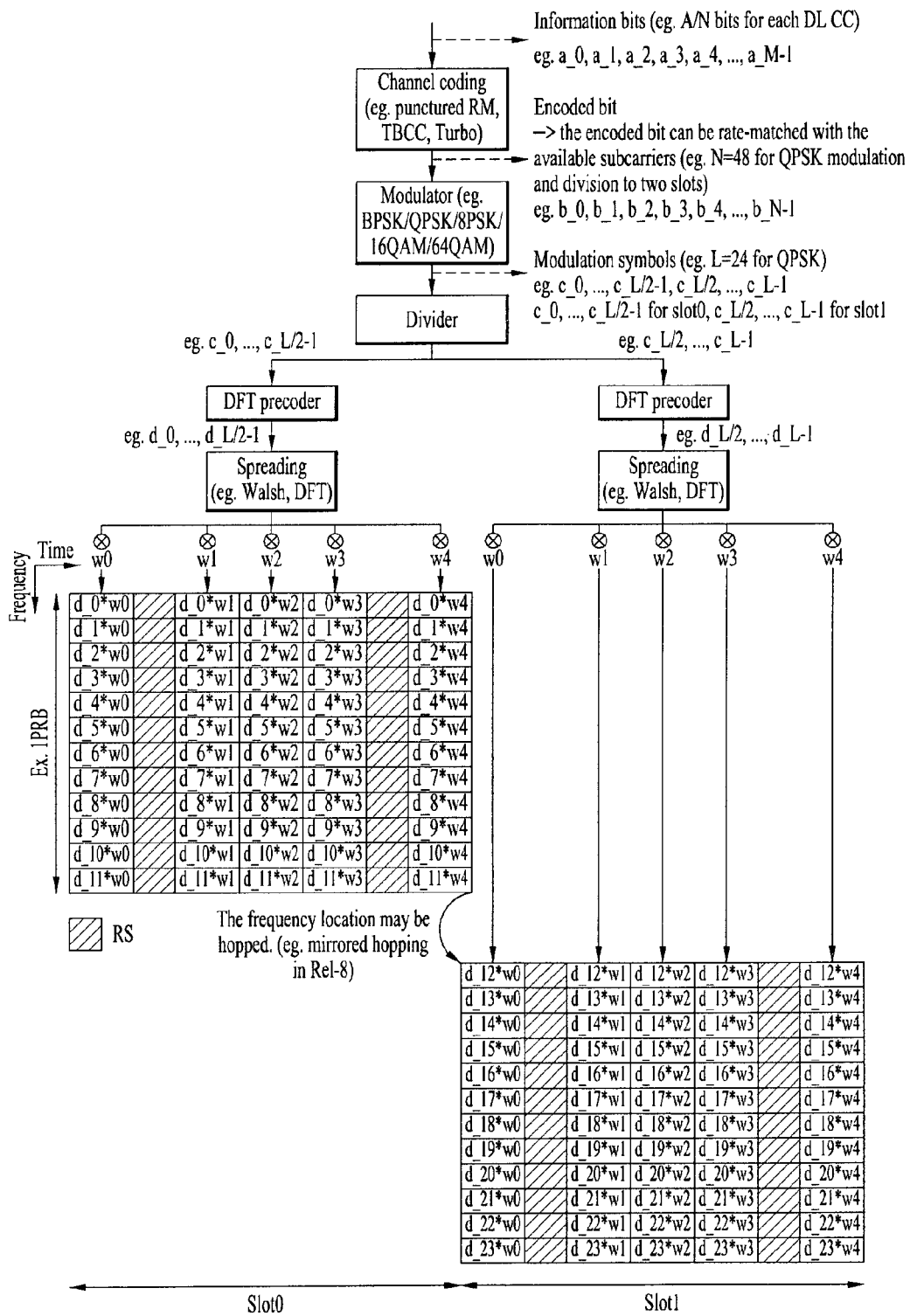

FIG. 30 exemplarily shows the PUCCH format 3 structure using the orthogonal code (OC) of SF=5.

Figure 29:
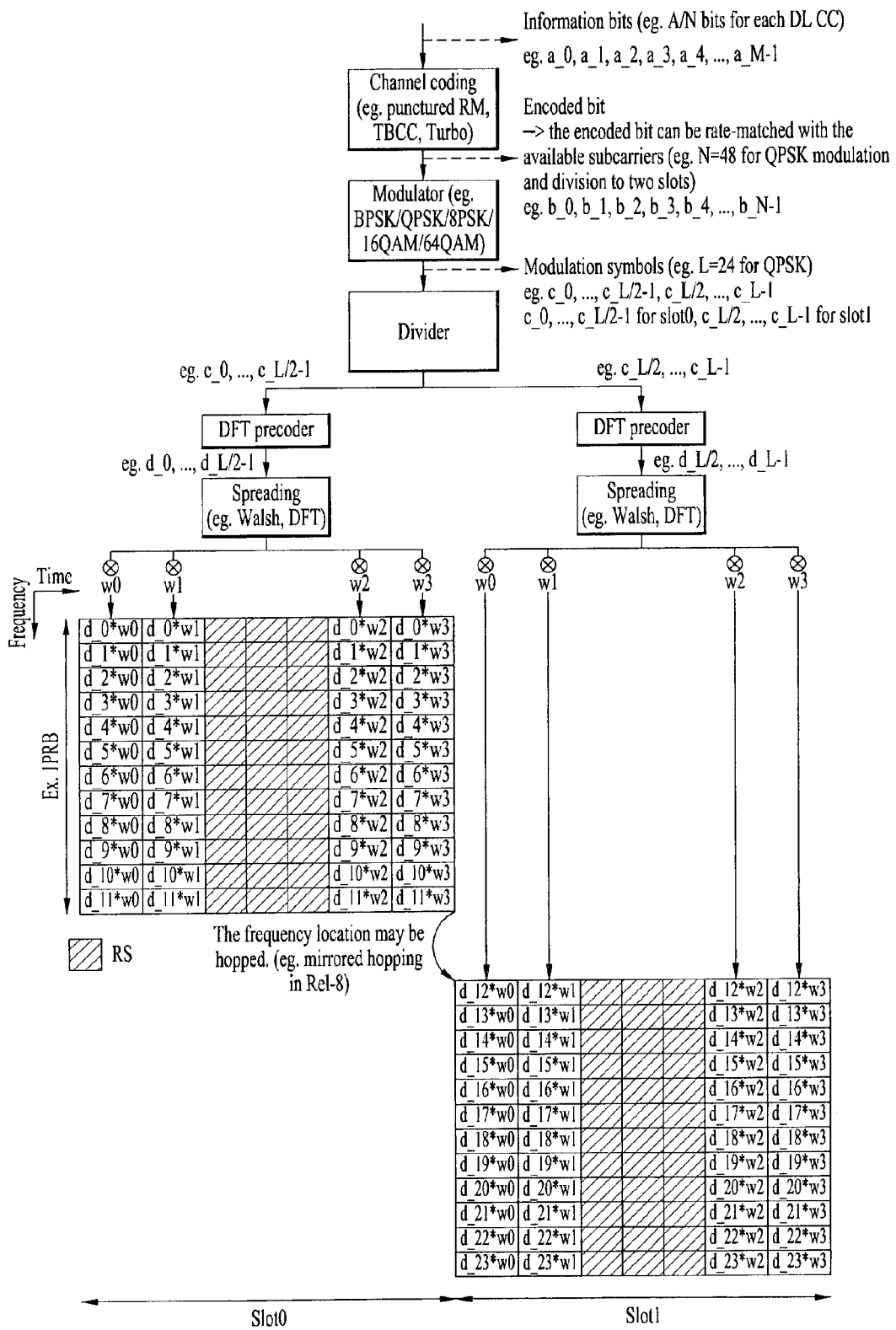
FIGS. 29 to 32 exemplarily show a PUCCH format 3 structure and associated signal processing according to the embodiments of the present invention.

The basic signal processing of FIG. 30 is identical to that of FIG. 29. Compared to FIG. 29, the number/position of UCI SC-FDMA symbols and the number/position of RS SC-FDMA symbols shown in FIG. 26 are different from those of FIG. 29. In this case, the spreading block may also be pre-applied to the previous stage of the DFT precoder as necessary.

In FIG. 30, the RS may succeed to the LTE system structure. For example, cyclic shift (CS) may be applied to a basic sequence. Since the data part includes SF=5, the multiplexing capacity becomes 5. However, the multiplexing capacity of the RS part is determined according to a cyclic shift (CS) interval ($\Delta_{shift}^{PUCCH}$). For example, the multiplexing capacity is given as $12/\Delta_{shift}^{PUCCH}$. In case of $\Delta_{shift}^{PUCCH}=1$, the multiplexing capacity is set to 12. In case of $\Delta_{shift}^{PUCCH}=2$, the multiplexing capacity is set to 6. In case of $\Delta_{shift}^{PUCCH}=3$, the multiplexing capacity is set to 4.

In FIG. 30, while the multiplexing capacity of the data part is set to 5 because of SF=5, the RS multiplexing capacity is set to 4 in case of $\Delta_{shift}^{PUCCH}$, such that the resultant multiplexing capacity may be limited to 4 corresponding to the smaller one of two capacity values 5 and 4.

Figure 31:
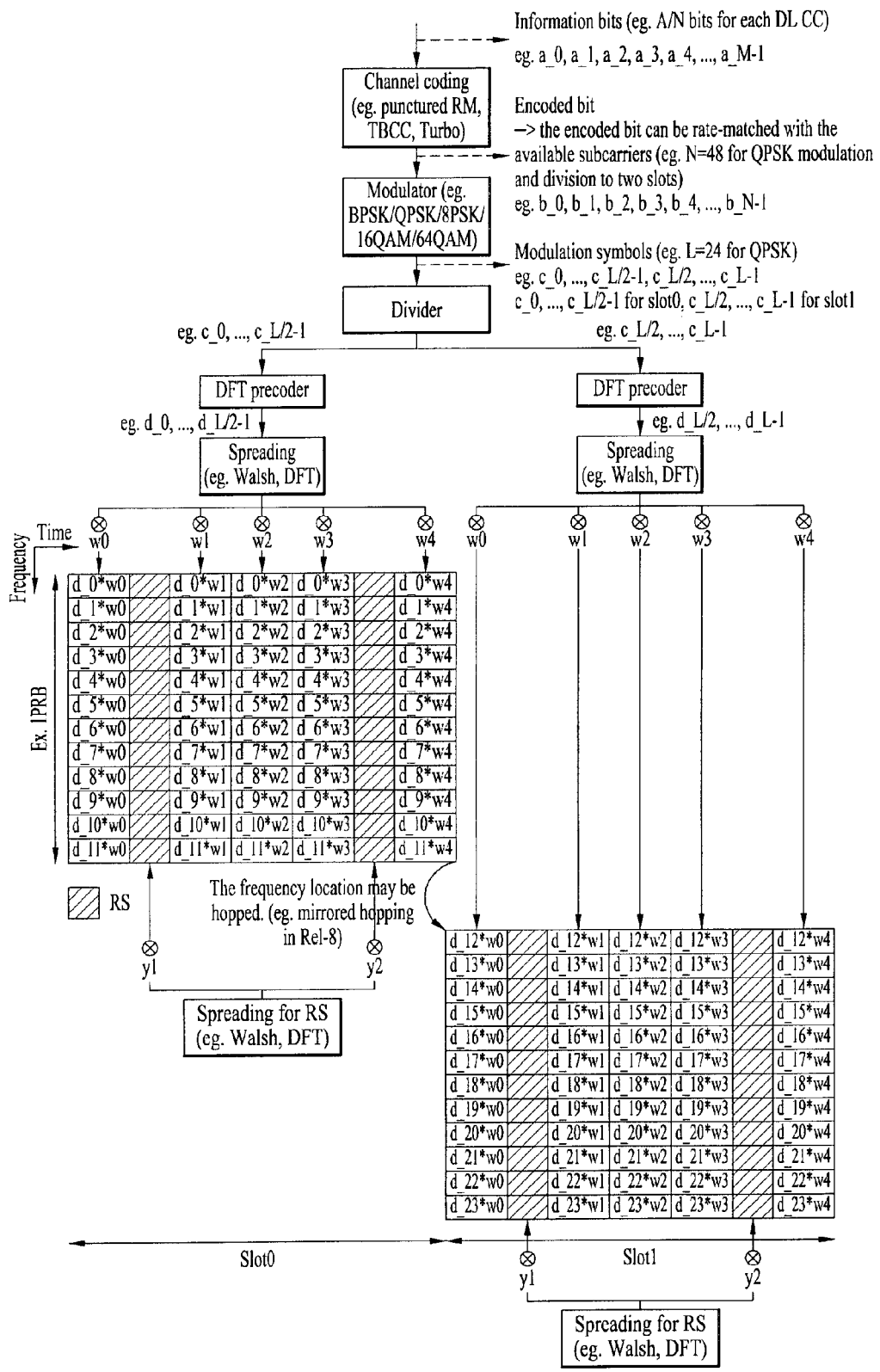

FIG. 31 exemplarily shows the PUCCH format 3 structure in which the multiplexing capacity is increased at a slot level.

The SC-FDMA symbol level spreading illustrated in FIGS. 29 and 30 is applied to RS, resulting in increase in the entire, multiplexing capacity. Referring to FIG. 31, if a Walsh cover (or DFT code cover) is applied in the slot, the multiplexing capacity is doubled. Therefore, even in the case of $\Delta_{shift}^{PUCCH}$, the multiplexing capacity is set to 8, such that the multiplexing capacity of the data section is not decreased. In FIG. 31, [y1 y2]=[1 1] or [y1 y2]=[1 −1], or linear conversion format (e.g., [j j] [j−j], [1 j] [1−j], or the like) may also be used as an orthogonal cover (OC) code for RS.

Figure 32:
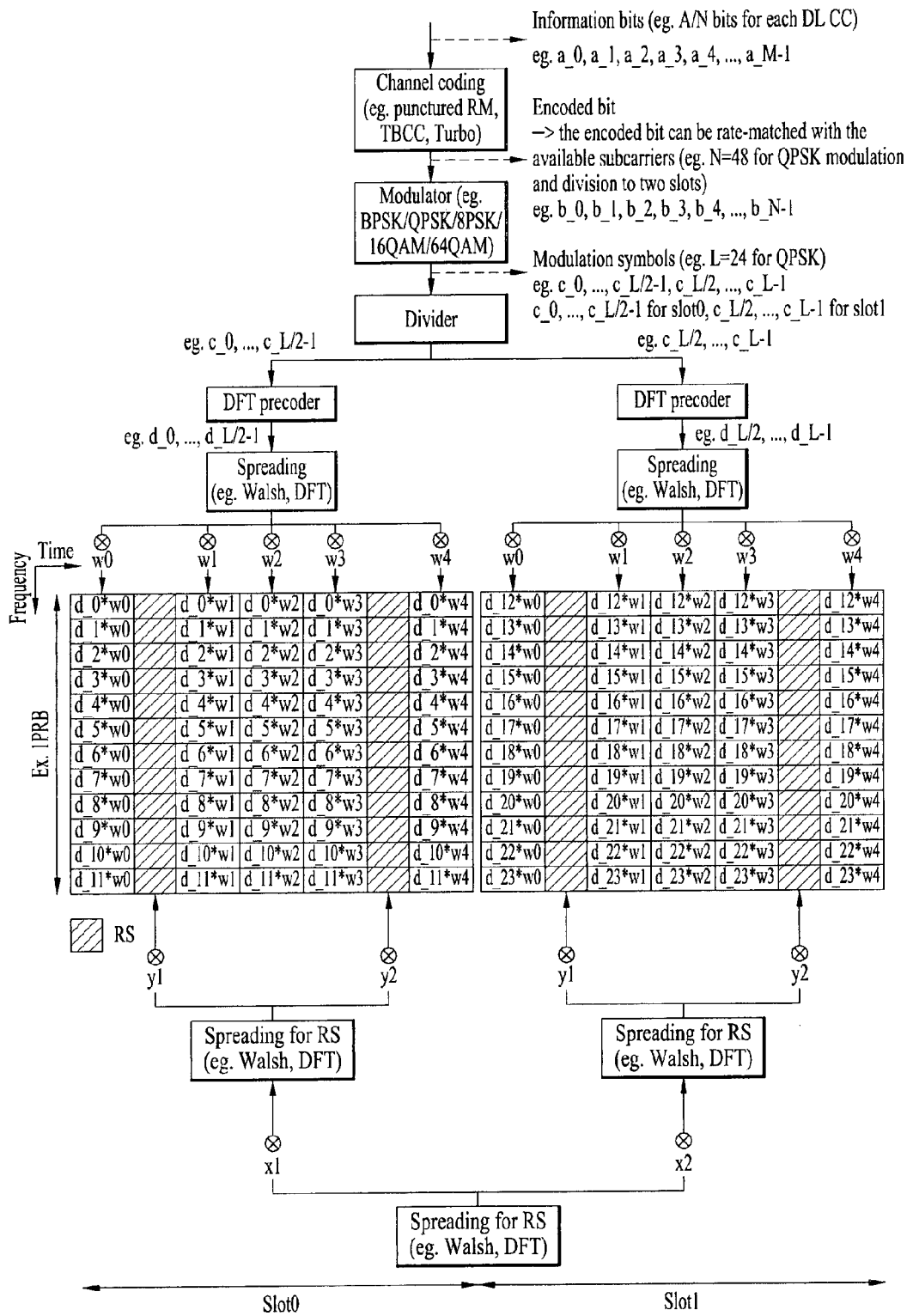

FIG. 32 exemplarily shows a PUCCH format 3 structure in which the multiplexing capacity can be increased at a subframe level.

If the frequency hopping is not applied to the slot level, the Walsh cover is applied in slot units, and the multiplexing capacity may be re-increased two times. In this case, as previously stated above, [x1 x2]=[1 1] or [1 −1] may be used as the orthogonal cover code, and its modification format may also be used as necessary.

For reference, the PUCCH format 3 processing may be free of the orders shown in FIGS. 29 to 32.

FIG. 33 exemplarily shows ACK/NACK transmission based on channel selection. Referring to FIG. 33, in association with the PUCCH format 1b for 2-bit ACK/NACK feedback, two PUCCH resources (PUCCH resources #0 and #1) may be established.

When transmitting the 3-bit ACK/NACK information, 2 bits from among 3-bit ACK/NACK information may be expressed through the PUCCH format 1b, and the remaining one bit may be expressed according to resources selected from among two PUCCH resources. For example, if UCI is transmitted using the PUCCH resource #0, this means data '0'. If UCI is transmitted using the PUCCH resource #1, this means data '1'. Therefore, 1 bit (0 or 1) can be expressed by selecting one of two PUCCH resources, thereby expressing a total of 3-bits ACK/NACK information.

Table 11 exemplarily shows transmission of ACK/NACK information of 3 bits using channel selection. In this case, two PUCCH resources may be established as necessary.

TABLE 11

| ACK/NACK | Ch1 | | Ch2 | |
| --- | --- | --- | --- | --- |
| | RS | Data | RS | Data |
| N, N, N | 1 | 1 | 0 | 0 |
| N, N, A | 1 | −j | 0 | 0 |
| N, A, N | 1 | j | 0 | 0 |
| N, A, A | 1 | −1 | 0 | 0 |
| A, N, N | 0 | 0 | 1 | 1 |
| A, N, A | 0 | 0 | 1 | −j |
| A, A, N | 0 | 0 | 1 | j |
| A, A, A | 0 | 0 | 1 | −1 |

In Table 11, A is ACK information, and N is NACK information or NACK/DTX information. '1, −1, j, −j' denotes four QPSK-modulated complex modulation symbols obtained when 2-bits transmission information 'b(0),b(1)' transmitted from a PUCCH format is QPSK modulated.

'b(0),b(1)' may correspond to a binary transmission bit transmitted using the selected PUCCH resources. For example, as can be seen from Table 12, the binary transmission bits 'b(0),b(1)' are mapped to a complex modulation symbol, such that the mapped result is transmitted through PUCCH resources.

TABLE 12

| Modulation | Binary transmission bits b(0), b(1) | Complex modulation symbol |
| --- | --- | --- |
| QPSK | 0, 0 | 1 |
| | 0, 1 | −j |
| | 1, 0 | j |
| | 1, 1 | −1 |

FIG. 34 is a diagram showing a transmission structure of ACK/NACK information using enhanced channel selection. Although PUCCH #0 and PUCCH #0 are contained in different time/frequency domains for convenience of description, the scope and spirit of the present invention is not limited thereto, and may also be configured to use different codes in the same time/frequency domain. Referring to FIG. 34, two PUCCH resources (PUCCH resource #0 and #1) may be established in association with PUCCH format 1a for 1-bit ACK/NACK transmission.

If ACK/NACK information of 3 bits is transmitted, one bit from among 3 bits may be represented through a PUCCH format 1a, the other one bit may be represented according to which one of PUCCH resources (PUCCH resource #0 and #1) is associated with ACK/NACK transmission, and the last one bit may be differently represented according to which one of resources is related to a reference signal (RS) transmission. In this case, although the RS may be preferably transmitted within the time/frequency regions of the first selected PUCCH resources (PUCCH resource #0 and #1), the RS may also be transmitted in time/frequency regions of the original PUCCH resources.

That is, since one of the following first to fourth cases is selected so as to represent 2 bits (corresponding to four cases), a total of 3-bits ACK/NACK information is represented. In the first case, ACK/NACK information is transmitted through the PUCCH resource #0, and the RS related to a resource corresponding to the PUCCH resource #0 is also transmitted through the PUCCH resource #0, ACK/NACK information is transmitted. In the second case, ACK/NACK information is transmitted through the PUCCH resource #0, and the RS related to a resource corresponding to the PUCCH resource #1 is transmitted. In the third case, ACK/NACK information is transmitted through the PUCCH resource #0, and the RS related to a resource corresponding to the PUCCH resource #1 is transmitted. In the fourth case, ACK/NACK information is transmitted through the PUCCH resource #1, and the RS related to a resource corresponding to the PUCCH resource #0 is transmitted.

Table 13 exemplarily shows transmission of 3-bits ACK/NACK information using the enhanced channel selection. In this case, it is assumed that two PUCCH resources are established.

TABLE 13

| ACK/NACK | Ch1 | | Ch2 | |
| --- | --- | --- | --- | --- |
| | RS | Data | RS | Data |
| N, N, N | 1 | 1 | 0 | 0 |
| N, N, A | 1 | −1 | 0 | 0 |

TABLE 13-continued

| ACK/NACK | Ch1 | | Ch2 | |
| --- | --- | --- | --- | --- |
| | RS | Data | RS | Data |
| N, A, N | 0 | 1 | 1 | 0 |
| N, A, A | 0 | −1 | 1 | 0 |
| A, N, N | 1 | 0 | 0 | 1 |
| A, N, A | 1 | 0 | 0 | −1 |
| A, A, N | 0 | 0 | 1 | 1 |
| A, A, A | 0 | 0 | 1 | −1 |

Differently from Table 12 showing channel selection, Table 13 showing the enhanced channel selection is characterized in that a symbol mapped to PUCCH resources can be BPSK modulated. However, differently from Table 13, a complex symbol may be QPSK modulated using PUCCH format 1b. In this case, the number of bits capable of being transmitted through the same PUCCH resources may be increased.

Although FIGS. 33 and 34 exemplarily show that 2 PUCCH resources are established to transmit 3-bits ACK/NACK information, it should be noted that the number of transmission bits of ACK/NACK information may be established in various ways. Even when other uplink control information is transmitted instead of the ACK/NACK information, or even when ACK/NACK information and other uplink control information are simultaneously transmitted, it is obvious to those skilled in the art that the same principles may also be applied without distinction.

Table 14 exemplarily shows that two PUCCH resources are established and 6 ACK/NACK states are transmitted using channel selection.

TABLE 14

| HARQ-ACK(0), HARQ-ACK(1) | $n^{(1)}_{PUCCH}$ | b(0), b(1) |
| --- | --- | --- |
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

Table 15 exemplarily shows that three PUCCH resources are established and 11 ACK/NACK states are transmitted using channel selection.

TABLE 15

| HARQ-ACK(0), HARQ-ACK(1), HARQ-ACK(2) | $n^{(1)}_{PUCCH}$ | b(0), b(1) |
| --- | --- | --- |
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

Table 16 exemplarily shows that four PUCCH resources are established and 20 ACK/NACK states are transmitted using channel selection.

TABLE 16

| HARQ-ACK(0), HARQ-ACK(1), HARQ-ACK(2), HARQ-ACK(3) | $n^{(1)}_{PUCCH}$ | b(0), b(1) |
| --- | --- | --- |
| ACK, ACK, ACK, ACK | $n^{(1)}_{PUCCH,1}$ | 1, 1 |
| ACK, ACK. ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In the meantime, the UE collects (e.g., multiplexing, bundling, etc.) responses of some cases each requiring multiple ACK/NACK feedbacks received from PCell DL CC and SCell(s) DL CC, and transmits the collected result using one PUCCH in a UL CC of PCell.

The case in which HARQ ACK/NACK feedback for DL CC is needed may generally include the following three cases:

First, as can be seen from Table 17, HARQ ACK/NACK feedback may be requested.

TABLE 17

For a PDSCH(s) transmission indicated by the detection of a corresponding PDCCH(s) in subframe(s) n − k, where k∈K and K is a set of M elements {$k_0, k_1, \ldots k_{M-1}$} depending on the subframe n and the UL-DL configuration.

Table 17 shows PDSCH(s) requesting general A/N feedback. The above-mentioned PDSCH may exist in all of DL PCell and SCells. For convenience of description, the above-mentioned case will hereinafter be referred to as 'PDSCH with PDCCH'.

Next, as can be seen from Table 18, HARQ ACK/NACK feedback may be requested.

TABLE 18

For a PDCCH(s) indicating downlink SPS release in subframe(s)_n − k, where k∈K and K is a set of M elements {$k_0, k_1, \ldots k_{M-1}$} depending on the subframe n and the UL-DL configuration.

Table 18 shows A/N feedback for PDCCH(s) for SPS release. In this case, only one 'PDSCH without corresponding PDCCH' may exist across one or more DL cells within one subframe. In addition, A/N feedback for 'PDCCH(s) indicating DL SPS activation' may not be performed, whereas A/N feedback for 'PDCCH(s) indicating DL SPS release' is performed. In addition, PDCCH may exist only in DL PCell. In the following description, the above-mentioned case will hereinafter be referred to as 'DL SPS release' for convenience of description.

In addition, according to the following Table 19, HARQ ACK/NACK feedback may be requested.

TABLE 19

For a PDSCH(s) transmission where there is not a corresponding PDCCH detected in subframe(s) n − k, where k∈K and K is a set of M elements {k$_0$, k$_1$, . . . k$_{M−1}$} depending on the subframe n and the UL-DL configuration.

Table 19 shows A/N feedback for Semi-Persistent Scheduling (SPS) using PDSCH(s) having no PDSCH(s). In addition, only one 'PDSCH without corresponding PDCCH' may exist across one or more A/N feedbacks. In addition, PDSCH may exist only in the DL PCell. In the following description, the following case is referred to as 'DL SPS' for convenience of description.

However, an HARQ ACK/NACK feedback event described in Tables 17 to 19 is disclosed only for illustrative purposes, and HARQ ACK/NACK feedback may also be applied to the case in which another event occurs.

Meanwhile, in Tables 17 to 19, M is the number of elements of the set K, and denotes HARQ-ACK transmission time point for downlink reception, and K may be represented by the following Table 20 according to the subframe location(n) and TDD UL-DL configuration.

sixth UL subframe, ACK/NACK for a DL subframe corresponding to the fourth subframe located ahead of the sixth UL subframe is fed back.

Figure 35:
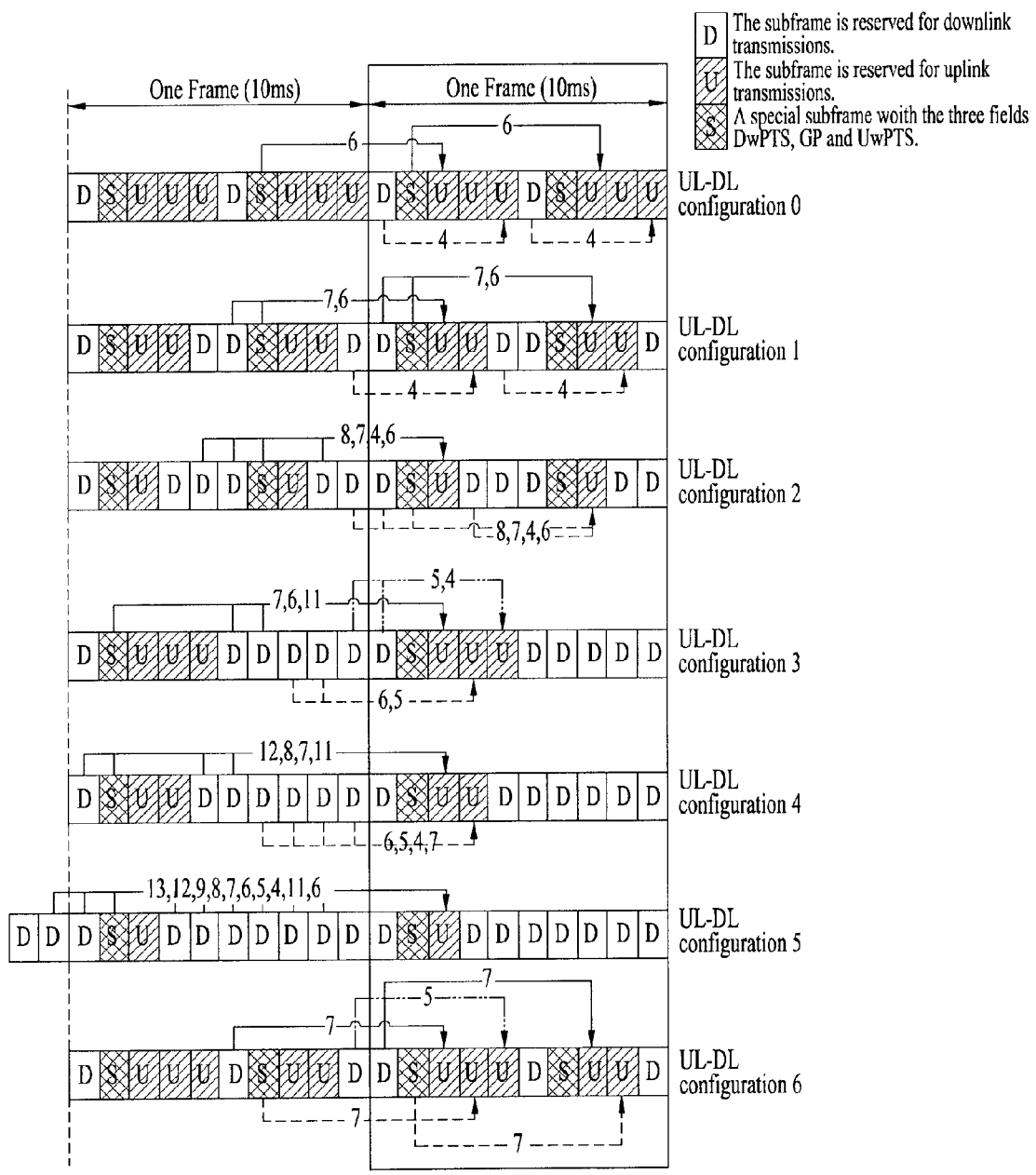
FIG. 35 shows an example of ACK/NACK feedback in a Time Division Duplexing (TDD)

In another example, if the UL-DL configuration located at the second position from the top of FIG. 35, 4 UL subframes exist in one frame. In a first UL subframe of the second frame, ACK/NACK signals of DL subframes of the 7$^{th}$ and 6$^{th}$ subframes (i.e., the preceding frames) located ahead of the first UL subframe and a special subframe are collected (i.e., multiplexed or bundling) and fed back. In addition, in the second Ul subframe, ACK/NACK of a DL subframe corresponding to a fourth subframe located before the second UL subframe is fed back. In addition, in the third UL subframe, ACK/NACK signals of DL subframes (the 7$^{th}$ and 6$^{th}$ subframes located before the third UL subframe) and a special subframe are collected (multiplexing or bunlding) and the collected result is fed back. In addition, in the fourth UL subframe, ACK/NACK signals of the DL subframe corresponding to a previous fourth subframe is fed back. For convenience of description, although operations of the other

TABLE 20

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In addition, Table 20 may also be represented by FIG. 35.

FIG. 35 shows an example of ACK/NACK feedback in a Time Division Duplexing (TDD). Referring to FIG. 35, before ACK/NACK feedback is performed in UL subframes of the second one from among two frames, it can be recognized which DL subframe was ACK/NACK fed back as shown in Table 20.

For example, if the highest UL-DL configuration is set to 0, 6 UL subframes exist in one frame. In addition, in a first UL subframe of the second frame, ACK/NACK of a special subframe (i.e., the sixth subframe located ahead of the first UL subframe of the second frame) is fed back. In addition, ACK/NACK is not fed back in the second UL subframe. In addition, in the third UL subframe, ACK/NACK for a DL subframe corresponding to the fourth subframe located ahead of the third UL subframe is fed back. In addition, in the fourth UL subframe, ACK/NACK for a special subframe corresponding to the sixth subframe located ahead of the fourth UL subframe is ACK/NACK fed back. In addition, in the fifth UL subframe, ACK/NACK is not fed back. In the UL-DL configurations will herein be omitted, the same analysis as in examples of the preceding Ul-DL configurations 0 and 1 may be used as necessary.

That is, the locations of DL subframes of ACK/NACK signals being fed back in individual UL subframse are differently determined according to TDD UL-DL configuration and UL subframe locations.

In case of FDD, M is always set to 1, and K is always set to {k$_0$}={4}.

Meanwhile, although cross scheduling from a PCell to SCell(s) can be supported, cross scheduling from SCell(s) to PCell may not be supported.

In this case, if cross-scheduled cell(s) from other cells may exist, additional PDSCH allocation may not be performed in the above-mentioned cell(s). That is, one cell may be scheduled from only one cell.

Meanwhile, cells for use in TDD may be restricted o use the same UL-DL configurations as necessary. For 3 example, the cells may equally use UL-DL configurations shown in the following Table 21.

TABLE 21

| Uplink-downlink configuration | Ratio (D + S:U) (D:U) | Downlink-to-Uplink Switch-point periodicity | \multicolumn{10}{c}{Subframe number} |
|---|---|---|---|---|---|---|---|---|---|---|---|---|
| | | | 0 | 1 | 2 | 3 | 4 | 5 | 6 | 7 | 8 | 9 |
| 0 | 4:6 (1:3) | 5 ms | D | S | U | U | U | D | S | U | U | U |
| 1 | 6:4 (2:2) | 5 ms | D | S | U | U | D | D | S | U | U | D |
| 2 | 8:2 (3:1) | 5 ms | D | S | U | D | D | D | S | U | D | D |
| 3 | 7:3 (6:3) | 10 ms | D | S | U | U | U | D | D | D | D | D |
| 4 | 8:2 (7:2) | 10 ms | D | S | U | U | D | D | D | D | D | D |
| 5 | 9:1 (8:1) | 10 ms | D | S | U | D | D | D | D | D | D | D |
| 6 | 5:5 (3:5) | 5 ms | D | S | U | U | U | D | S | U | U | D |

That is, the communication environment may be designed on the assumption that neighbor base stations (BSs) use the same UL-DL configurations. However, although neighbor BSs consider the time-synchronized network, if the neighbor BSs use different UL-DL configurations, an unexpected collision between a DL signal of a specific BS and a UL signal of a specific UE may occur.

There may be a first UE capable of receiving a DL signal from the BS (a) at a cell edge, and there may also be a second UE capable of transmitting a UL signal to the BS (b) at a location close to the first UE. Due to different UL-DL configurations between BSs, mutual interference may occur.

In addition, the use of the same UL-DL configurations between neighbor or contiguous BSs may deteriorate liquidity of BS resource management. That is, provided that different UL-DL configurations are used on the basis of the amount of traffic among BSs, resource management can be more dynamically and actively performed.

For example, provided that the amount of UL resources needed for UEs of a specific BS is increased while the same UL-DL configurations are used by the BSs, the BS converts the above-mentioned UL-DL configurations into the enhanced UL-DL configurations including many more UL subframes, such that the BS can perform a communication service using much more UL resources.

In another example, under the condition that the BSs use the same UL-DL configurations, if the number of communicable UEs belonging to a specific BS is reduced during a time zone (such as dawn) including a very small amount of traffic data, the BS converts the UL-DL configurations into other UL-DL configurations having many more UL subframes, such that unnecessary DL transmission (e.g. synchronization signal, reference signal, broadcasting channel, etc.) is reduced, resulting in implementation of the BS power saving.

In addition, using the same UL-DL configurations between cells in the above-mentioned CA environment may deteriorate fluidity of BS resource management. That is, provided that it is possible to use different UL-DL configurations on the basis of traffic amount among multiple cells, resources can be more dynamically and actively managed/operated.

For example, provided that the number of UL resources required for UEs of a specific BS is increased by one while all the same UL-DL configurations are used in cells, UL-DL configurations of one or more specific cells are changed to UL-DL configurations including many more UL subframes, such that a communication service can be implemented using much more UL resources.

In another example, under the condition that the cells use the same UL-DL configurations, if the number of communicable UEs belonging to a specific BS is very low during a time zone (such as dawn) including a very small amount of traffic data, the BS converts the UL-DL configurations of at least one specific cell into other UL-DL configurations having many more UL subframes, such that unnecessary DL transmission (e.g. a synchronization signal, a reference signal, a broadcasting channel, etc.) is reduced, resulting in implementation of the BS power saving.

Specifically, under the inter-band CA environment, different uplink transmission time points between cells may be needed, and the UE may use a plurality of RF units to perform communication under the inter-band CA environment.

In the case of the above-mentioned inter-band CA environment, different UL-DL configurations may be configured at each RF unit without gcausing interference between cells.

Therefore, if the use of different UL-DL configurations between BSs and/or cells of CA (CCs or bands) is supported, the above-mentioned effects can be guaranteed.

If different UL-DL configurations may occur between cells, there may occur an unexpected problem in ACK/NACK feedback.

Figure 36:
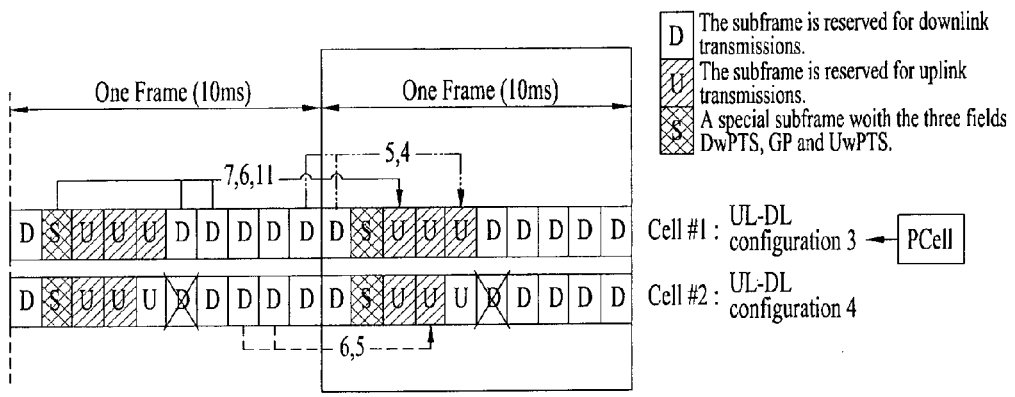
FIG. 36 shows the problems encountered when different UL-DL configurations are used according to the present invention.

The above-mentioned problems are shown in FIG. 36 for convenience of description and better understanding of the present invention.

In FIG. 36, it is assumed that Cell #1 uses UL-DL configuration 3 as PCell, an Cell #2 uses UL-DL configuration 4 as SCell. In addition, it is also assumed that ACK/NACK feedback is transmitted through a PUCCH of PCell and is operated according to UL-DL configuration of the PCell.

Referring to FIG. 36, ACK/NACK signals related to the previous 7$^{th}$ and 6$^{th}$ subframes and the previous 11$^{th}$ DL (or special) subframes of two cells are collected through a PUCCH of the first UL subframe of a PCell within a second frame, and the collected result may then be transmitted using the multiplexing or bundling scheme. ACK/NACK signals of the previous 6$^{th}$ and 5$^{th}$ DL subframes of two cells are collected through a PUCCH of the second UL subframe of a PCell, and may be transmitted using multiplexing or bundling. ACK/NACK signals of the previous 5$^{th}$ and 4$^{th}$ DL subframes of two cells are collected through a PUCCH of the third UL subfarme of a PCell, and may be transmitted using multiplexing or bundling. In this case, there may occur an unexpected problem. That is, a time domain corresponding to the third UL subframe of a PCell belonging to a frame may be used as a DL subframe of SCell, and an ACK/NACK feedback region for the above-mentioned region is not defined. That is, in FIG. 36, ACK/NACK feedback for the third DL subframe (including a special subframe) of SCell (Cell #2) may be dropped.

Although FIG. 36 shows the problems encountered in the ACK/NACK feedback for convenience of description, it should be noted that the above-mentioned problems may also occur in Channel State Information (CSI) transmission in addition to the ACK/NACK feedback. In this case, CSI may include a Channel Quality Indicator (CQI), a Rank Indication (RI), a Precoding Matrix Indicator (PMI), a Precoding Type Indicator (PTI), etc.

In addition, the inter-band CA has different inter-band frequency characteristics, such that propagation/path delay, a (fading) channel and a propagation/path loss may be different from one another.

Therefore, it may be necessary for the UE to establish different inter-band Tx/Rx times and different inter-band Tx powers. Specifically, if uplink transmission timing of the UE is different between cells, a transmission time may be restricted due to the timing difference.

For example, an ACK/NACK response to 'PDSCH with PDCCH' at the n0th DL subframe in an FDD (frame structure type 1) is transmitted through a PUCCH of the (n+4)-th UL subframe (here, a subframe is 1 ms long), because the processing time for demodulating a PDSCH of the UE and generating ACK/NACK is about 3 ms (or 3 ms−2*propagation delay). In this case, in an FDD situation composed of 2 cells, it is assumed that a frame boundary of a DL CC of a PCell is received earlier than a frame boundary of a DL CC of SCell. If ACK/NACK feedback is performed on the basis of a time of PCell, there is no problem in answering a reception signal of the n-th subframe at the (n+4)-th subframe from the viewpoint of PCell. However, from the viewpoint of SCell, since the n-th subframe is received later than the n-th subframe of PCell, the processing time needed for answering the (n+4)-th subframe of PCell may be relatively insufficient.

Therefore, in order to solve the above-mentioned problems, the present invention provides a method for effectively using different UL-DL configurations between cells, CCs, or bands, and/or a method for effectively supporting different uplink transmission timing points. However, although it is assumed that the use of different UL-DL configurations is applied to TDD for convenience of description, it should be noted that the use of different UL-DL configurations may also be applied to the case in which TDD and FDD are simultaneously established between cells. In addition, the use of different uplink transmission timing points may also be applied not only to TDD but also to FDD.

In order to enable a specific UE to support different UL-DL configurations between configured serving cells, the present invention proposes a method for using virtual PCell (s) or cell group(s) whereas it is designed to use transmission timing for only one control information and only one PCell.

That is, a specific UE may include one or more virtual PCells or one or more cell groups, and may use a transmission time point and/or PUCCH for either ACK/NACK or CSI for each virtual PCell or for each cell group, and then feed back the ACK/NACK or CSI.

In this case, the number of virtual PCells or cell groups capable of being assigned to a specific UE may be equal to or less than a total number of cells configured in the UE.

In the present invention, virtual PCell(s) or cell group(s) may be conceptually differnet from Pcell for use in LTE-A Rel-10.

That is, virtual PCell(s) or cell group(s) may be cell(s) in whcih PUCCH can be transmitted by the UE. Cell(s) incapable of transmitting PUCCH may be referred to as SCell(s). That is, supporting virtual Pcell(s) or cell group(s) may be conceptually identical to supporting multiple PUCCHs.

In addition, although virtual PCell(s) or cell group(s) are explicitly indicated or titled, cell(s) capable of transmitting PUCCH from among a plurality of cells may be conceptually identical to virtual PCell(s) of the present invention.

Alternatively, virtual PCell(s) or cell group(s) may be cell(s) in which the UE has a reference UL-DL configuration of HARQ-ACK (or ACK/NACK) feedback transmission timing (e.g., See FIG. 20) for downlink transmission. That is, if carrier aggregation (CA) of a cell in which two or more UL-DL configruations are assigned to the UE is configured, cell(s) that include(s) a reference UL-DL configuration of HARQ-ACK (or ACK/NACK) feedback transmission timing related to downlink transmission of at least one cell may be referred to as vitrual PCell(s).

In conclusion, virtual PCell(s) or cell group(s) may represent refernece cell(s) for performing at least one oepration from among the following oeprations. For convenience of description, virtual PCell(s) or cell group(s) may also be referred to as 'virtual PCell'. However, the scope or spirit of the present invention is not limited only to 'virtual Pcell', and can also be applied to multiple virtual Pcells, cell group, and multiple cell groups without change.

'virtual PCell' may indicate a reference cell for performing at least one of the following operations (1) to (7).

(1) Cell in which PUCCH transmission is possible may be used.

(2) Reference cell of ACK/NACK timing to PDSCH or PDCCH may be used.

(3) Reference cell of timing that indicates whether PHICH received by UE is an A/N response to PUSCH transmission, may be used.

(4) After PUSCH transmission of UE, a reference cell of timing related to PHICH-expected subframe may be used.

(5) If UE receives a UL grant (DCI format 0 or 4) at PDCCH, a reference cell of timing indicating when PUSCH transmission was allocated may be used.

(6) If PHICH is received as NACK by UE or if PHICH is not received by the UE, a reference cell of timing indicating when PUSCH retransmission will be performed may be used.

(7) If the UE transmits PUCCH, a reference cell of timing indicating when PDSCH or PDCCH(s) output(s) A/N responses.

In addition, a virtual PCell may not include DL-UL linkage (for example, linkage of system information block 2), may represent a virtual primary carrier, or may also be referred to as 'multiple anchor carriers'.

Detailed description of the present invention will hereinafter be described with reference to FIG. 37.

Figure 37:
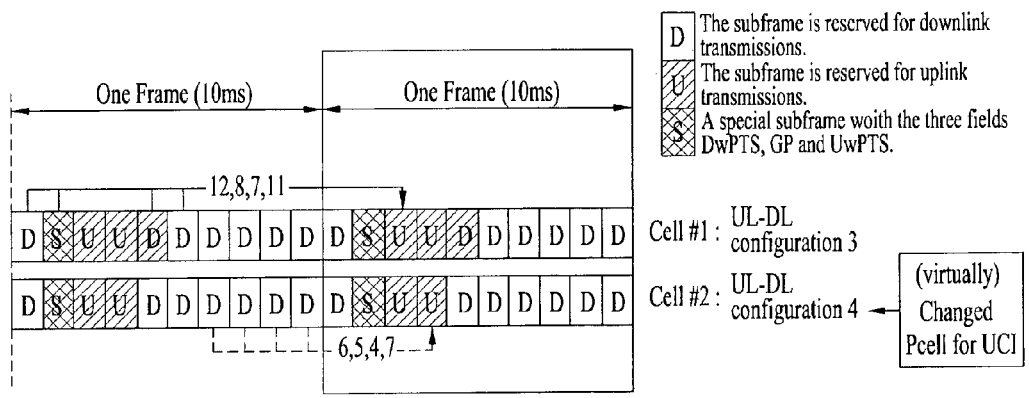
FIG. 37 shows exemplary cells including different UL-DL configurations according to the present invention.

FIG. 37 shows a method for transmitting control information using a virtual PCell when the UE configured serving cell exists.

FIG. 37 shows a method for changing a reference cell for UCI feedback so as to allow a specific UE to support different UL-DL configurations between the configured serving cells.

In more detail, the present invention provides a method for using a specific cell employing UL-DL configurations as a virtual PCell for at least one UCI feedback such as ACK/NACK. Herein, the UL-DL configurations include the smallest number of UL subframes in a frame and also include the largest number of DL subframes in the frame.

In this case, although change of the PCell for UCI feedback may indicate change of the actual PCell, the PCell change for UCI feedback may also indicate change of the virtual PCell. The change of the virtual PCell indicates that the actual PCell remains, one cell is selected from among a first cell and a second cell and the selected cell is assumed to be a PCell that includes the smallest number of UL subframes in the frame. Herein, the first cell is used as an application reference of a procedure and/or reference of at least one UCI feedback such as ACK/NACK, and the second cell includes the smallest number of UL subframes of the frame only in a cell having PUCCH. Under the above-mentioned assumption, a necessary procedure may be performed.

In the case of transmission of control information, the conventional method may be applied to DL-UL configuration of the changed virtual PCell.

Herein, the virtual PCell may be applied only to DL CCs, original PCell and SCells are used in DL CCs without change and may also be applied only to UL CCs, and the original PCell and SCells may be simultaneously applied to DL and UL CCs as necessary.

In FIG. 37, three UL subframes are present in a frame of a PCell (Cell #1), and two UL subframes are present in a frame of an SCell (Cell #2). In this case, if the PCell is Cell #1 including the smaller number of cell indexes, the present invention assumes that PCell for UCI feedback is determined to be Cell #2 including the smaller number of UL subframes in the frame.

Referring to FIG. 37, Cell #1 indicating an original PCell uses a UL-DL configuration 4 (two UL subframes exist in the frame), and Cell #2 indicating the Scell uses a UL-DL configuration 3 (three UL subframes exist in the frame). In this case, the number of UL subframes of PCell is larger than the number of UL subframes of the SCell, such that PCell change for UCI feedback occurs. By the PCell change, UCI feedback assumes that a virtual PCell (Cell #2) is a PCell). In this case, the ACK/NACK feedback is transmitted over a PUCCH of the virtual PCell, and is operated according to UL-DL configuration of the virtual PCell.

In the second frame of FIG. 37, through a PUCCH of a first UL subframe of the virtual PCell, ACK/NACK signals related to the previous $12^{th}$, $8^{th}$, $7^{th}$, $11^{th}$ DL subframes of two cells are collected (for example, multiplexing or bundling) and transmitted.

In this case, the virtual PCell (where a UL subframe instead of a DL subframe is present in the time domain) and at least one virtual SCell may be present in the time domain as necessary. In this case, ACK/NACK may not be transmitted, or ACK/NACK may also be transmitted as a predetermined fixed value or another value (e.g., a repetition value of A/N information regarding a DL subframe of the corresponding virtual PCell) based on a predetermined fixed rule.

Provided that non-transmission of ACK/NACK is determined, the number of ACK/NACK payloads or the number of payloads when the same DL-UL configurations are used between cells may be changed. If the same DL-UL configurations are used and full multiplexing is also used without ACK/NACK bundling, the number of ACK/NACK payloads transmitted over one PUCCh of a specific virtual PCell may be determined as shown in the following equation 3.

$$\text{Payload} = \sum_{i=0}^{\text{number of configured cells}-1} W \cdot TB_i \qquad [\text{Equation 3}]$$

$$= W \cdot \sum_{i=0}^{\text{number of configured cells}-1} TB_i$$

In Equation 3, W is a bundling window size, and may be set to M of Table 20. If the UL-DL configuration between cells are identical to each other, the same inter-cell value may be achieved. In addition, $TB_i$ is the number of maximum transport blocks supportable by i-th configured serving cells, or is the number of codewords supportable by the i-th configured serving cells. $TB_i$ is 1 or 2 in LTE-A Rel-10. Although the 2-configured cell can use the smaller number of codewords, ACK/NACK feedback may be designed on the basis of a maximum number of codewords for each cell.

If a time domain of a DL subframe for feedback is a UL subframe, A/N based information can be transmitted using the same payload as in Equation 3. In other words, ACK/NACK information may be repeatedly inserted in previous cells of the above-mentioned information, or a predetermined fixed value (e.g., NACK or NACK/NACK) may be transmitted, such that payload can be maintained.

On other hand, if a time domain of the DL subframe for feedback is a UL subframe, the payload may be reduced in size. In this case, Equation 3 may also be represented by the following equation 4.

$$\text{Payload} = \sum_{i=0}^{\text{number of configured cells}-1} (W_{PCell}) \cdot TB_i - \qquad [\text{Equation 4}]$$

$$\sum_{i=1}^{\text{number of configured cells}-1} (N_{UL,i} - N_{UL,PCell}) \cdot TB_i$$

In Equation 4, $W_{PCell}$ is a bundling window size of a PCell, may be set to M of Table 20. $TB_i$ is the number of maximum transport blocks supportable by i-th configured serving cells, or is the number of codewords supportable by the i-th configured serving cells. $N_{UL,i}$ is the number of UL subframes contained in a frame of the i-th configured serving cell, and $N_{UL,PCell}$ is the number of UL subframes of a frame of the PCell.

If the same DL-UL configuration is used in cells, a second term becomes zero '0' and disappears, such that Equation 4 becomes identical to Equation 3. However, according to the present invention, provided that the UL-DL configuration having a UL subframe in which the number of virtual SCells is higher than the number of virtual PCells is configured, the number of DL subframes contained in the virtual SCell(s) is less than the number of virtual Pcells by a predetermined number corresponding to a difference in number between the UL subframes, such that A/N payload for the corresponding part can be reduced.

For example, provided that PCell is denoted by 'UL, DL, DL, DL' and SCell is denoted by 'DL, DL, DL, DL', UCI feedback enables the SCell to be used as a virtual PCell, such that UCI feedback is achieved on the basis of the virtual PCell. In case of a codebook size used when each of the cells include a maximum single TB (codeword), M=4 is applied under channel selection. In the case of Format 3, the codebook size is set to 8, and the corresponding information is piggybacked through a PUSCH. If there is no UL DAI, the codebook size is set to 8 and the corresponding information is piggybacked through a PUSCH. In addition, if UL DAI exists and is identical to a DL DAI counter value, a UL part of the original PCell is considered such that the codebook size is set to 8. Alternatively, the UL part has already been recognized as a UL by the base station (BS), the corresponding part is excluded from the codebook size, such that the codebook size may be set to 7.

If a time domain of the DL subframe for the feedback is a UL subframe of a specific cell and associated ACK/NACK is not transmitted, through a PUCCH of the first UL subframe of the virtual PCell (cell #2), ACK/NACK signals related to the previous $12^{th}$, $8^{th}$, and $11^{th}$ DL subframes and ACK/NACK signals related to the $7^{th}$ DL subframes of a cell (Cell #1) including a DL subframe may be collected and transmitted as shown in FIG. 37. In this case, the ordering sequence for collecting ACK/NACK signals of the above-mentioned subframes is not limited only to the present invention and can also be applied to other examples as necessary without departing from the scope or spirit of the present invention. Through a PUCCH of the second UL subframe of the virtual CPcell, ACK/NACK signals of the previous $6^{th}$, $5^{th}$, $4^{th}$, and $7^{th}$ DL subframes may be collected and transmitted.

Therefore, the embodiments of the present invention can prevent ACK/NACK related to specific DL subframes from being dropped.

In LTE-A, bundling between ACK/NACK information may be performed. In this case, the term 'bundling' indicates that the number of bits of the above-mentioned information is reduced through logical AND (or OR) operation between the corresponding information pieces.

For example, assuming that 2 ACK/NACK information units are determined to be ('0', '0'), ('0', '1'), ('1', '0'), or ('1', '1'), '0', '0', '0', or '1' may be obtained through bundling of the logical AND operation.

In the LTE-A TDD, time-domain bundling may be performed. The time-domain bundling means bundling of the ACK/NACK information units of a plurality of contiguous subframes per cell. If the number of original ACK/NACK bits is 4 or higher, the time-domain bundling is peformred using 'PUCCH format 1b with channel selection'.

In addition, according to application of the present invention, the transmission format is not limited. Various formats may be used, for example, 'PUCCH Format 1b with channel selection', 'PUCCH Format 3', etc.

In addition, various methods for processing several ACK/NACK signals contained in the above-mentioned bundling window, for example, spatial bundling, time-domain bundling, CC-domain bundling, or multiplexing, are not limited only to the scope of the present invention.

In addition, according to one embodiment of the present invention, a method for employing several cell groups may be applied.

That is, in order to enable a specific UE to support different UL-DL configuration between the configured serving cells, the present invention provides a method for employing multiple PCells instead of only one PCell.

A specific UE may have at least one PCell(s), and may feed back necessary information using a PUCCH for ACK/NACK or CSI at every PCell.

In this case, the number of PCells capable of being allocated to a specific UE may be identical to or less than a total number of UE configured cells. In this case, the control information is transmitted using the legacy method of a DL-UL configuration for each PCell.

First, the UE may include the number (e.g., x=2) of PCells (e.g., the number of PCells may be predetermined or may also be indicated through signaling). If several PCells are present, the PCell may have different UL-DL configurations. However, in the case of one or more PCells (under the condition that one original PCell and at least one SCell are used in UL CCs without change), at least one PCell and at least one SCell may exist only in DL CCs (under the condition that one original PCell and at least one PCell are used in DL CCs without change), at least one PCell and at least one SCell may exist only in UL CCs, at least one PCell and at least one SCell may simultaneously exist in DL and UL CCs.

Next, the UE may include at least one SCell related to each PCell. However, SCell related to PCell may not exist as necessary. In this case, as to at least one SCell related to PCell, assuming that a cell that serves as a UCI feedback reference of the cells or an application reference of the M value (the size of bundling windows) is used as a PCell and/or another cell including a PUCCH is used as a PCell, the at least one SCell related to PCell means cells that are combined into one group along with the above-mentioned PCell.

That is, UCIs of the associated PCell and SCells are simultaneously collected and the collected result is fed back through one PUCCH. In this case, the associated PCell and SCells( ) may be located in the same band (potentially same RF).

In this case, if it is assumed that one or more SCell(s) related to a specific PCell are combined into one group and this group is called a cell group, all cells contained in one cell group may be configured to have the same UL-DL configurations. In this case, formation/configuration of the cell group is logically meaningful, and may not indicate actual physical group generation. If there is no associated SCell, the corresponding cell group may also be composed of PCell only.

Therefore, the UE may include one or more cell groups, and each cell group may include one PCell and may include SCell(s) related to the PCell may be present as necessary.

In addition, in association with one or more cell groups, the UE may transmit ACK/NACK feedback, CSI reporting, or sounding information through a PUCCH of the PCell for each cell group. In this case, the cell group may be established to have the same DL-UL configurations. The above-mentioned problems of the above-mentioned related art (legacy technology) are not generated in the cell group. Different radio frequency (RF) units may be required between cell groups.

In accordance with a first embodiment of the present invention, cells contained in the same cell group may be operated in the intra-band CA environment, and the inter-band CA environment may be provided between the cell groups. In this case, the number of PCells capable of being assigned to a specific UE may be equal to or less than a total number of the UE configured inter-bands.

Meanwhile, according to one embodiment of the present invention, a method different from the above-mentioned method may also be applied as necessary.

First, the UE may support only a specific number (e.g., x=2, the specific number may be predetermined or indicated through signaling) of UL-DL configurations as necessary, and may support only different UL-DL configures to be described later. The number of UL-DL configurations may be different in individual UEs, and may also be equally applied to all UEs. In this case, the BS may configure, for the corresponding UE, only cells employing different UL-DL configurations, the number of which is X or less.

For example, if it is assumed that the number X is identical in all UEs and is set to 2 in all the UEs, the BS may configure cells using only two UL-DL configurations different from each other.

Next, the UE receives indication information of the configured serving cells from the BS, and also receives assignment information of the received indication information. In this case, although different UL-DL configurations may be implemented in individual cells, only X or less UL-DL configurations may be present as necessary. The UE may determine cells having the same UL-DL configurations from among the configured serving cells to be a cell group. Since X or less DL-UL configurations may exist, X or less cell groups may be generated. The above-mentioned cell group formation/configuration may be logically meaningful, and may not indicate generation of the actual physical group. That is, the cell group may include different UL-DL configurations, and may be composed of at least one Cell.

In addition, the UE may determine a specific cell group for each formed/configured cell group to be a PCell of the cell group. Although the above-mentioned information may be indicated through signaling by the BS, the above-mentioned information may also be established in the UE according to the predetermined rule. For example, a cell having the smallest cell ID per cell group may be determined to be PCell.

In addition, in association with one or more cell groups, the UE may transmit ACK/NACK feedback, CSI reporting or sounding data, etc. through PUCCH of PCell of each cell group. In this case, the cell group may be configured to include the same UL-DL configurations, such that the related art problems are not generated in the cell group. Different RF units may be needed for cell groups.

In accordance with the above-mentioned embodiment, cells contained in the same cell group may belong to the intra-band CA environment, and the inter-band CA environment may be implemented between the cell groups. In this case, the number of PCells capable of belonging to a specific UE may be identical to or less than a total number of UE configured inter-bands.

Figure 38:
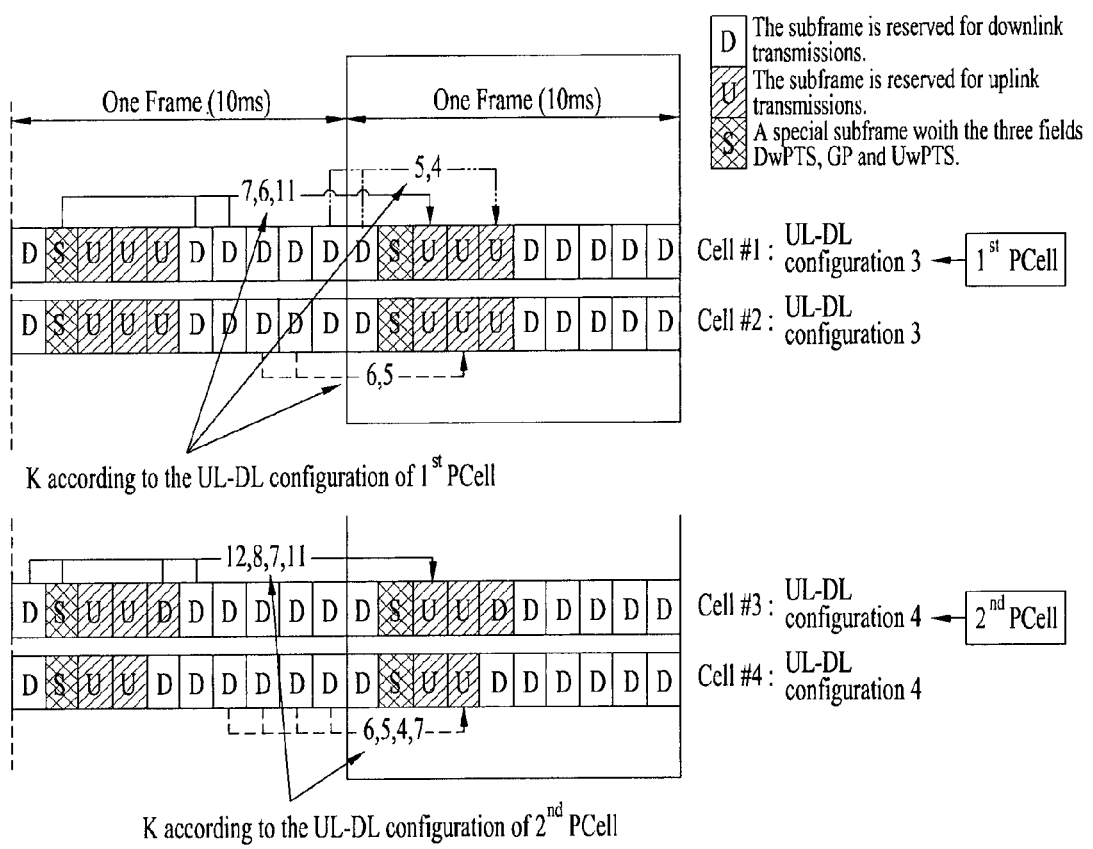
FIG. 38 shows exemplary cells using different UL-DL configurations according to the present invention.

For example, it is assumed that there are 4 configured serving cells as shown in FIG. 38. In this case, it is assumed that the intra-band CA is assigned between the configured serving cells (cell #1 and cell #2), and the intra-band CA is assigned to two other configured serving cells (cell #3 and cell #4). However, it is assumed that two cells, each of which is the intra-band CA, are composed of inter-band CAs, frequencies of which are spaced apart from each other.

In this case, each intra-band CA may be composed of one cell group. That is, Cell #1 and Cell #2 may be combined into one cell group, and Cell #3 and Cell #4 may be combined into another cell group. A cell including a lower cell ID in each cell group may be used as a PCell (wherein PCell may also be indicated by a predetermined rule or BS signaling). Cell #1 and Cell #2 acting as the intra-band CA may use the same UL-DL configurations, and Cell #3 and Cell #4 acting as the Intra-band CA may also use the same UL-DL configuration.

That is, different UL-DL configurations are present in a UE including a plurality of configured serving cells. However, through the cell group between cells employing the same UL-DL configurations, the legacy technology (for example, ACK/NACK feedback per group, CSI reporting, sounding transmission, etc.) may be applied without change.

The above-mentioned cell group configuration/management may be configured in the UE using a variety of methods. A method for constructing or indicating a plurality of cell groups and a method for constructing or indicating a PCell for each cell group are not limited only to the present invention although other methods that are not directly mentioned in the present invention are used.

In the application of the present invention, the transmission format is not limited only to the present invention. 'PUCCH Format 1b with channel selection' or 'PUCCH Format 3' may be used. In addition, methods (e.g., spatial bundling or time domain bundling or CC-domain bundling or multiplexing, etc.) for processing/transmitting multiple ACK/NACK signals within the bundling window are not limited only to the present invention.

If the time-domain bundling is used, application of 'Table 10.1-1: Downlink association set index K: $\{k_0, k_1, \ldots k_{M-1}\}$ for TDD' of TS 36.213 v10.0.1 may be replaced with M value indicating the number of sets (=size of bundling windows) instead of the actual K sets.

The number of multiple PCells may be set to a maximum number of inter-bands operated in a system or UE.

In addition, the number of multiple PCells may be determined by a function related to the number of configured serving cells having different UL transmission time points.

In this case, although specific cell(s) are explicitly identical to PCell(s), PCell(s) may be implicitly used according to the predetermined rule.

For example, the following methods may be used.

PCell(s) may be determined by a predetermined rule from among Cell ID (identity) or index. In this case, a cell having the smallest number of index (lowest index) from among a plurality of cell IDs may be used 'PCell'. In addition, the rule may be modified even when multiple carriers are used. For example, if different PCells are used in the inter-band, a cell having the smallest number of cell IDs within the intra-band may be used or employed as PCell contained in the intra-band In other words, UCI can be transmitted within a cell having the lowest index of the intra-band. In the case of using multiple inter-bands, a PCell for transmitting multiple UCIs may exist.

In another example, provided that multiple PCells are used on the basis of a timing advance value, a cell having the lowest index from among cells (also called a cell group) may be indicated or used as a PCell of the cell group, wherein the cells of the cell group may have the same multiple timing advance values or a difference between the cells is smaller than a predetermined value.

That is, the UE may transmit UCI transmission in a cell having the lowest cell ID within the cell group. If one or more cell groups are present, PCell(s) for transmitting at least one UCI transmission may exist. In the meantime, cell identity may also be called a 'physCellId' serving as an RRC parameter.

Meanwhile, the number of virtual PCells may be identical to or less than the number of inter-bands used in the system or UE.

In addition, the number of virtual PCells may be set to the number of configured serving cell groups in which a difference in UL transmission timing is larger than a predetermined value.

In addition, a virtual PCell within one cell group may be directly indicated by RRC/MAC/PHY signaling by the base station (BS), or may also be determined according to the predetermined rule as necessary.

In this case, the following methods may be used according to the predetermined rule.

First, the virtual PCell may be determined on the basis of a predetermined rule from among configured cells of the cell group. For example, a cell having the lowest index from among the configured cells of the cell group is used as a virtual PCell.

Next, after completion of configuration within the cell group, a virtual PCell may be determined by a predetermined rule from among activated cells. For example, a cell having the lowest index from among the activated cells of the cellg group may be used as a virtual PCell.

In the meantime, according to the present invention, the UE may discriminate a cell group according to the predetermined rule.

Firstly, the case in which different multiple PCells are used between the inter-bands will hereinafter be described in detail.

In this case, the UE can discriminate between intra-band cells and inter-band cells from among one or more cells. Therefore, the UE may determine cells belonging to a single intra-band to be one cell group without additional signaling.

In addition, the inter-band cells may be classified into different cell groups such that a plurality of cells can be discriminated from each other. That is, as many cell groups as the number of inter-bands can be generated. Thereafter, a cell having the smallest cell index within each cell group is determined to be a PCell, and the remaining cells are determined to be SCell(s).

Next, the case in which multiple PCells are used on the basis of the timing advanced value will hereinafter be described in detail.

In this case, it is assumed that individual cells can use different uplink transmission time points. Therefore, it is assumed that different timing advance (TA) commands are received in and applied to individual cells.

The UE includes a plurality of cells in a single cell group, wherein the plurality of cells may have the same timing advance (TA) values or a difference among the cells is smaller than a predetermined value. Each cell, TA value of which is higher than a predetermined value, is included in another cell group. Thereafter, a cell having the smallest cell index from among each cell group is determined to be a PCell, and the remaining cells are determined to be SCell(s).

On the other hand, according to one embodiment of the present invention, indication/threshold of a virtual PCell may be indicated. That is, a parameter for indicating indication or threshold of a specific center point from among ServCellIndex is introduced, the UE can determine ServCellIndex to be one or more cell groups using the corresponding parameter.

For example, if ServCellIndex is in the range of 0,1,2,3,4,5,6,7, the parameter (x) may indicate the entire range (0,1,2,3,4,5,6,7) or some parts (e.g., 2,3,4,5 or 1,2,3,4,5,6 or 3,4,5,6,7, etc.).

The UE divides a cell group on the basis of the parameter X. For example, cells, each of which has a cell index lower than the parameter X, are assigned to one cell group, the cells, a cell index of which is identical to or higher than the parameter X, may be assigned to the other cell group.

Thereafter, a cell having the smallest cell index of each cell group is determined to be a PCell, and the remaining cells are determined to be SCell(s). For convenience of description, although the above-mentioned parameter is assigned to one value (X) such that the parameter (X) is used to establish two cell groups and two PCells, the scope or spirit of the present invention is not limited thereto, and the parameter may also be designed to have y values such that y cell groups and y PCells can be established.

In this case, the above-mentioned reference can be applied to SCellIndex. The parameter (X) may indicate the entire part (0,1,2,3,4,5,6,7) or some parts [e.g., (2,3,4,5), (1,2,3,4,5,6) or (3,4,5,6,7), etc.]. The UE divides cell groups on the basis of the parameter (X). For example, cells, each of which has a cell index lower than the parameter X, may be classified into one group, and cells, each of which has a cell index equal to or higher than the parameter X, may be classified into the other cell group.

Meanwhile, although one virtual Pcell is assigned to each cell group for convenience of description, the presence or absence of a virtual PCell in a specific cell group can be indicated by the BS through a PHY, MAC, or RRC. If the virtual PCell is not present in the specific cell group, an additional method for PUCCH transmission may be defined.

In addition, PUCCH transmission of a cell group including no virtual Pcell may be based on PUCCH transmission within a predetermined cell group. For example, PUCCH transmission of a cell group including no virtual Pcell may employ the original PCell.

In addition, PUCCH transmission of a cell group including no virtual PCell may also employ PUCCH transmission in a cell group including the lowest cell group index.

On the other hand, information as to whether PUCCH transmission of the cell group including no virtual PCell follows PUCCH transmission in a certain cell group may be indicated by the BS through PHY, MAC, or RRC.

In this case, the above indication may include indication regarding a cell group ready to perform PUCCH transmission, indication regarding a cell group ready to perform PUCCH transmission, etc.

In addition, when constructing a cell group, an original PCell is designed to include the lowest cell group index, so that the system can be constructed in such a manner that the rule of the cell group including the lowest cell group index is satisfied in a special case (e.g., a cell group including no virtual PCell).

By the above-mentioned methods, multiple cell groups and multiple PCells may be constructed.

In the meantime, transmission of control information using the multiple cell groups or multiple PCells can be achieved as follows.

First, ACK/NACK timing is applied on the basis of UL/DL configurations of a PCell from the viewpoint of an inter-cell UL subframe, such that all the ACK/NACK signals are collected and transmitted through PCell PUCCH.

However, if a UL subframe is present in Scell at a time point of a DL subframe of PCell, i.e., if ACK/NACK transmission is needed, PUCCH can be transmitted through a virtual Pcell having the lowest index in Scell.

In this case, ACK/NACK timing may satisfy UL/DL configuration of a virtual Pcell.

In addition, the ACK/NACK timing may be ACK/NACK responses to DL subframes not transmitted at the ACK/NACK timing (equal to or earlier than the (n−4)th subframe of PUCCH transmission at the n-th subframe) of the original PCell.

In addition, ACK/NACK timing on the basis of UL/DL configruations of each cell is applied to a time point corresponding to the inter-cell UL subframe, such that ACK/NACK responses of the UL subframe are collected through PUCCH and then transmitted.

However, if the UL subfarme exists in the Scell at a time point of a DL subframe of a Pcell, (if ACK/NACK transmission is needed) PUCCH transmission is performed through a virtual Pcell including the lowest index in Scell.

In this case, the ACK/NACK timing may follow UL/DL configruation of the virtual Pcell. In addition, the ACK/NACK timing may be ACK/NACK responses to DL subframes not transmitted at the ACK/NACK timing (equal to or earlier than the (n−4)th subframe of PUCCH transmission at the n-th subframe).

On the other hand, according to one embodiment of the present invention, in order to enable a specific UE to support differnt UL-DL configruations between the configrued serving cells, the downlink association set index K of Table 20 or associated value M (Size of bundling windows) may be used on the basis of a cell having many more DL subframes (or a cell having a smaller number of DL subframes) from among the configured serving cells, in such a manner that the downlink association set index K and associated value M can be applied to Table 20.

Figure 39:
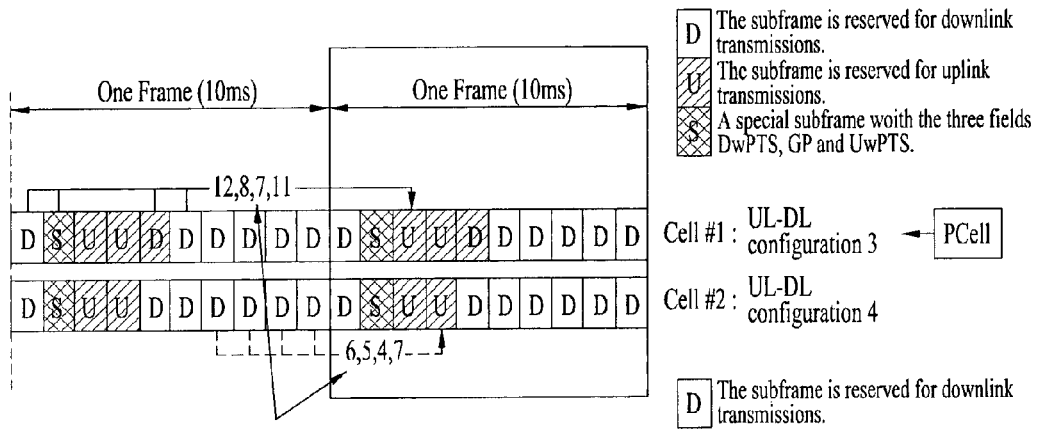
FIG. 39 is a conceptual diagram illustrating transmission of control information on the basis of a cell including many more downlink subframes according to the present invention.

Referring to FIG. 39, in the second frame, ACK/NACK signals of the previous $12^{th}$, $8^{th}$, $7^{th}$, and $11^{th}$ DL subframes of two cells are collected through a PUCCH of the first UL subframe of a PCell, and the collected ACK/NACK signals are then transmitted.

In this case, a cell including a UL subframe instead of a DL subframe may be present in the time domain.

In this case, the associated ACK/NACK may not be transmitted, or may be transmitted in the form of a predetermined fixed value or a predetermined fixed rule-based value (e.g., repetition value of A/N information to DL subframe of the corresponding PCell).

Provided that the system is designed not to transmit the ACK/NACK, the number of ACK/NACK payloads and the number of payloads may be different from each other under the condition that the same DL-UL configuration is used between cells.

If the same DL-UL configurations are used and full multiplexing is used without ACK/NACK bundling, the number of ACK/NACK payloads transmitted over a single PUCCH of a specific cell can be determined as shown in the following equation 5.

$$\text{Payload} = \sum_{i=0}^{\text{number of configured cells}-1} W \cdot TB_i \qquad \text{[Equation 5]}$$
$$= W \cdot \sum_{i=0}^{\text{number of configured cells}-1} TB_i$$

In Equation. 5, W is a bundling window size, and may be equal to M of Table 20. If the UL-DL configurations between cells are identical to each other, the same values may be assigned between the cells. $TB_i$ is a maximum number of transport blocks (TBs) supportable by the i-th configured serving cells or the number of codewords supportable by the i-th configured serving cells. $TB_i$ may be set to 1 or 2 in LTE-A Rel-10. Although the cell in which '2' is assigned may use a codeword smaller than '2', it should be noted that ACK/NACK feedback must satisfy a maximum number of codewords per cell.

If the time domain of the DL subframe for feedback belongs to the UL subframe, other information may be transmitted to such A/N information using the same payload shown in Equation 5.

That is, ACK/NACK information of the previous cell may be repeatedly inserted in the above-mentioned information, a predetermined fixed value is transmitted (e.g., NACK or NACK/NACK), such that payload can be maintained.

In contrast, if a time domain of the DL subframe for the feedback belongs to the Ul subframe, the size of payload can be reduced. In this case, Equation 5 may be modified into the following equation 6.

$$\text{Payload} = \sum_{i=0}^{\text{number of configured cells}-1} (W_{TCell}) \cdot TB_i - \qquad \text{[Equation 6]}$$
$$\sum_{i=1}^{\text{number of configured cells}-1} (N_{UL,i} - N_{UL,TCell}) \cdot TB_i$$

In Equation 6, W is a bundling window size of a PCell, and may be equal to M of Table 20. $TB_i$ is a maximum number of transport blocks (TBs) supportable by the i-th configured serving cells or the number of codewords supportable by the i-th configured serving cells. $N_{UL,i}$ is the number of UL subframes contained in a frame of the i-th configured serving cell, and $N_{UL,PCell}$ is the number of UL subframes of a frame including the UL-DL configuration having the smallest number of UL subframes from among target cells (configured serving cells).

If the same DL-UL configuration is used in cells, the second term becomes zero and disappears, such that Equation 6 becomes identical to Equation 5. However; according to the present invention, provided that the UL-DL configuration in which the number of UL subframes contained in a target cell is ghiehr than the number of UL subframes of the specific cell is configured, the above-mentioned value is present, the number of DL subframes contained in cell(s) is less than the number of DL subrrames of the target cell by a predetermined number corresponding to a difference in number between the UL subframes, such that A/N payload for the corresponding part can be reduced.

If a time domain of the DL subframe for the feedback corresponds to a UL subframe of a specific cell, and associated ACK/NACK is not transmitted, the downlink association set index (K) is operated according to a cell including the UL-DL configuration including the smallest number of UL subframes from among the configured serving cells.

In this case, the reference cell may not be identical to a PCell.

Through a PUCCH of the first UL subframe of a PCell, ACK/NACK signals of the previous $12^{th}$, $8^{th}$, and $11^{th}$ DL (or special) subframes of two cells and ACK/NACK signals of the $7^{th}$ DL subframes including DL subframes may be collected and transmitted.

In this case, the ordering sequence for collecting ACK/NACK signals of the above-mentioned subframes is not limited only to the present invention. Through a PUCCH of the second UL subframe of a PCell, ACK/NACK signals of the previous $6^{th}$, $5^{th}$, $4^{th}$, and $7^{th}$ DL subframes of two cells may be collected (multiplexing or bundling) and transmitted. Therefore, the embodiment of the present invention can prevent ACK/NACK responses to specific (or special) DL subframes) from being dropped.

In this case, although a PUCCH can be transmitted through a PCell in the same manner as in Rel-10, it should be noted that the PUCCH may also be transmitted through another SCell (for example, a cell that includes a UL-DL configuration having the smallest number of UL subframes from among the configured serving cells).

On the other hand, according to another embodiment of the present invention, bundling is applied to the embodiment of the present invention, such that a UCI feedback can be performed on the basis of a PCell in the same manner as in the related art.

In order to enable a specific UE to support the use of different UL-DL configurations between the configured serving cells, the present invention proposes a method for performing UCI feedback on the basis of the PCell as in the legacy Rel-10.

However, if information not contained in a feedback occurs, the corresponding information and other information are bundled according to the predetermined rule, such that the bundled result is transmitted.

For example, the predetermined rule may indicate neighbor subframes (e.g., the earlier or later subframe on a time axis) each including a UCI), or may also indicate neighbor CC (for example, cell ID+1 or cell ID−1, etc.) including a UCI of the same subframe.

In addition, the term "bundling" indicates that the number of bits of the above-mentioned information is reduced through the logical AND (or OR) operation between the corresponding information pieces. For example, provided that 2 ACK/NACK information units are determined to be ('0', '0'), ('0', '1'), ('1', '0'), or ('1', '1'), '0', '0', '0', or '1' may be obtained through bundling of the logical AND operation. That is, the embodiment of the present invention uses the bundling scheme, such that it can use the legacy technology without changing PCell or payload.

Figure 40:
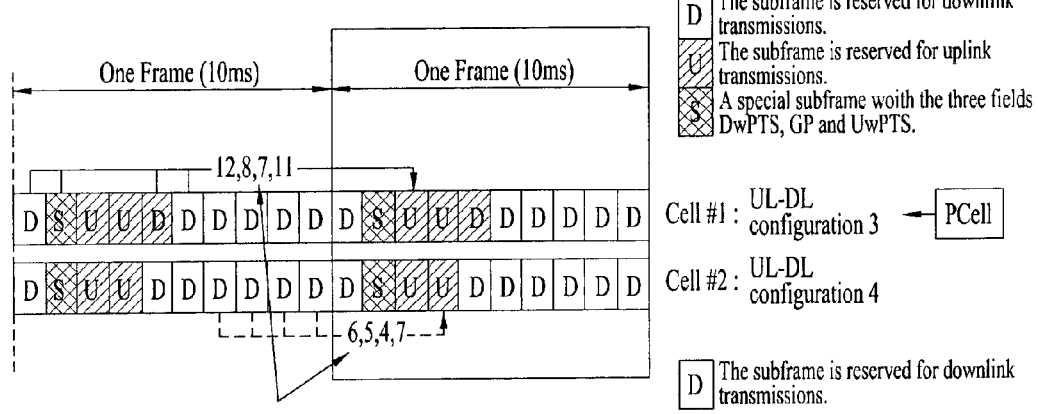
FIG. 40 is a conceptual diagram illustrating a method for transmitting control information on the basis of a conventional primary cell using the bundling according to the present invention.

FIG. 40 conceptually shows the predetermined rule. If 2 configured serving cells have different UL-DL configurations, and if information not contained in a feedback occurs, the predetermined rule shown in FIG. 40 may be used. The above-mentioned information is bundled with the temporally-rear subframe (located at the rear of a time axis) including the UCI, such that the bundled result is transmitted, as shown in FIG. 40.

As can be seen from FIG. 40, the downlink association set index K is used according to UL-DL configuration of a PCell.

However, if a cell including a UL subframe instead of a DL subframe is present in a specific time domain from among K sets, the DL subsframes are bundled with information regarding the rear DL subframes of a time domain within the cell.

Therefore, the present invention can feed back UCIs of all DL subframes (or all special subframes) located across a plurality of cells using the legacy method.

In addition, according to another embodiment of the present invention, if information not contained in feedback occurs, the present invention can provide a method for performing UCI feedback at a subframe for transmitting the rear UCI information located closest to the time domain.

If bundling is performed as described above, the loss of information may occur due to bundling.

In order to prevent such bundling from being lost, under the condition that 2 configured serving cells have different UL=DL configurations, if information not contained in a feedback is generated, the generated information may be transmitted simultaneously with information of a subframe where the nearest UCI information including a UCI is fed back according to a predetermined rule, resulting in prevention of the loss of bundling.

Figure 41:
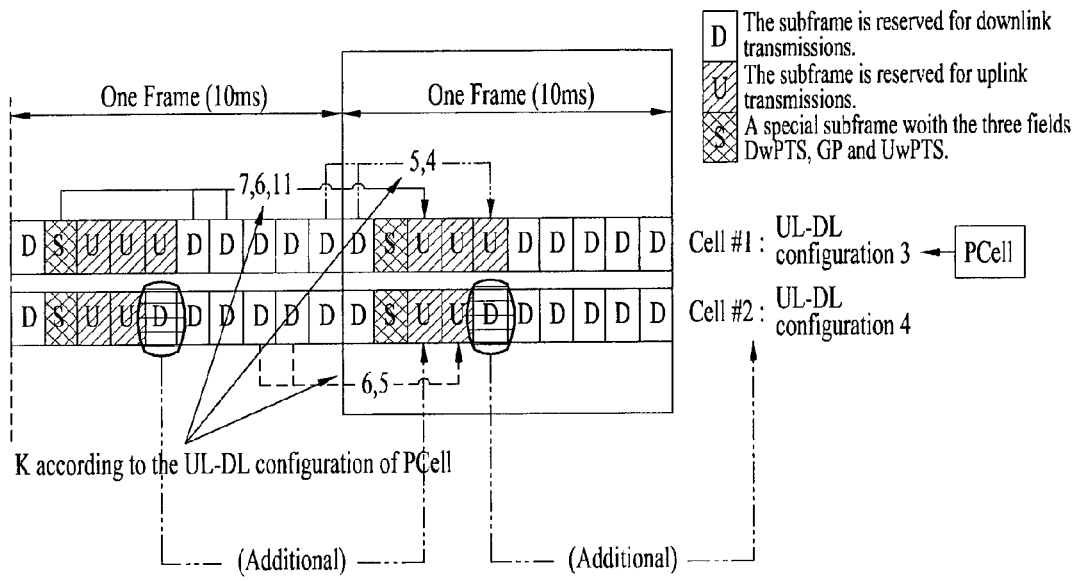
FIG. 41 is a diagram illustrating a method for transmitting control information at a subframe transmitting the rear UCI information located closest to a time domain when information contained in feedback occurs.

In FIG. 41, a downlink association set index K is used according to a UL-DL configuration of a PCell.

However, if a cell including a UL subframe instead of a DL subframe is present in a specific time domain of K sets, such DL subframe ($5^{th}$ subframe contained in a first frame of Cell #2 of FIG. 41) may be transmitted simultaneously with a subframe (i.e., third subframe contained in the second frame of Cell #1 of FIG. 41) where the nearest UCI in a time domain of a cell is fed back.

The above-mentioned transmission is denoted by the term 'additional' in FIG. 41. In this case, 'simultaneous transmission' increases transmission payloads so that the corresponding data is transmitted through physical resources. In addition, such transmission may also represent that the corresponding data is separately transmitted through other PUCCH resources.

In accordance with the present invention, there is no limitation in transmission formats for use in the present invention. For example, 'PUCCH Format 1b with channel selection' or 'PUCCH Format 3' may be used. In addition, various methods (for example, spatial bundling, time-domain bundling, CC-domain bundling or multiplexing) for processing and transmitting multiple ACK/NACK signals within the bundling window are not limited only to the present invention.

In the meantime, according to another embodiment of the present invention, the present invention can also provide a method for establishing a bundling window into all carriers on the basis of a PCell, and performing associate UCI feedback.

That is, according to another embodiment of the present invention, in order to enable a specific UE to support the use of different UL-DL configurations between the configured serving cells, the UCI feedback method for use in the non-CA environment is applied to each DL CC, such that the application results are collected and transmitted through the Rel-10 PUCCH.

In addition, according to still another embodiment of the present invention, the present invention can provide a method for generating UCI feedback on the basis of each cell, collecting the generated UCI feedbacks, and transmitting the collected results.

In other words, in order to enable a specific to support the use of different UL-DL configurations between the configured serving cells, the present invention can separately apply the legacy Rel-10 method to each configured serving cell.

The present invention collects UCI pieces using the UCI feedback method (this method can be extended to a UCI feedback method under the CA environment for each configured serving cell group) under the non-CA environment for each configured serving cell, and transmits the collected UCI pieces of individual cells through a specific PUCCH.

Therefore, payloads of UCI pieces of individual configured serving cells may be different from each other.

Figure 42:
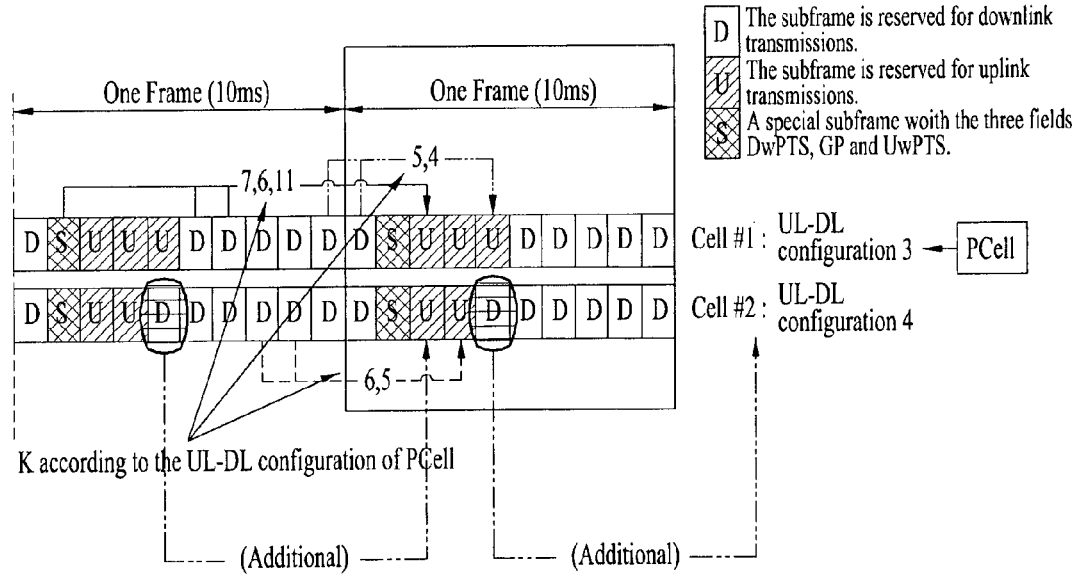
FIG. 42 is a conceptual diagram illustrating a method for establishing a bundling window to all serving cells on the basis of a primary cell, and transmitting control information according to the present invention.

Referring to FIG. 42, if 2 configured serving cells have different UL-DL configurations, UCI pieces under the independent non-CA environment of each cell may be collected.

That is, UCI information of individual cells is collected using a downlink association set index K according to DL-UL configuration of each cell. Thereafter, the UCI information collected in each cell may be transmitted through PUCCH resources of a specific cell (e.g., PCell of FIG. 42).

In accordance with the application of the present invention, transmission formats are not limited only to the present invention, and other transmission formats can also be applied to the present invention as necessary. 'PUCCH Format 1b with channel selection' or 'PUCCH Format 3' format may be used. In addition, a method (for example, spatial bundling, time-domain bundling, or CC-domain bundling, or multiplexing) for processing and transmitting a plurality of ACK/NACK signals contained in the bundling window is not limited only to the present invention, and can also be applied to other examples as necessary.

In FIG. 42D, if 'PUCCH 1b with channel selection' is applied to payload greater than 4 bits, M=3 (7, 6, or 11) of Cell #1 is made at a first UL subframe of the second frame, and M=4 (12, 8, 7, or 11) of Cell #1 is also made at the first UL subframe of the second frame.

The legacy Rel-10 channel selection mapping table includes a plurality of cells having the same M values serving as the fixed values.

Therefore, the present invention can additionally define the channel selection mapping table for cells having different M values, and use the define channel selection mapping table.

In addition, the highest value is selected from among different M values as described above, and a predetermined value is substituted into a specific part that contains an insufficient amount of information due to a low M value, such that the legacy channel selection mapping table can be utilized according to the present invention.

For example, a predetermined location (e.g., the last position) of Cell #1 having M=3 is always substituted into 'DTX' or 'NACK', M=4 is decided. Then, combination in association with Cell #1 having M=4 is performed, such that, after mapping is performed using the legacy channel selection mapping table, the mapping result can be transmitted.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS and a UE. Such transmission/reception (Tx/Rx) relationship may be equally or similarly extended to signal Tx/Rx relationship between a BS and a relay or between a BS and a relay. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to various wireless access systems including a $3^{rd}$ Generation Partnership Project (3GPP) LTE system. Besides the 3GPP LTER system, the embodiments of the present invention are applicable to all technical fields to which wireless access systems are applied. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting control information to a base station by a user equipment in a wireless communication system supporting aggregation of a plurality of serving cells, the user equipment being configured with the plurality of serving cells including a primary cell and a secondary cell operating in time division duplex (TDD), the method comprising:

receiving each of a physical downlink control channel (PDCCH) and a physical downlink shared channel (PDSCH) from the base station in a downlink subframe through a respective one of the primary cell and secondary cell; and transmitting control information regarding the received PDSCH to the base station in an uplink subframe of the primary cell or the secondary cell, wherein, when the primary cell has a first uplink-downlink (UL-DL) configuration and the secondary cell has a second UL-DL configuration different from the first UL-DL configuration, an UL-DL timing relation of each of the primary cell and secondary cell is selected to be equal to a timing relation of the one of the first UL-DL configuration or the second UL-DL configuration having a smallest number of uplink subframes, and wherein each of the first UL-DL configuration and the second UL-DL configuration includes at least one uplink subframe.

2. The method according to claim 1, wherein each of the first UL-DL configuration and second UL-DL configuration is defined by the following table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, U denotes an uplink subframe, and S denotes a subframe comprising a downlink period, a guard period, and an uplink period.

3. The method according to claim 1, wherein, for each of the first UL-DL configuration and the second UL-DL configuration, the uplink subframe corresponds to a subframe n, the downlink subframe corresponds to a subframe n-k, and the timing relation k is defined according to the following table:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

4. The method according to claim 1, wherein a cell index of the primary cell is lower than a cell index of the secondary cell.

5. The method according to claim 1, wherein:
the control information is transmitted through a physical uplink control channel (PUCCH) on the primary cell.

6. The method according to claim 1, wherein the control information is transmitted through a physical uplink shared channel (PUSCH) on the primary or secondary cell.

7. The method according to claim 1, wherein the control information includes acknowledgement (ACK) information or negative acknowledgement (NACK) information.

8. The method according to claim 1, further comprising:
bundling at least some parts of the control information, wherein the bundled control information is transmitted to the base station.

9. The method according to claim 1, wherein the primary cell is a cell on which a PUCCH is transmitted, and the secondary cell is a cell other than the primary cell among the plurality of serving cells.

10. A user equipment configured to transmit control information to a base station in a wireless communication system supporting aggregation of a plurality of serving cells, the user equipment being configured with the plurality of serving cells including a primary cell and a secondary cell operating in time division duplex (TDD), the user equipment comprising:

a receiver configured to receive each of a physical downlink control channel (PDCCH) and a physical downlink shared channel (PDSCH) from the base station in a downlink subframe through a respective one of the primary cell and secondary cell;

a transmitter configured to transmit control information regarding the received PDSCH to the base station in an uplink subframe of the primary cell or the secondary cell; and a processor, wherein, when the primary cell has a first uplink-downlink (UL-DL) configuration and the secondary cell has a second UL-DL configuration different from the first UL-DL configuration, the processor is configured to assign an UL-DL timing relation of each of the primary cell and secondary cell to be equal to a timing relation of the one of the first UL-DL configuration or the second UL-DL configuration having a smallest number of uplink subframes, and wherein each of the first UL-DL configuration and the second UL-DL configuration includes at least one uplink subframe.

11. The user equipment according to claim 10, wherein each of the first UL-DL configuration and second UL-DL configuration is defined by the following table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, U denotes an uplink subframe, and S denotes a subframe comprising a downlink period, a guard period, and an uplink period.

12. The user equipment according to claim 10, wherein, for each of the first UL-DL configuration and the second UL-DL configuration, the uplink subframe corresponds to a subframe n, the downlink subframe corresponds to a subframe n-k, and the timing relation k is defined according to the following table:

| UL-DL Configuration | 0 | 1 | 2 | 3 | 4 | 5 | 6 | 7 | 8 | 9 |
|---|---|---|---|---|---|---|---|---|---|---|
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

13. The user equipment according to claim 10, wherein a cell index of the primary cell is lower than a cell index of the secondary cell.

14. The user equipment according to claim 10, wherein: the control information is transmitted through a physical uplink control channel (PUCCH) on the primary cell.

15. The user equipment according to claim 10, wherein the control information is transmitted through a physical uplink shared channel (PUSCH) on the primary or secondary cell.

16. The user equipment according to claim 10, wherein the control information includes acknowledgement (ACK) information or negative acknowledgement (NACK) information.

17. The user equipment according to claim 10, wherein the processor bundles at least some parts of the control information, wherein the bundled control information is transmitted to the base station.

18. The user equipment according to claim 10, wherein the primary cell is a cell on which a PUCCH is transmitted, and the secondary cell is a cell other than the primary cell among the plurality of serving cells.

* * * * *